US007506853B2

(12) United States Patent
Sweere et al.

(10) Patent No.: US 7,506,853 B2
(45) Date of Patent: Mar. 24, 2009

(54) METHODS AND APPARATUS FOR GENERATING FORCE AND TORQUE

(75) Inventors: Harry C. Sweere, Minneapolis, MN (US); Khalid I. Alzebdeh, Apple Valley, MN (US); Jeffery M. Eliason, Shoreview, MN (US); Matthew J. Showalter, Minneapolis, MN (US); Shaun C. Lindblad, Lino Lakes, MN (US); Mustafa A. Ahmetoglu, White Bear Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 218 days.

(21) Appl. No.: 10/980,765

(22) Filed: Nov. 3, 2004

(65) Prior Publication Data
US 2005/0145762 A1    Jul. 7, 2005

Related U.S. Application Data

(63) Continuation of application No. 09/920,924, filed on Aug. 2, 2001, now Pat. No. 7,032,870, and a continuation-in-part of application No. 09/724,494, filed on Nov. 28, 2000, now Pat. No. 6,994,306.

(60) Provisional application No. 60/295,336, filed on Jun. 1, 2001.

(51) Int. Cl.
*A47F 1/10* (2006.01)

(52) U.S. Cl. .................. 248/295.11; 248/918; 248/919

(58) Field of Classification Search .................. 248/918, 248/316.3, 295.11, 298.1, 404, 161, 412, 248/162.1, 157; 108/146–148
See application file for complete search history.

(56) References Cited

U.S. PATENT DOCUMENTS 1,222,915 A    4/1917    Anderson
1,965,973 A    7/1934    Brown (Continued)

FOREIGN PATENT DOCUMENTS

DE        1091279        10/1960

(Continued)

OTHER PUBLICATIONS

*The American Journal of Orology* 19;693-699 1996. The American Journal of Otology, Inc. "Tympanoplasty Type II With Ionomeric Cement and Titanium-Gold-Angle Prostheses", Marcus M. Maassen and H. Peter Zenner, Department of Orolaryngology, University of Tuebingen, Tibingen, Germany.

*Primary Examiner*—Gwendolyn Baxter
(74) *Attorney, Agent, or Firm*—Fredrikson & Byron, P.A.

(57) ABSTRACT

A system for providing support and position control of a monitor. In one embodiment, a method of supporting a monitor includes converting an ascending energy storage member force curve into a substantially constant supporting force against the monitor. In one aspect, a method, of supporting a monitor includes providing an energy storage member and a cam which are cooperatively positioned so as to move relative to each other along the path of motion. As the energy storage member moves along the path relative to the cam, the cam displaces the energy storage member and thereby changes a force applied by the energy storage member on the cam, and wherein the cam converts the force applied by the energy storage member into a supporting force on the monitor.

17 Claims, 70 Drawing Sheets

U.S. PATENT DOCUMENTS

| | | |
|---|---|---|
| 2,010,214 A | 8/1935 | Braun |
| 2,168,209 A | 8/1939 | Haupt |
| 2,178,122 A | 10/1939 | Ostler et al. |
| 2,471,998 A | 5/1949 | Berggren |
| 2,480,865 A | 9/1949 | Lofstrand |
| 2,506,228 A | 5/1950 | Lofstrand, Sr. |
| 2,657,925 A | 11/1953 | Crow |
| 2,924,411 A | 2/1960 | Rouverol |
| 3,113,793 A | 12/1963 | Harwood |
| 3,269,035 A | 8/1966 | Bong |
| 3,534,935 A | 10/1970 | Gunn |
| 3,543,282 A | 11/1970 | Sautereau |
| 3,575,368 A | 4/1971 | Thomas et al. |
| 3,675,597 A | 7/1972 | Oddsen et al. |
| 3,767,181 A | 10/1973 | Van der Burgt et al. |
| 3,890,907 A | 6/1975 | Peterson |
| RE28,767 E | 4/1976 | Kuhlmann et al. |
| 3,976,016 A | 8/1976 | Longbottom |
| 4,215,776 A | 8/1980 | Esler |
| 4,351,245 A | 9/1982 | Laporte |
| 4,357,249 A | 11/1982 | Mellor |
| 4,387,468 A | 6/1983 | Fenne et al. |
| 4,387,876 A | 6/1983 | Nathan |
| 4,389,228 A | 6/1983 | Leunig |
| 4,427,243 A | 1/1984 | Miller |
| 4,494,720 A | 1/1985 | Gregory et al. |
| 4,605,189 A | 8/1986 | Bruneau |
| 4,616,218 A | 10/1986 | Bailey |
| 4,685,648 A | 8/1987 | Dobner et al. |
| 4,690,362 A | 9/1987 | Helgeland |
| 4,691,886 A | 9/1987 | Wendling et al. |
| 4,697,977 A | 10/1987 | Loomer et al. |
| 4,706,920 A | 11/1987 | Ojima et al. |
| 4,751,884 A | 6/1988 | Ball |
| 4,760,622 A | 8/1988 | Rohrman |
| 4,768,762 A | 9/1988 | Lund |
| 4,836,478 A | 6/1989 | Sweere |
| 4,856,740 A | 8/1989 | MacLeod et al. |
| 4,914,780 A | 4/1990 | Rogers et al. |
| 4,920,381 A | 4/1990 | Mahoney |
| 4,953,256 A | 9/1990 | Salmela et al. |
| 4,953,748 A | 9/1990 | Wheelock |
| 4,964,152 A | 10/1990 | Kaul et al. |
| 4,964,221 A | 10/1990 | Breyer et al. |
| 5,101,735 A | 4/1992 | Williams |
| 5,143,333 A | 9/1992 | Warden |
| 5,160,104 A | 11/1992 | Sher |
| 5,246,191 A | 9/1993 | Moss |
| 5,305,996 A | 4/1994 | Taniwa et al. |
| 5,311,827 A | 5/1994 | Greene |
| 5,400,721 A | 3/1995 | Greene |
| 5,487,525 A | 1/1996 | Drabczyk et al. |
| 5,520,361 A | 5/1996 | Lee |
| 5,549,264 A | 8/1996 | West |
| 5,589,849 A | 12/1996 | Ditzik |
| 5,626,323 A | 5/1997 | Lechman et al. |
| 5,668,570 A | 9/1997 | Ditzik |
| 5,718,406 A | 2/1998 | Long |
| 5,722,513 A | 3/1998 | Rowan et al. |
| 5,738,316 A | 4/1998 | Sweere et al. |
| 5,743,503 A | 4/1998 | Voeller et al. |
| 5,836,562 A | 11/1998 | Danzyger et al. |
| 5,842,672 A | 12/1998 | Sweere et al. |
| 5,860,370 A | 1/1999 | Poniecki |
| 5,876,008 A | 3/1999 | Sweere et al. |
| 5,881,984 A | 3/1999 | Lin |
| 5,902,201 A | 5/1999 | Vermeer et al. |
| 5,918,841 A | 7/1999 | Sweere et al. |
| 5,924,665 A | 7/1999 | Sweere et al. |
| 5,947,429 A | 9/1999 | Sweere et al. |
| 5,967,479 A | 10/1999 | Sweere et al. |
| 5,992,809 A | 11/1999 | Sweere et al. |
| 6,012,693 A | 1/2000 | Voeller et al. |
| 6,019,332 A | 2/2000 | Sweere et al. |
| 6,026,755 A | 2/2000 | Long |
| 6,064,373 A | 5/2000 | Ditzik |
| 6,189,849 B1 | 2/2001 | Sweere et al. |
| 6,227,518 B1 | 5/2001 | Sun |
| 6,326,955 B1 | 12/2001 | Ditzik |
| 6,378,829 B1 | 4/2002 | Strater et al. |
| 6,411,271 B1 | 6/2002 | Bang |
| 6,434,851 B1 | 8/2002 | Nishina |
| 6,504,707 B2 | 1/2003 | Agata |
| 6,994,306 B1 * | 2/2006 | Sweere et al. .......... 248/295.11 |
| 6,997,422 B2 | 2/2006 | Sweere et al. |
| 7,032,870 B2 * | 4/2006 | Sweere et al. .......... 248/295.11 |
| 2002/0088910 A1 | 7/2002 | Sweere et al. |
| 2002/0100851 A1 | 8/2002 | Abramowsky et al. |
| 2004/0035243 A1 | 2/2004 | Duval |
| 2004/0035989 A1 | 2/2004 | Sweere et al. |

FOREIGN PATENT DOCUMENTS

| | | |
|---|---|---|
| DE | 1171222 | 5/1964 |
| DE | 1611809 A1 | 1/1971 |
| DE | 3406669 A1 | 8/1985 |
| DE | 3610612 A1 | 10/1987 |
| DE | 19635236 C1 | 3/1998 |
| DE | 299 08 098 U1 | 6/1999 |
| EP | 0 183 938 A1 | 11/1986 |
| EP | 202533 | 11/1986 |
| EP | 1 052 472 A2 | 11/2000 |
| FR | 831.809 | 9/1938 |
| FR | 2037056 | 1/1970 |
| GB | 785363 | 10/1957 |
| GB | 2 154 442 A | 9/1985 |
| GB | 2338894 A | 1/2000 |
| GB | 2 346 071 A | 8/2000 |
| TW | 88200746 | 1/1999 |
| WO | WO 02/44609 A1 | 6/2002 |

* cited by examiner

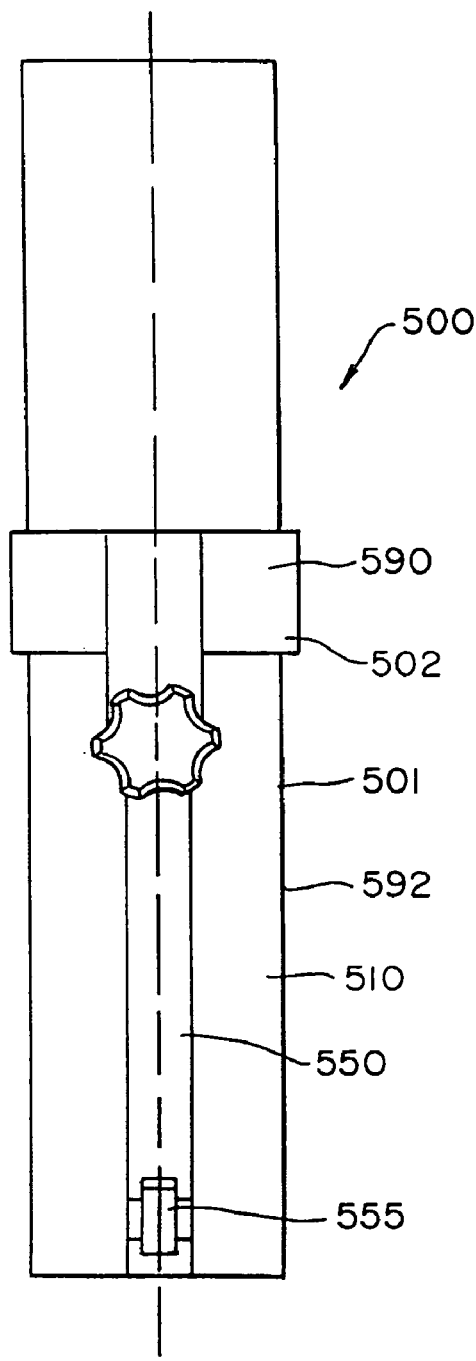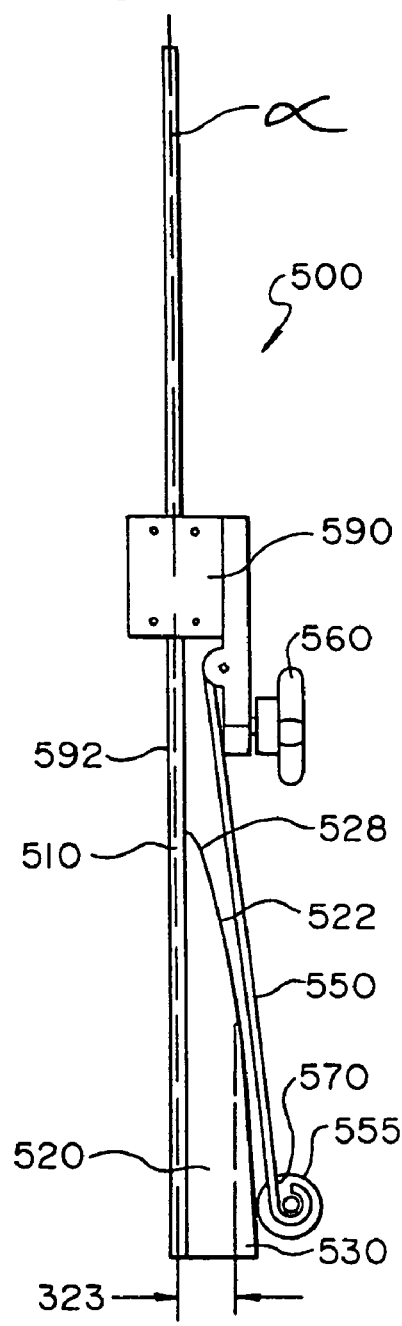

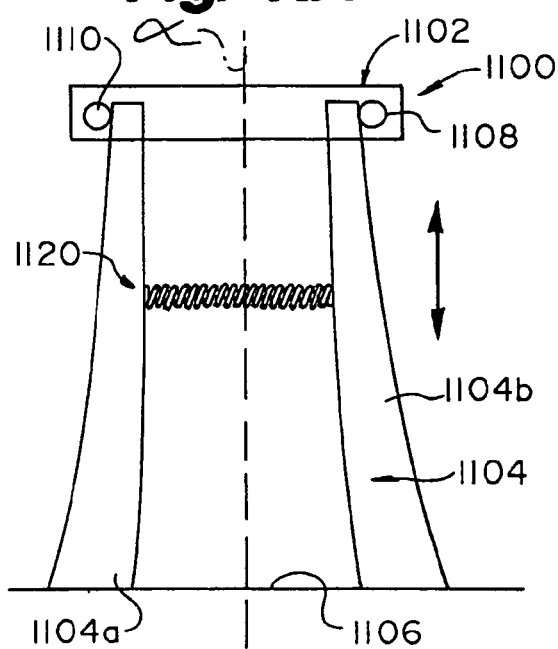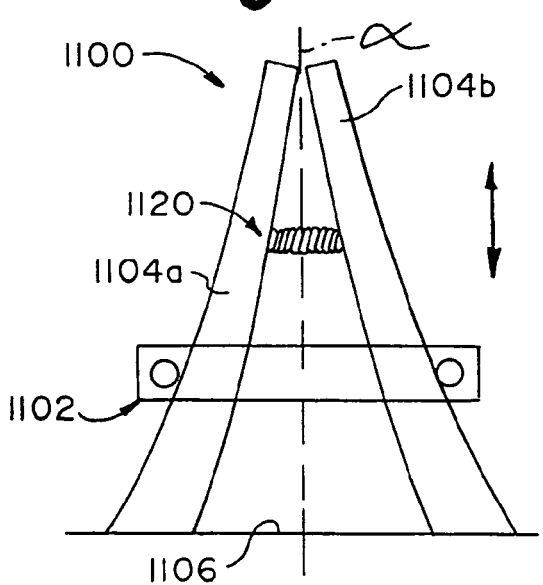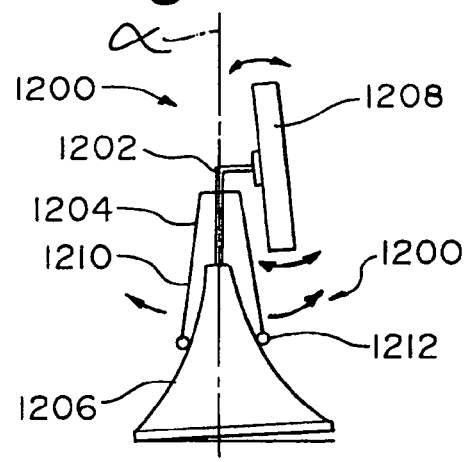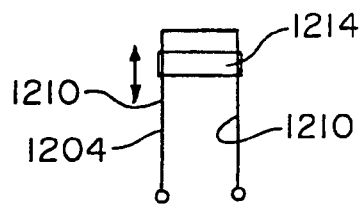

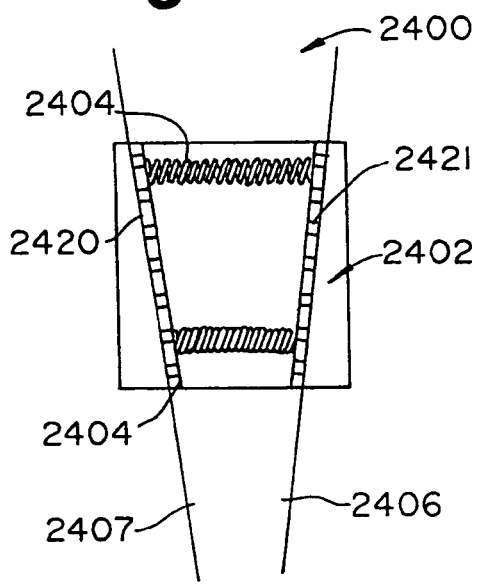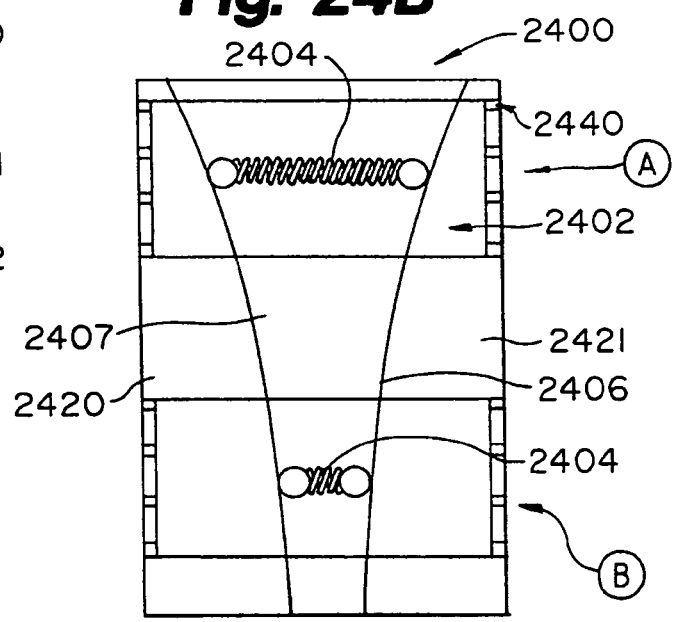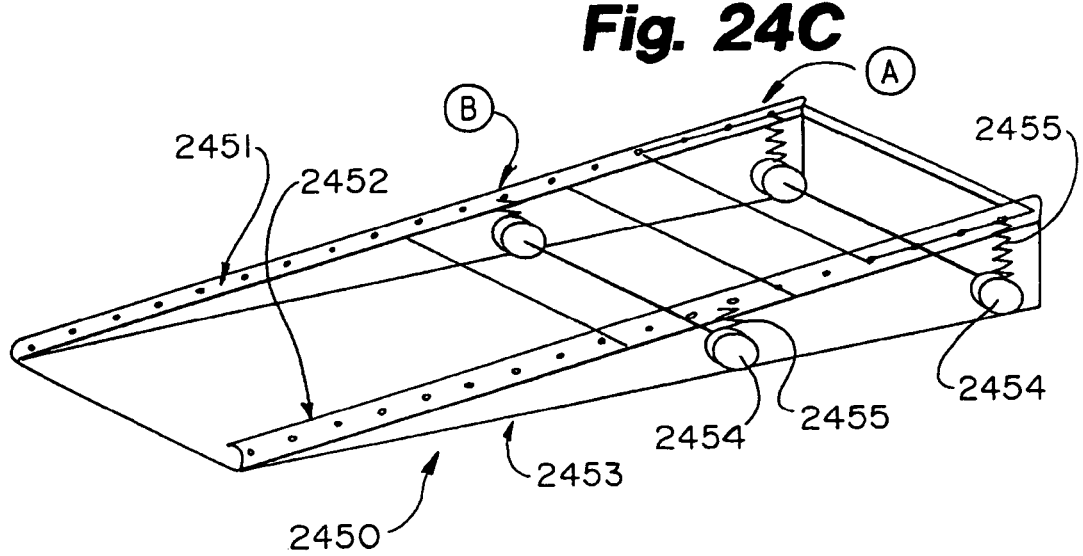

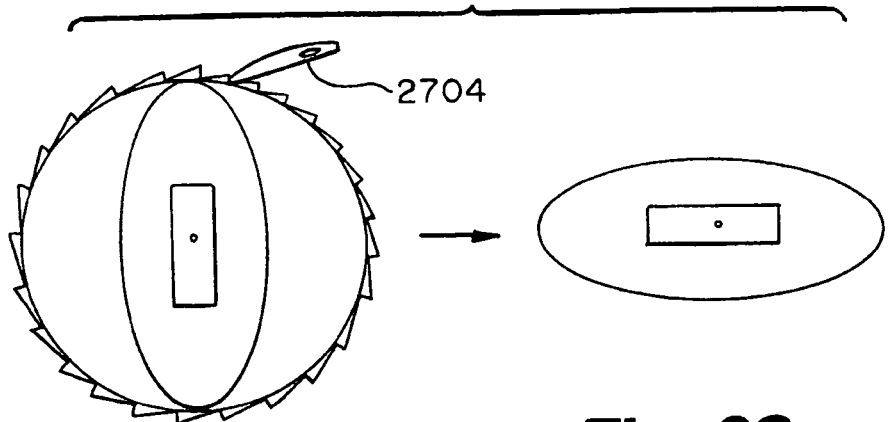
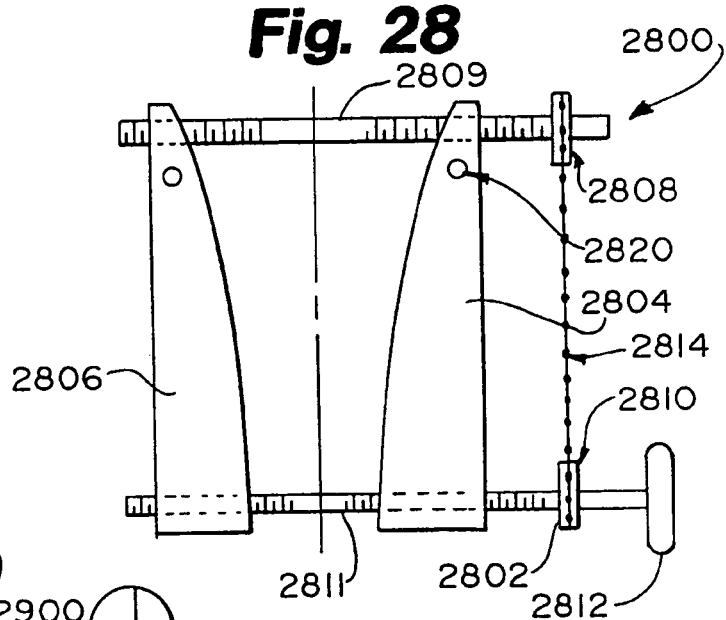
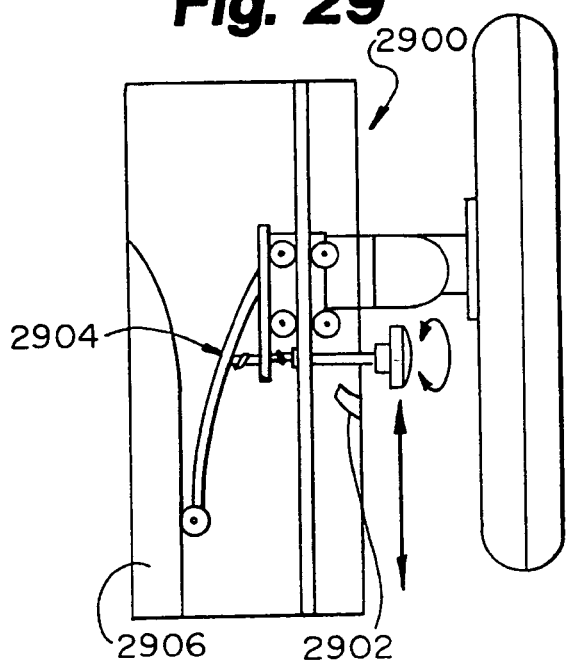

METHODS AND APPARATUS FOR GENERATING FORCE AND TORQUE

RELATED APPLICATIONS

The present Application is a continuation of Ser. No. 09/920,924 filed Aug. 2, 2001, now U.S. Pat. No. 7,032,870, issued Apr. 25, 2006, which claims the benefit of U.S. Provisional Patent Application, Ser. No. 60/295,336, filed Jun. 1, 2001, and is a continuation-in-part of U.S. Patent Application Ser. No. 09/724,494, filed Nov. 28, 2000, now U.S. Pat. No. 6,994,306, entitled MONITOR SUPPORT SYSTEM.

FIELD OF THE INVENTION

The present invention relates generally to an apparatus for providing a linear force and/or a rotary torque. More particularly, the present invention relates to an apparatus that may be utilized to position various devices. Examples of devices which may be suitable in some applications include basketball backboards, computer monitors, drawers, doors, and the like.

BACKGROUND OF THE INVENTION

The present invention relates generally to an apparatus for providing a linear force and/or a rotary torque. More particularly, the present invention relates to an apparatus that may be utilized to position various devices. One example of such a device is a display monitor for a personal computer. Personal computers and/or display monitors are often placed directly on a desk or on a computer case. However, to increase desk space, or to respond to the ergonomic needs of different operators, computer monitors are sometimes mounted on elevating structures. Alternatively, monitors are mounted to a surface such as a wall, instead of placing the monitor on a desk or a cart.

However, personal computers and/or display monitors are often used by multiple operators at different times during a day. In some settings, one computer and/or monitor may be used by multiple people of different sizes and having different preferences in a single day. Given the differences in people's size and differences in their preferences, a monitor or display adjusted at one setting for one individual is highly likely to be inappropriate for another individual. For instance, a child would have different physical space needs than an adult using the same computer and monitor.

In addition, operators are using computers for longer periods of time which increases the importance of comfort to the operator. An operator may choose to use the monitor as left by the previous user despite the discomfort, annoyance and inconvenience experienced by a user who uses settings optimized for another individual, which may even result in injury after prolonged use.

Moreover, as monitors grow in size and weight, ease of adjustability is an important consideration. For monitors requiring frequent adjustment, adjustability for monitors has been provided using an arm coupled with gas springs, where the arm is hingedly coupled with the desk or a vertical surface. However, the gas springs are costly and wear out over time. In addition, the gas springs require a significant amount of space, for instance arm length, which can be at a premium in certain applications, such as in hospitals.

Thus, there is a need for a monitor support mechanism which is compact, less costly to manufacture and maintain, has increased reliability, allows easy adjustability, is scalable to many different sized monitors, is adaptable to provide a long range of travel, and is adaptable to provide constant support force as the monitor is being positioned.

SUMMARY OF THE INVENTION

The present invention relates generally to an apparatus for providing a linear force or a rotary torque. More particularly, this apparatus may be utilized to position a variety of devices. An apparatus in accordance with an exemplary embodiment of the present invention includes a cam having a first guiding surface and a second guiding surface, and a cam following assembly including a first roller having a first following surface for engaging the first guiding surface of the cam. The first following surface of the first roller may advantageously contact the first guiding surface of the cam at least at a first contact point.

The cam following assembly may further include a second roller having a second following surface engaging the second guiding surface of the cam. When this is the case, the cam following assembly may also include a spring assembly configured to urge the first roller toward the first guiding surface of the cam and also to bias the second roller toward the second guiding surface of the cam. For example, the cam following assembly may include a spring having a first end coupled to the first roller and a second end coupled to the second roller.

A contact angle of the first roller may be defined by a first imaginary line extending through the first contact point and a central axis of the first roller, and an imaginary reference line extending between the central axis of the first roller and a central axis of the second roller. The first guiding surface of the cam may advantageously have a continually changing slope and/or a continually changing radius of curvature so that the contact angle of the first roller changes as the cam following assembly moves along a longitudinal axis of the cam.

In an advantageous embodiment, the cam is shaped such that movement of the cam following assembly along the longitudinal axis of the cam causes a deflection of the spring and a change in the contact angle of the first roller such that the magnitude of an axial force component of a reactionary force acting on the first roller varies according to a desired force profile. In a particularly advantageous embodiment, the cam is shaped such that movement of the cam following assembly along the longitudinal axis of the cam causes a deflection of the spring and a change in the contact angle of the first roller such that the magnitude of an axial force component of a reactionary force acting on the first roller is substantially constant throughout a travel of the cam following assembly. For example, the cam may be shaped such that the deflection of the spring varies in a manner substantially inversely proportionally to an associated variation in the trigonometric TAN function of the contact angle throughout the travel of the cam following assembly.

In some implementations of the present invention, the spring has a spring constant reflecting a substantially linear relationship between deflection and spring force. In other implementations of the present invention the spring may have a spring function reflecting a substantially nonlinear relationship between deflection and spring force.

A cam, in accordance with an exemplary embodiment of the present invention includes a cam body having a first guiding surface, a second guiding surface, and a longitudinal axis therebetween. In an advantageous implementation, the first guiding surface has an arcuate shape including a continually changing slope and/or a continually changing radius of curvature. In certain implementations, the cam is substantially symmetrical about the longitudinal axis.

The cam following assembly may be advantageously moveable along the longitudinal axis between at least a first position and a second position. The spring advantageously has a first deflection when the cam following assembly is in the first position and a second deflection when the cam following assembly is in the second position. Also, the first roller advantageously has a first contact angle when the cam following assembly is in the first position and a second contact angle when the cam following assembly is in the second position.

In a useful implementation, the first contact angle may be different from the second contact angle. In an advantageous implementation, the second deflection is greater than the first deflection and the second contact angle is smaller than the first contact angle. In some implementations, the second deflection is greater than the first deflection and the trigonometric TAN function of the second contact angle is smaller than the trigonometric TAN function of the first contact angle. In these implementations, a first ratio of the first deflection to the second deflection may be substantially equal to a second ratio of the trigonometric TAN function of the first contact angle to the trigonometric TAN function of the second contact angle.

An additional exemplary implementation in accordance with the present invention comprises a first guideway and a first follower arranged to run along the first guideway. In some implementations, this apparatus may include, a second guideway and a second follower arranged to run along the second guideway. A spring assembly may be arrange to bias the first follower and the second follower toward one another.

The first guideway may advantageously define a first arcuate path and the second guideway may advantageously define a second arcuate path. In certain implementations, the first arcuate path has a continually changing slope and/or a continually changing radius of curvature. In one advantageous implementation, the second arcuate path is substantially a mirror image of the first arcuate path.

A pivot mechanism in accordance with an exemplary implementation of the present invention includes a cam having a first guiding surface, and a cam following assembly. The cam following assembly advantageously has a first roller having a first following surface engaging the first guiding surface of the cam at least at a first contact point, and a means for urging the first roller against the first guiding surface of the cam. The first roller has a contact angle defined by a first imaginary line extending through the first contact point and a central axis of the first roller, and a substantially horizontal imaginary reference line. In a particularly advantageous implementation, the first guiding surface of the cam has a continually changing-slope and/or a continually changing radius of curvature so that the contact angle of the first roller changes as the cam rotates about an axis of rotation of the cam.

In certain implementations, the means for urging the first roller against the first guiding surface of the cam comprises a spring. The cam may be advantageously shaped such that rotation of the cam about the axis of rotation of the cam causes a deflection of the spring and a change in the contact angle of the first roller such that the magnitude of a torque acting on the cam is substantially constant throughout a rotary travel of the cam For example, the cam may be shaped such that rotation of the cam about the axis of rotation of the cam causes a deflection of a spring and a change in the contact angle of the first roller such that the magnitude of a torque acting on the cam is substantially constant throughout a rotary travel of the cam. In one implementation, the deflection of the spring varies in a manner substantially inversely proportionally to an associated variation in the trigonometric TAN function of the contact angle throughout the travel of the cam following assembly.

An additional exemplary apparatus, in accordance with the present invention includes, a cam assembly including a first cam member defining a first guiding surface and a second cam member defining a second guiding surface. The first cam member of the cam assembly and the second cam member of the cam assembly being advantageously moveable relative to one another.

The apparatus further includes a cam following assembly including a first roller having a first following surface engaging the first guiding surface of the cam assembly at least at a first contact point, and a second roller having a second following surface engaging the second guiding surface of the cam assembly. A spring having a first end coupled to the first roller and a second end coupled to the second roller may be provided for urging the first roller and the second roller toward one another.

In certain implementations the first cam member of the cam assembly and the second cam member of the cam assembly are both rotatably coupled to a base member such that the first cam member of the cam assembly and the second cam member of the cam assembly are rotatable relative to one another.

In these embodiments, the first cam member of the cam assembly and the second cam member of the cam assembly maybe rotable relative to one another to adjust a contact angle of the first roller and the second roller.

The contact angle of the first roller maybe defined by a first imaginary line extending through the first contact point and a central axis of the first roller, and a imaginary reference line extending between the central axis of the first roller and a central axis of the second roller.

In other implementations the first cam member of the cam assembly and the second cam member of the cam assembly are both slidingly coupled to a base member such that the first cam member of the cam assembly and the second cam member of the cam assembly are moveable along an adjustment axis relative to one another. In these implementations the first cam member of the cam assembly and the second cam member of the cam assembly may be moveable along an adjustment axis relative to one another to adjust the bias of a spring coupled between the first roller and the second roller.

An exemplary window assembly in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A window of the window assembly may be advantageously fixed to one of the cam and the cam following assembly, and a window frame of the window assembly may be fixed to the other of the cam and the cam following assembly.

A piece of furniture in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A drawer of the piece of furniture may be advantageously fixed to one of the cam and the cam following assembly, and a frame of the piece of furniture may be fixed to the other of the cam and the cam following assembly.

A door closing assembly, in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another.

A door of the door assembly may be advantageously coupled to one of the cam and the cam following assembly, and a door frame may be coupled to the other of the cam and the cam following assembly. In certain implementations the door is pivotably coupled to one of the cam and the cam following assembly. In other implementations, the door is fixed to one of the cam and the cam following assembly. The door frame may be pivotably coupled to the other of the cam and the cam following assembly in certain implementations, and the door frame may be fixed to the other of the cam and the cam following assembly in other implementations.

A chair assembly, in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A chair back may be advantageously coupled to one of the cam and the cam following assembly, and a chair frame may be coupled to the other of the cam and the cam following assembly.

A car door assembly in accordance with one implementation of the present invention a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A car window of the car door assembly may be coupled to one of the cam and the cam following assembly, and a car door frame car door assembly may be coupled to the other of the cam and the cam following assembly.

A basket ball goal assembly in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A post of the basket ball goal assembly may be advantageously coupled to one of the cam and the cam following assembly, and a backboard of the basket ball goal assembly may be coupled to the other of the cam and the cam following assembly.

A home theater assembly in accordance with one implementation of the present invention includes a mechanism including a cam and a cam following assembly. The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another.

A wall may be advantageously coupled to one of the cam and the cam following assembly, and a speaker may be coupled to the other of the cam and the cam following assembly. A home theater assembly in accordance with an additional implementation of the present invention includes a mechanism including a cam and a cam following assembly.

The cam advantageously has a first guiding surface and a second guiding surface. The cam following assembly includes a first roller having a first following surface engaging the first guiding surface of the cam at least at a first contact point and a second roller having a second following surface engaging the second guiding surface of the cam. A spring may be coupled between the first roller and the second roller for urging the rollers toward one another. A wall may be advantageously coupled to one of the cam and the cam following assembly, and a visual display may be coupled to the other of the cam and the cam following assembly.

In one embodiment, a method of supporting a monitor includes converting an ascending energy storage member force curve into a substantially constant supporting force against the monitor.

In one aspect, a method of supporting a monitor includes providing an energy storage member and a cam which are cooperatively positioned so as to move relative to each other along the path of motion. As the energy storage member moves along the path relative to the cam, the cam displaces the energy storage member and thereby changes a force applied by the energy storage member on the cam, and wherein the cam converts the force applied by the energy storage member into a supporting force on the monitor.

One aspect provides a monitor support mechanism. In one embodiment, a monitor support mechanism includes an energy storage member and a cam. The energy storage member and the cam are cooperatively positioned so that, as the energy storage member moves along a path relative to the cam, the cam displaces the energy storage member and thereby changes a force of the energy storage member, and wherein the cam converts the force of the energy storage member into a substantially constant supporting force on the monitor.

During use of the mechanism, for example, the height, location, and/or horizontal position of a component mounted on the mechanism can be adjusted. For example, to move the monitor, a portion of the truck or the monitor is grasped, and force is applied to overcome the frictional restraint of the components, which can be as little as 1 or 2 pounds, by way of example. When the moving force is removed, the component remains supported in its new position. Thus, even very large loads can be safely and easily adjusted with a minimum of effort.

Moreover, in one embodiment, a constant level of energy is stored (or expended) by the energy storage member per unit of movement along the path. This provides ease of adjustment all along the path.

Among other advantages, the present monitor support system provides mechanisms which can be compact, scalable, have a long range of travel, and have a slim profile. In addition, the monitor support mechanisms are low cost and light weight. A further benefit is when multiple components are simultaneously secured with the same mechanism to achieve an efficient use of space and provide common movement of the components. In one embodiment, a single mechanism can be changed or adjusted to allow various weight components to be counterbalanced by the same mechanism.

These and other embodiments, aspects, advantages, and features of the present system will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE DRAWINGS

FIG. 5A is a front view illustrating a monitor support mechanism constructed in accordance with one embodiment.

FIG. 5B is a side view of the monitor support mechanism of FIG. 5A.

FIG. 11A shows a schematic view of a mechanism constructed in accordance with one embodiment.

FIG. 11B is another view of the mechanism of FIG. 11A.

FIG. 12A shows a schematic view of a mechanism constructed in accordance with one embodiment.

FIG. 12B is a side view of an adjustable band of the mechanism of FIG. 12A.

FIG. 24A shows a schematic view of a mechanism constructed in accordance with one embodiment.

FIG. 24B shows a schematic view of a mechanism constructed in accordance with one embodiment.

FIG. 24C shows a perspective view of a rail for a mechanism in accordance with one embodiment.

FIG. 27 shows a mechanism having an adjustment mechanism according to one embodiment.

FIG. 28 shows a mechanism having an adjustment mechanism according to one embodiment.

FIG. 29 shows a mechanism having an adjustment mechanism according to one embodiment.

In FIG. 45, it may be appreciated that pivot mechanism comprises an axle and a torsional spring disposed about axle.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents. In the present description, "vertical," "horizontal," "lateral," "up," "down," "raised," "lowered," and the like are meant to be taken in their relative sense in regards to the position of the monitor support mechanism in the figures and the context of the description, and they are not to be taken in their absolute sense.

Overview of System

In one or more embodiments, the present monitor support system provides control for the motion of a monitor in any direction or axis; provides a constant force along a range of travel; provides a variable force or other pre-determined force along the range of travel; is adaptable to a wide variety of applications; is scalable both as to size and force capacity; is usable in many different attitudes; is optionally adjustable; moves a load in a linear direction; moves a load in a 3-dimensional or other pre-determined direction; and is adaptable to utilize a broad range of springs.

In general, the present system includes a method which utilizes energy stored in a spring which is released in the form of an ascending force curve as a result of the deflection of the spring. This force curve is converted to a constant force, and/or a variable force, and/or other pre-determined force by cams having a profile designed to control the rate of spring deflection (or compression) for each unit of travel over a range of travel.

Figure 1A:
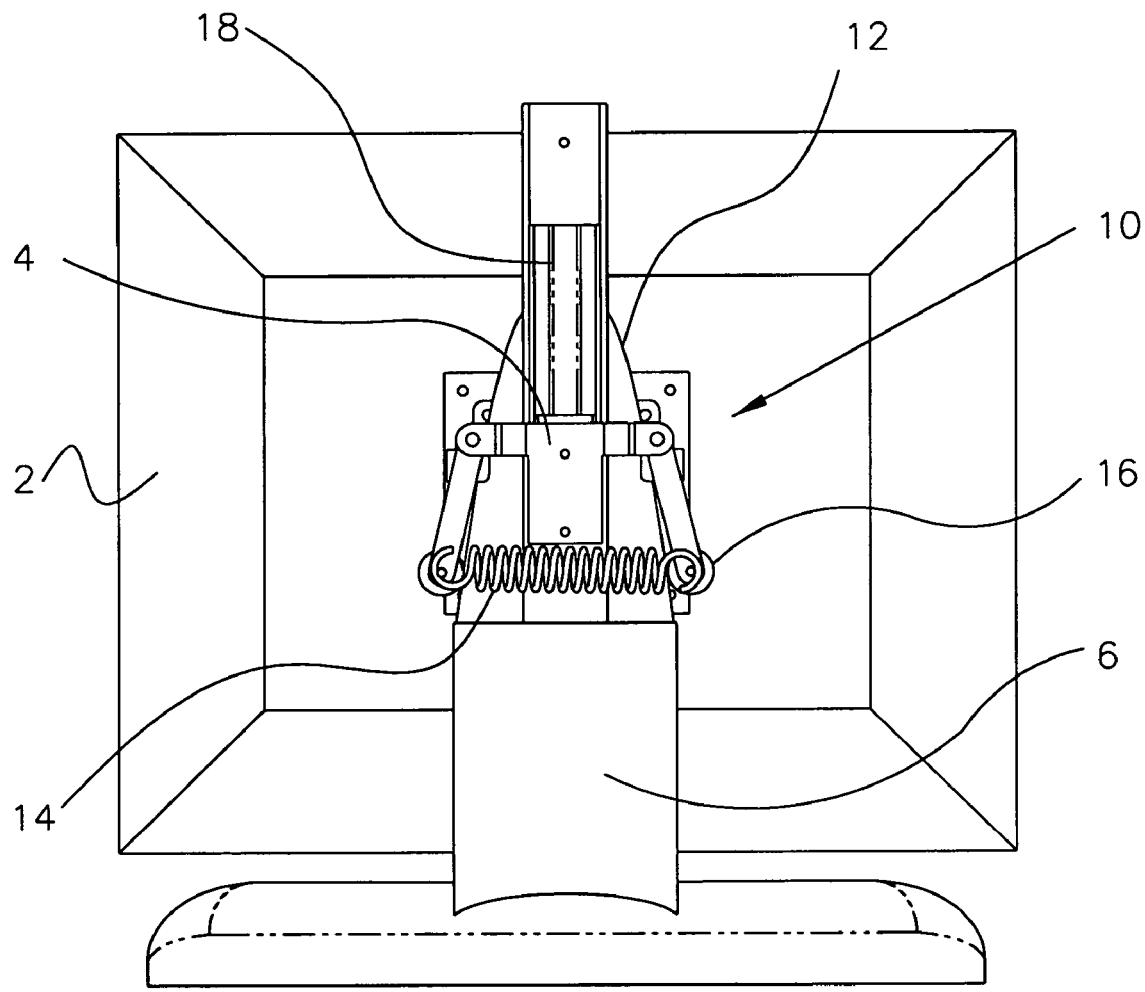
FIG. 1A is a back view illustrating a monitor support mechanism constructed in accordance with one embodiment.
Figure 1B:
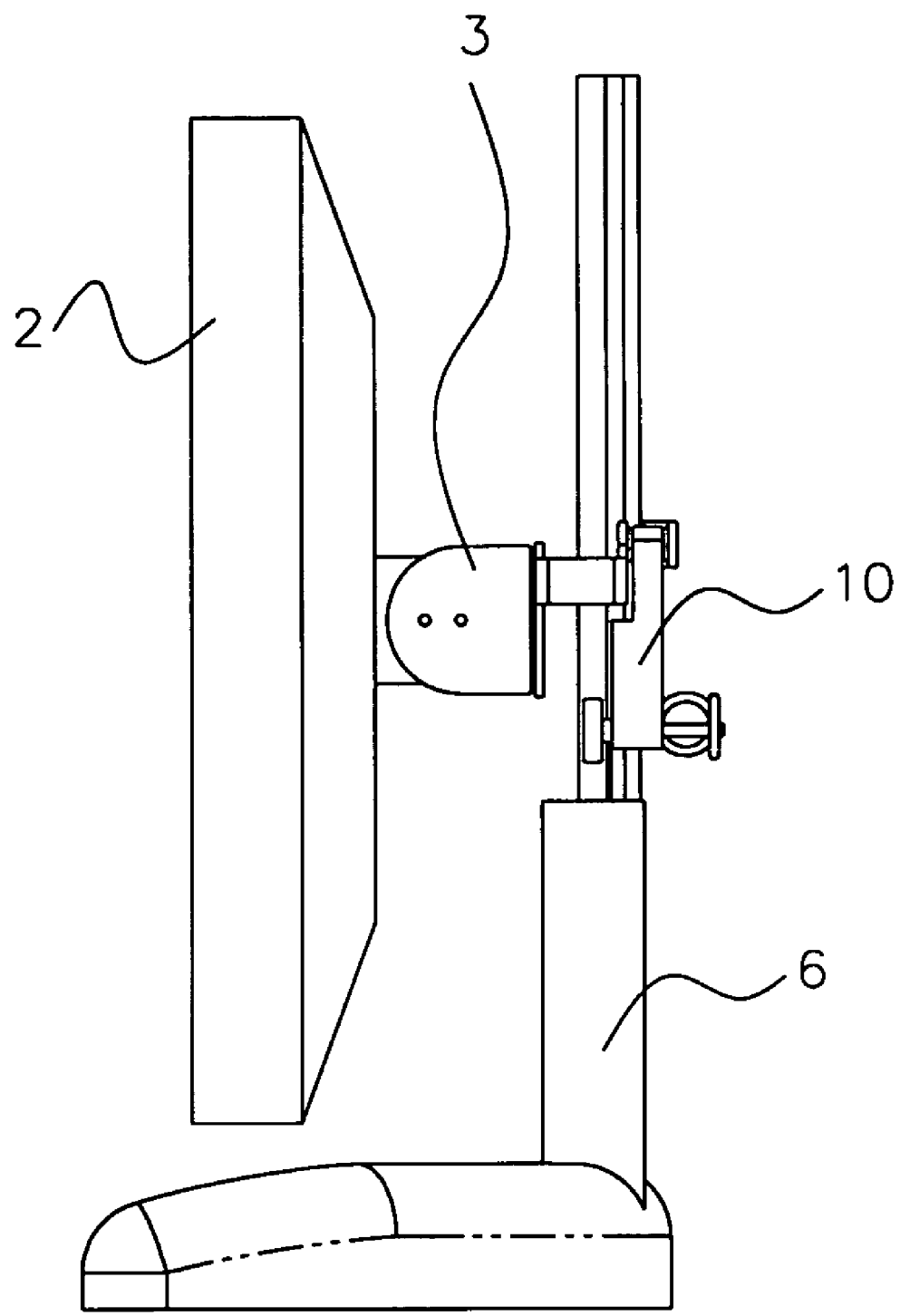
FIG. 1B is a side view of the monitor support system of FIG. 1A.

FIGS. 1A and 1B show a rear and side view, respectively, of one exemplary use of a monitor support mechanism 10 constructed according to one embodiment of the present invention.

As shown in FIG. 1A, a flat screen monitor 2 is attached to a portion of a movable carriage or truck 4 of monitor support mechanism 10, which is coupled to a base 6. Truck 4 is movable relative to base 6 so that monitor 2 can move up and down relative to base 6. In this embodiment, base 6 is stationary and truck 4 moves up and down. It will be noted that mechanism 10 and the other mechanisms described below can also provide support if the monitor is coupled to the base and the truck is stationary, such as mounted to a wall.

Although further details will be described below, monitor support mechanism 10 generally includes a cam 12, an energy storage member, such as spring 14, an energy storage/cam interface member, such as cam follower 16, and a guide 18 which defines a path of motion for monitor 2. In this example, the direction of the path defined by guide 18 provides a linear motion in a vertical direction. As will be discussed below, other embodiments provide for a horizontal direction of motion. Other attitudes between horizontal and vertical are also within the scope of the present system. Moreover, some embodiments provide a 3-dimensional, curved axis of motion.

Generally, the members of monitor support mechanism 10 are cooperatively positioned so that, as monitor 2 travels along guide 18, cam 12 causes spring 14 to either increase or decrease its stored energy level. Cam 12 then converts this energy into a substantially constant supporting force on truck 4 via cam follower 16. Advantageously, this configuration provides for a compact, elegantly designed mechanism since the cam moves relative to the spring, directly displaces the spring, and converts the spring energy into a lifting and/or supporting force.

In one embodiment, cam 12 includes a cam surface or profile which is generally vertically oriented and generally faces towards the path defined by guide 18. In this embodiment, the cam surface is a varying distance away from the path while not intersecting the path. In one or more embodiments, this cam surface orientation helps provide a scalable design since the monitor support mechanism as shown can be lengthened or shortened in the vertical direction without having to expand laterally or be made thicker. Advantageously, this increases the available range of travel for the monitor. It is noted that, as used herein, vertically oriented does not mean that the whole cam surface is vertical, it means that relative to a lateral or horizontal orientation, the surface is more vertical that horizontal and that it has a generally up/down profile as opposed to a lateral profile.

In this embodiment, cam 12 has a cam shape or profile relative to the path of motion so that the profile corresponds directly to the amount of energy from the spring required to provide a counterbalance to the monitor. Accordingly, energy is stored in the energy storage member as the monitor descends along the path of motion. This stored energy is then used to help lift the monitor as it ascends. Thus, when the spring force is weak, the compression rate is high, and as the spring force gets stronger, the compression rate is slowed down for each unit of descent along the cam. By changing the rate of spring compression, the cam converts the ascending force curve of the spring into a constant or pre-determined level of supporting force which is applied in the direction of motion of the monitor. As used herein, supporting force refers to a force which acts either directly or indirectly against the weight of an object.

In other words, an ever-increasing force applied by the spring against the cam surface is converted by the cam surface into a reaction force against the cam follower. In this embodiment, the reaction force includes a first reaction force component parallel to the direction of the path and a second reaction force component which is generally perpendicular to the first reaction force component. These first and second reaction force components vary depending on the slope of the cam surface.

In this embodiment, the shape of the cam surface is designed to keep the vertical, supporting force component constant even as the perpendicular force component increases or decreases. Thus, the shape of the cam surface, in combination with the spring, provides a constant supporting force against truck 4 during movement of truck 4 and monitor 2.

In other embodiments, the other monitor support mechanisms to be discussed below can be used in place of monitor support mechanism 10, and variations on the cam and energy storage members discussed above are possible and are considered within the scope of the present system as will be discussed below.

FIG. 1B shows that in one embodiment, a pivot 3 is disposed between flat screen monitor 2 and the truck of monitor support mechanism 10, such that the flat screen monitor 2 is allowed to rotate or pivot relative to the truck of the monitor support mechanism, and the truck is allowed to move vertically relative to the support of the monitor support mechanism 10. As FIG. 1B shows, in one embodiment, monitor support mechanism 10 is relatively thin, and thus the monitor may be positioned close to a wall which can save desk space or work station space.

Method and System

Figure 2:
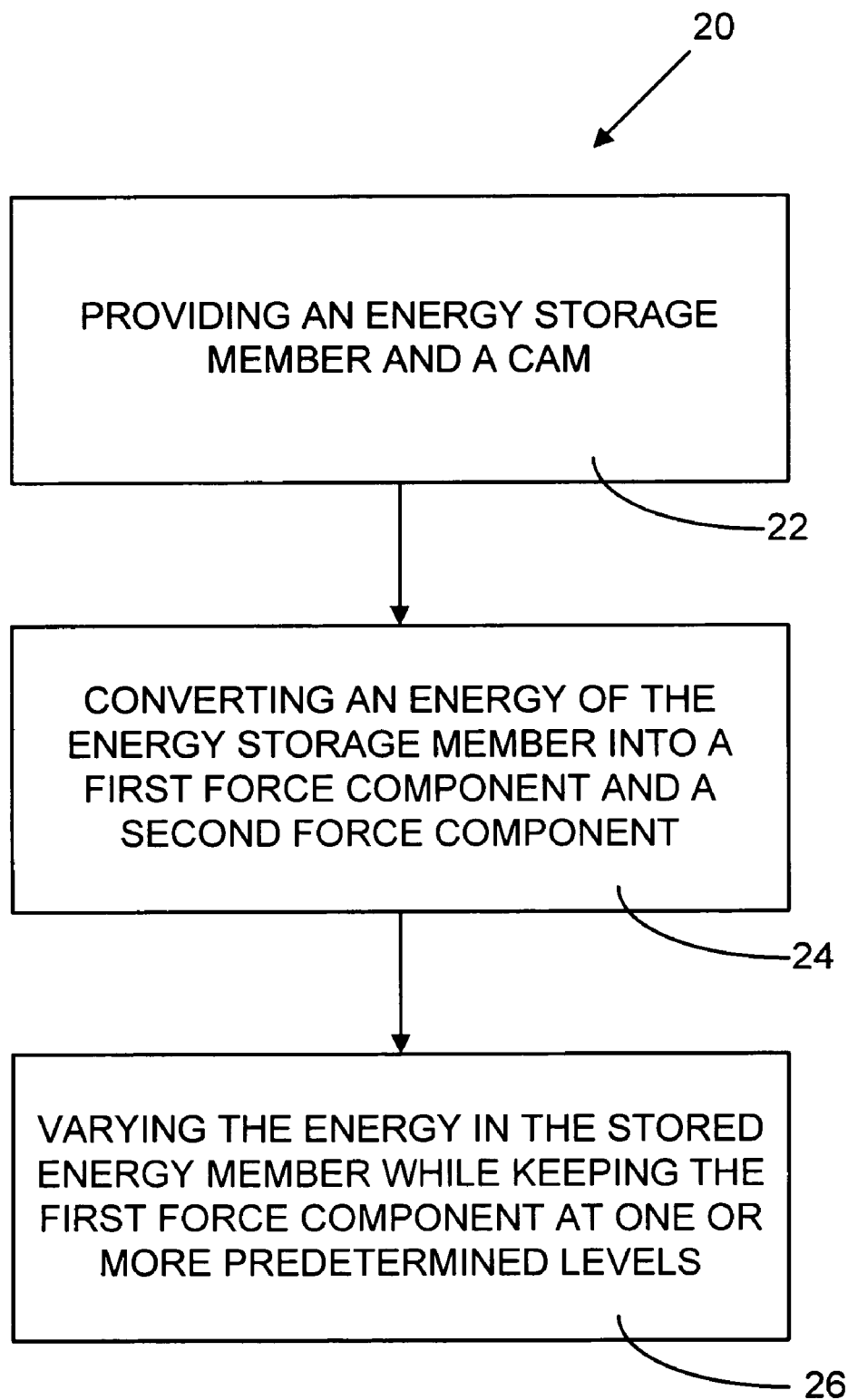
FIG. 2 is a flow chart of a method for supporting a monitor according to one embodiment.

FIG. 2 shows a diagram of a method 20 according to one embodiment of the present monitor support system. Method 20 includes, in a block 22, providing an energy storage member and a cam. In one embodiment, the cam and energy storage member are positioned so as to move relative to each other along the path of motion. The energy storage member, such as a spring, has a force and a stored energy level which ascend as the spring travels along the path relative to the cam. As the energy storage member moves along the path relative to the cam, the cam displaces the energy storage member and thereby increase the energy stored in the member and causes a change in the force applied by the energy storage member on the cam. In one embodiment, the ascending spring force is applied generally perpendicular to the direction of the path. In one embodiment, the spring force is applied in a non-parallel direction relative to the path.

In block 24, the cam converts the spring energy into a first reaction force component and a second reaction force component. In this embodiment, the first reaction force component is parallel to the direction of motion axis and supports the weight of the monitor, while the second reaction force component is perpendicular to the first reaction force component.

In one embodiment, the cam profile is curved and runs generally alongside the path of motion in a vertical orientation. In one embodiment, the cam surface lies at varying distances away from the path while not intersecting the path of motion. In one embodiment, the spring force is applied directly against the cam surface.

In block 26, method 20 includes varying the energy of the spring as the spring and cam move relative to each other, wherein the first reaction force component is at one or more pre-determined force levels as the spring force varies along the curved cam surface. In one embodiment, the one or more predetermined force levels comprise a substantially constant force level. In other embodiments, the one or more pre-determined force levels are a variable force level. In one embodiment, block 26 includes varying the second reaction force component while maintaining the first reaction force component substantially constant as the load travels along a direction of motion axis.

In various embodiments, blocks 22-26 are combined and/or some blocks may be omitted. For instance in one embodiment, a method includes providing, in combination, a force member for applying an ascending force as a load moves along a direction of motion and a cam having a profile which, in combination with the chosen force member, exerts a substantially constant supporting force on the monitor.

In some embodiments, the method includes coupling the energy storage member and cam to a first member, such as a truck or carriage, and a second member, such as a base or a wall, respectively. The first member and second member are movably coupled to each other so that one translates within the other in a path defining the direction of motion. As the first member travels along the second member, the energy storage member is compressed (or expanded) either directly or indirectly by the cams and is compressed at a rate controlled by the shape or profile of the cams. For instance, in one embodiment, the method provides for a constant force on the monitor. Thus, a cam profile is chosen which provides that as the force applied by the spring increases, the force applied on the monitor remains substantially constant.

Figure 36A:
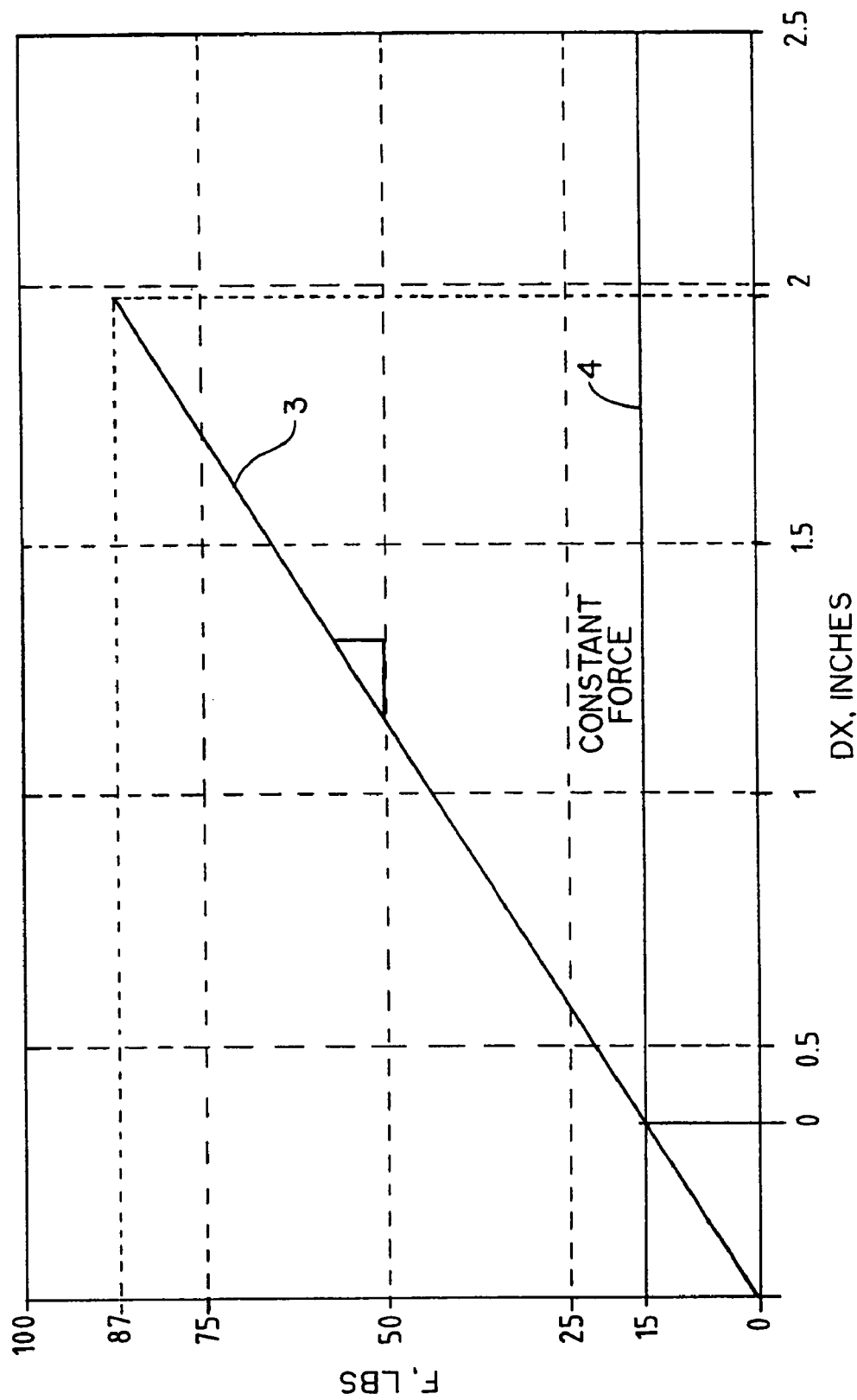
FIG. 36A shows a graph depicting an energy storage member force curve according to one embodiment.
Figure 36B:
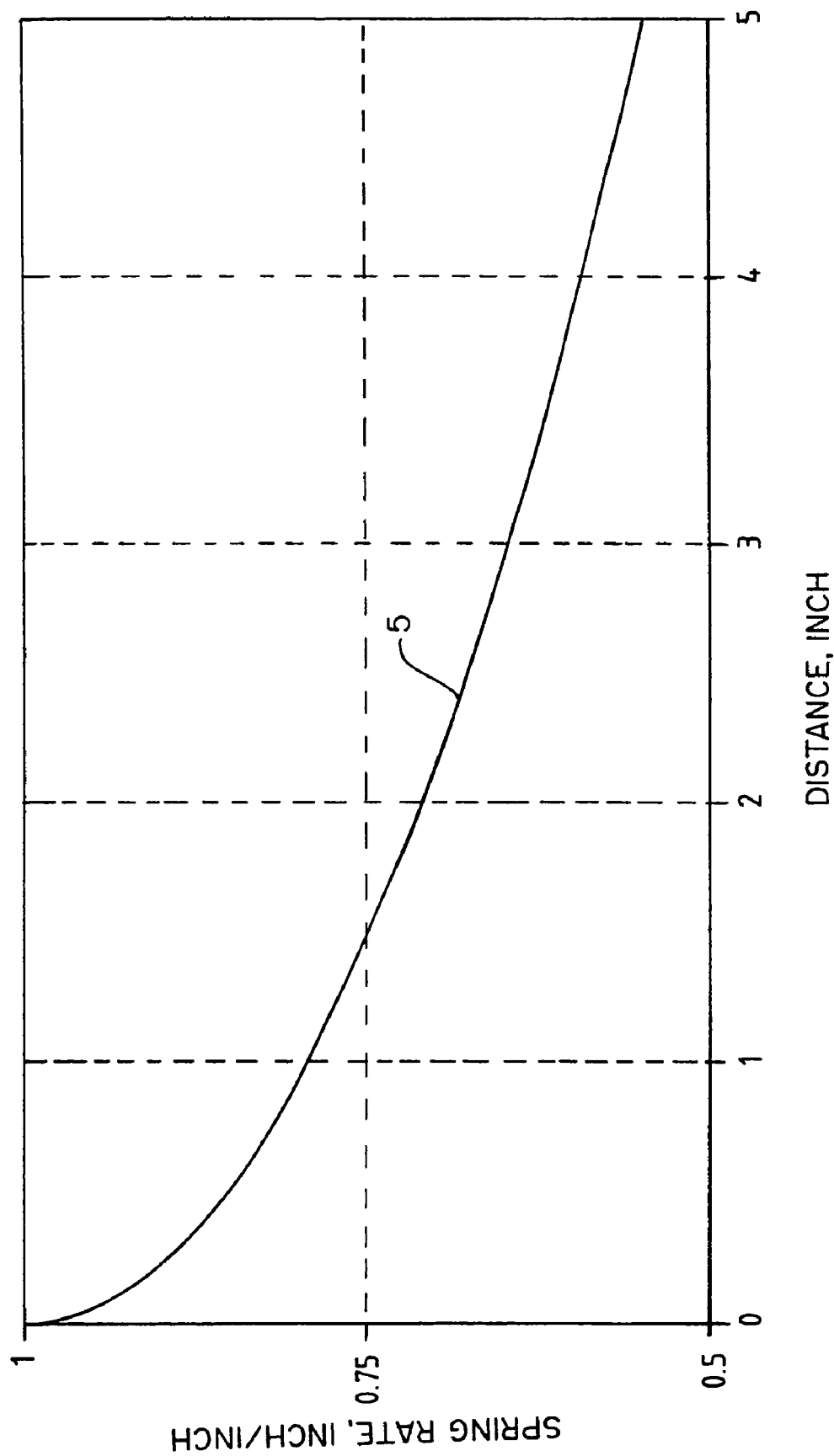
FIG. 36B shows a compression rate curve in accordance with one embodiment.

Referring to FIGS. 36A and 36B, a pair of graphs are shown depicting exemplary spring force graphs in accord with one or more embodiments of the present system. FIG. 36A shows a typical force curve 3 for a conventional compression spring. The vertical axis of graph 36A shows spring force and the horizontal axis shows spring compression. The spring has the following characteristics: 4-inch free length, 2-inch maximum compression, a force rate of 44 lbs/inch, and a maximum force of 87 lbs. The spring is merely an example and in no way is meant to limit the present embodiment. It is noted that the spring compression shown along the horizontal axis refers to spring compression after a pre-load compression of a ½ inch is applied to the exemplary spring. This is merely exemplary, and other pre-loads are within the scope of the present system.

Graph 36B depicts a spring compression rate along the vertical axis and a distance along the path of motion axis along the horizontal axis. In one embodiment, a compression rate curve 5 is provided by a cam having a profile substantially similar to the curve 5 and having a cam profile shape that controls the rate of spring compression as a function of distance along the horizontal axis. In this example, the spring is compressed 1½ inches over a 5 inch travel range. In combination, the compression rate of FIG. 36B applied to the spring curve 3 of FIG. 36A results in the substantially constant axial force curve 4 depicted in FIG. 36A. It will be appreciated that the present design is scalable and that horizontal axis of graph 36B can be extended to provide for further travel of an energy storage member along a path of motion.

Figure 37A:
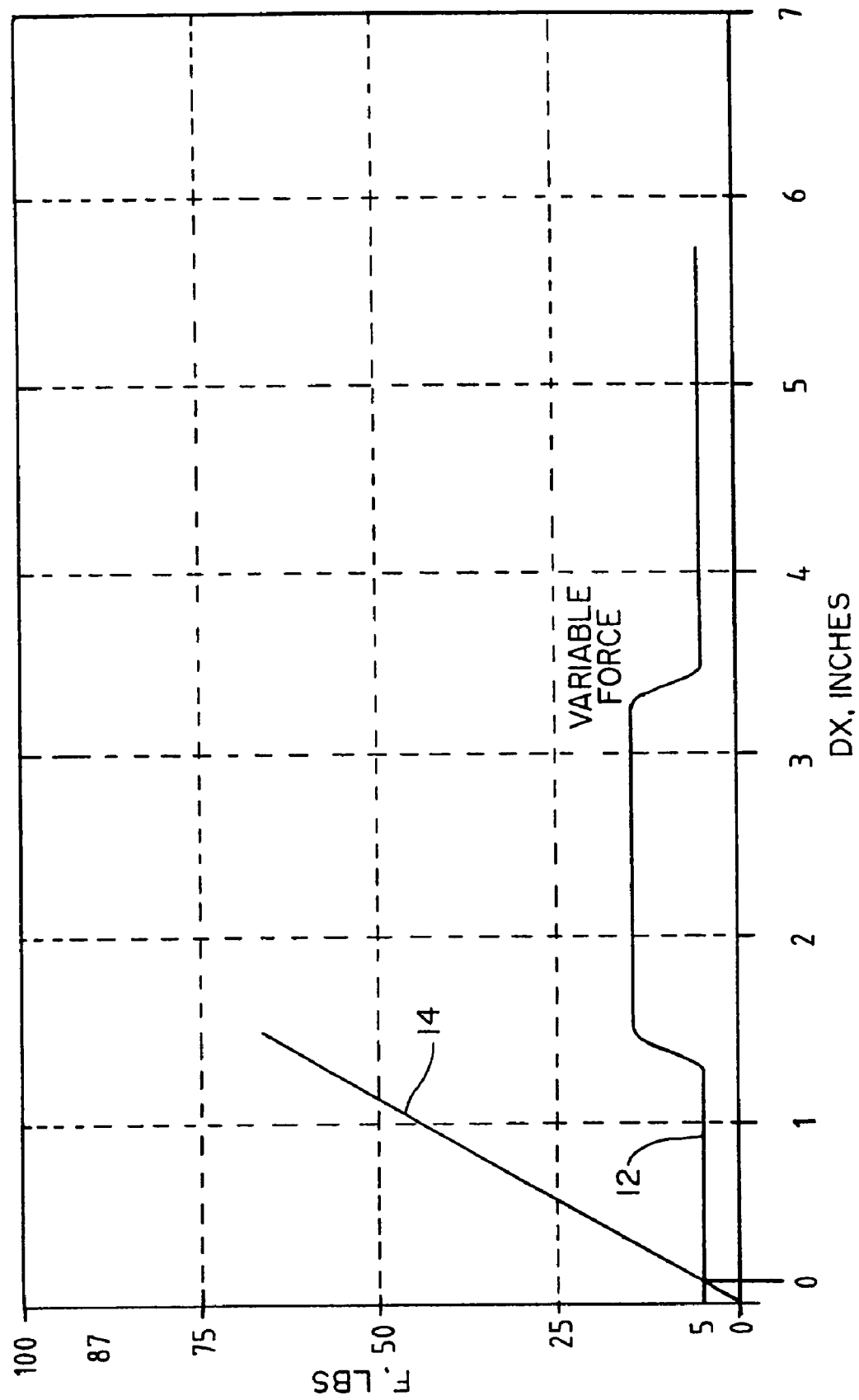
FIG. 37A shows a graph depicting an energy storage member force curve according to one embodiment.
Figure 37B:
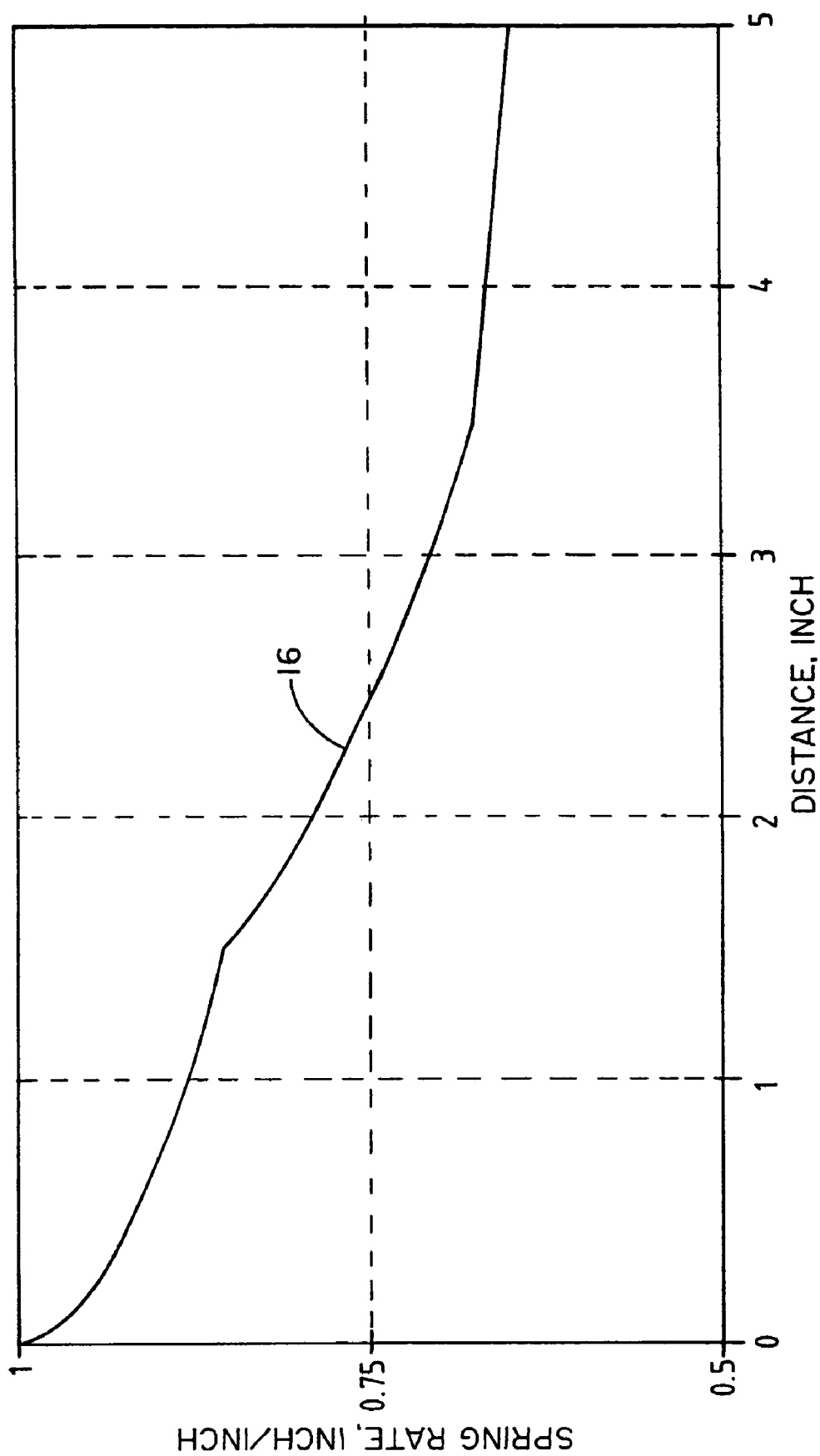
FIG. 37B shows a compression rate curve in accordance with one embodiment.

FIG. 37A-37B show graphs depicting exemplary spring force graphs in accord with another embodiment of the present system. FIGS. 37A-37B show a method of providing a variable force along an axis of motion.

FIG. 37A shows a spring curve 14. FIG. 37B shows a varying compression rate curve 14. In one embodiment, curve 14 can result from utilizing two or more springs having different spring rates. In other embodiments, curve 14 results from a cam having a profile with varying slopes and arcs along its surface. In combination, the compression rate of FIG. 37B applied to the spring curve 14 of FIG. 37A results in the variable axial force curve 12 depicted in FIG. 37A.

Additional Embodiments

The method and system described above can be embodied in various monitor positioning and support mechanisms.

Figure 3A:
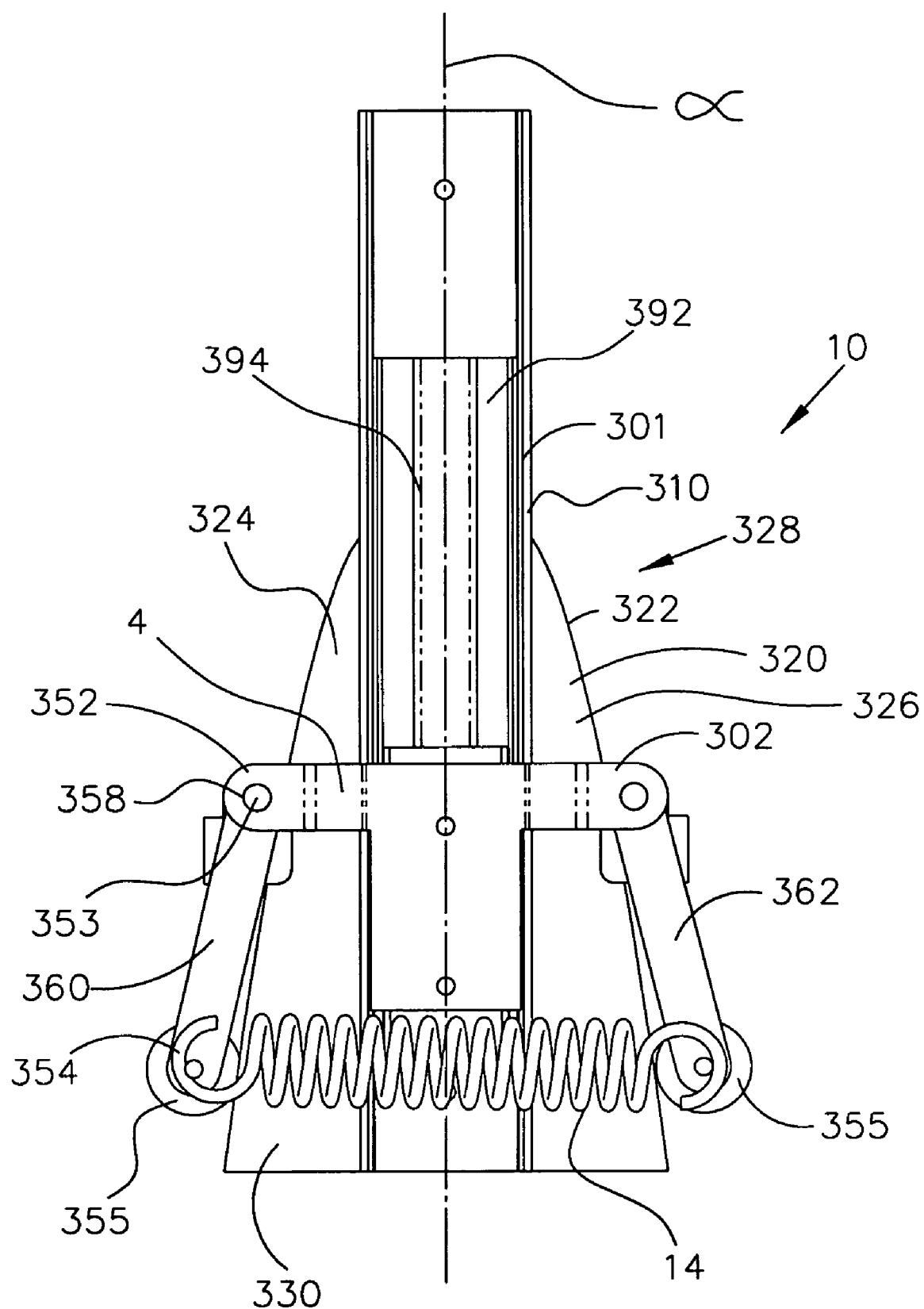
FIG. 3A shows a front view of the monitor support mechanism of FIG. 1A.

FIG. 3A shows further details of monitor support mechanism 10 of FIG. 1A. Monitor support mechanism 10 generally includes a first section 301, and a second section 302 which is slidably coupled to the first section along a direction of motion axis α which defines the path of motion. As discussed above, axis α can be vertical, angled horizontal, and 3-dimensional in various embodiments. First section 301 includes at least one cam 320. Second section 302 includes at least one cam follower 355, an energy storage member 14, such as a tension spring, and truck 4, which is movable along axis α of first section 301. As shown in FIG. 1A, a monitor is mountable to truck 4.

In this embodiment, cam 320 has a generally vertical orientation and generally faces the path of motion while spring 14 has a generally horizontal orientation relative to the path. This configuration helps provide for a relatively long range of travel of the two members with respect to each other since the spring can travel a great distance vertically while only expanding a relatively small distance laterally. Moreover, this configuration provides that the spring is expanded as it descends the path of motion so that it stores energy, and this stored energy is then converted into a lifting force as it ascends the path.

Monitor support mechanism 10, in one embodiment, includes two arms 360, 362. Each of the two arms 360, 362 extends from a proximal end 352 to a distal end 354, where cam follower 355 provides an interface between the cam 320 and energy storage member 14. Thus, as a load moves along axis α relative to cam 320, the cam pushes against cam follower 355 and expands spring 14, which causes an increase in the energy level and force level of the spring.

In this embodiment, each of the two arms 360, 362 is adapted to pivot at hinge points 358 about the proximal end 352, where the proximal end 352 is rotatably coupled with the truck 4. For example, the proximal end 352 includes a bore 353 therethrough, and disposed within the bore 353 is a mechanical fastener. The fastener and the bore 353 are sized to allow the arm 360, 362 to rotate freely about the fastener. In one alternative, the fastener and the bore 353 are sized to frictionally engage arm 360 or 362. The amount of frictional engagement can be varied to change the amount of force necessary to move the monitor. Friction provides stability for supporting a component and control when adjusting or moving the component. In one embodiment, a frictional force of approximately 2.5 pounds is provided. Depending on use of mechanism 10, and material incorporated therein, the frictional force can range accordingly.

Truck 4 is coupled to cam followers 355 via arm members 360, 362, and the truck is adapted to move along guide 392, which defines the monitor's path of motion and which is collinear with axis α. Truck, as used herein, includes the portion of the monitor support mechanism which couples to the load. In some embodiments, this includes a movable carriage, or any portion of the monitor support mechanism that couples with the load and moves along the guide 392.

In one embodiment, guide 392 comprises a track 394, which optionally includes a plurality of tracks. In one embodiment, track 394 is a drawer slide. The track 394 can be secured to the support 310, or the track 394 is integral with the support 310. For instance, track 394 can include at least one cut out within the support 310, which allows a portion extending from the truck 390 to ride therein. Alternatively, in another option; track 394 includes one or more track supports disposed therein, further facilitating translation of the truck 4. In yet another embodiment, guide 392 comprises a projection which is received by a portion of truck 4, and truck 4 is adapted to slide along the projection of guide 392.

Disposed between the two arms 360, 362 is the energy storage member such as spring 14. In one embodiment, spring 14 comprises at least one tension or expansion spring or other ascending force member. As used herein, an ascending force member is a member which increases its stored force (energy) as it is compressed or tensioned. Other types of ascending force members may be suitable for use with the monitor support mechanism 10, such as, but not limited to, torsion springs, gas springs, or compression springs. In this embodiment, spring 14 is oriented so that its force becomes stronger as it descends along the path relative to the cam and so that its force is directed generally normally or perpendicularly against the cam surface. Spring 14 is adapted to store energy and provide force to support a load from a weight-bearing component, such as a monitor, which is mounted on the truck 4.

In one embodiment, spring 14 is disposed adjacent to the distal end 354 of the two arms 360, 362. The spring 14 is mechanically retained to the two arms 360, 362, for example, by a mechanical component, or a bonded type of joint, such as a welded joint.

In one embodiment, cam 320 is coupled with a support 310. Cam 320 includes a cam surface 322, on which cam follower 355 rides, as further discussed below. The cam surface 322, in one embodiment, generally has a curved profile. The cam surface 322 is derived as described above in FIGS. 36A-37B.

In one embodiment, the monitor support mechanism 10 includes two opposed cams 324, 326, each having a cam surface 322, and defining distances 323a and 323b between axis α and the two opposed cam surfaces of cams 324, 326, respectively. The cam surface 322 of the two opposed cams 324, 326 extend from a first upper end 328 to a second lower end 330, where the cam surface 322 is generally curved from the first upper end 328 to the second lower end 330. The cam surface 322 is shaped, in one embodiment, such that the distances 323a and 323b gradually increase from the upper end 328 to the second lower end 330.

In one embodiment, cam surface 322 is shaped so that the distances 323a and 323b change at a relatively rapid rate at the upper end 328 of the cam and gradually decrease to a relatively lower expansion rate as the truck descends to the lower end 330 of the cam. This rate change corresponds directly to the amount of energy from the spring required to provide a counterbalance to a monitor on the truck. Thus, when the spring force is weak, the expansion rate is high, and as the spring force gets stronger, the expansion rate is slowed down for each unit of descent along the cam. By changing the rate of spring expansion, a constant or pre-determined level of force is applied parallel to the direction of axis α.

Thus, in one embodiment, the shape of cam surface 322 changes the rate of spring compression (or expansion) to provide a counterbalance force in the direction of motion. This changing rate of compression (or expansion) converts the ascending force curve of spring 14 into a constant force which is applied in the direction of motion. In other words, a force applied by the spring against the cam surface is converted by the cam surface into a reaction force against cam follower 355. In one embodiment, the reaction force includes a first reaction force component in the direction of the axis of motion α (herein called the axial force component), and a second reaction force component which is generally perpendicular to the first reaction force component (herein described as the perpendicular component). These first and second reaction force components vary depending on the slope of the cam surface.

In one embodiment, the shape of the cam surface is designed to keep the axial force component constant even as the perpendicular force component increases or decreases. Thus, the shape of cam surface 322, in combination with the spring 14, provides a constant axial force against truck 4 during movement of the truck and monitor in the axial (here, vertical) direction. In another embodiment, the shape of cam surface 322 in combination with the spring, provides a constant horizontal force during horizontal translation of the truck.

In one embodiment, exemplary cam surface 322 of the present embodiment provides an exemplary compression rate curve 5 of graph 36B. This compression rate results in the constant axial force curve 4 of graph 36A. Other embodiments provide variable, pre-determined forces along varying attitudes of travel, as depicted and described above regarding FIGS. 37A-37B. For instance, in some embodiments, the cam surfaces provide varying axial forces over the axial length of the cam. For instance, upper portion 328: of cam surface 322 could be shaped to provide for supporting a 20 lb. load, and lower portion 330 could be shaped to provide for supporting a 15 lb. load, or vice versa.

Variations on the cams discussed above are possible and are considered within the scope of the invention. For instance, the opposed cams 324, 326 can have different slopes, or slope in a different or opposite slope than that described above. In some embodiments, as will be discussed below, only a single cam is provided. In some embodiments, inward facing cams are utilized and the energy storage member is a compression spring. In other embodiments, more than one spring is utilized to provide a varying spring rate. Other embodiments include torsion springs and rotating cams.

The relative size of the components, such as the guide 392 and the truck 14, is modifiable such as to affect the amount of frictional force which occurs as the guide 392 and the truck 14 are moved relative to one another. The frictional force will change the amount of force necessary to move the truck 14, and any component mounted thereto. In the exemplary embodiment, truck 14 and guide 392 are adapted to provide a minimum of frictional force between the guide and the truck, consistent with the amount of "pause" or manual force a designer would want the user to exert in order to move a stationary, counterbalanced load. Typically, there is enough natural friction within the other components of the monitor support mechanism to stabilize the load.

Advantageously, in the present embodiment and in some other embodiments discussed below, the moving components of monitor support mechanism 10 (i.e., the pivot arms, the spring, the truck, the cam followers) are connected to each and move in the same general plane of motion. This provides that monitor support mechanism 10 can be manufactured to be a relatively thin mechanism.

In one embodiment, by changing the spring location or the distance between the cam surfaces, further details of which will be discussed below, one can change the force provided by the system. This provides that a user can mount monitors of varying size and weight on the mechanism over its life without having to replace the mechanism itself. Moreover, a manufacture can manufacture a mechanism of a single size and then adjust the single mechanism to fit a wide range of monitors without having to retool the assembly line.

For instance, in one embodiment, each of the two arms 360, 362 includes a spring hub or other attachment means which is adapted to retain the spring component 14 thereon. In the case of an adjustable mechanism, the cam surface is curved to provide maximum expected counterbalance, and load weight adjustments are made by changing the position of the spring component along arms 360 and 362 to increase or decrease the moment length (the length between the spring force and the pivot point 353). For instance, in one embodiment this is accomplished by moving a spring hub or other attachment means up or down along arms 360 and 362 to the various connection points.

Alternatively, in one embodiment a load weight adjustment can be accomplished by changing the spacing between the cam surfaces, details of which will be discussed below. For instance, either or both cams 324 and 326 could be coupled to support 310 so that a user could move the cam in a horizontal or lateral direction either in towards axis α or away from the axis. By moving the cam, the user would change the geometry of the system accordingly, which in turn would affect the force supplied by spring 14.

In some embodiments, the cam, truck, or other portion of mechanism 10 is connected to a motor which provides the moving force. Advantageously, since the present system utilizes the energy which is stored in the spring during its downward movement along the path to help lift the monitor as it ascends, the present system requires a user to only overcome a small frictional force to move even large monitors. Thus, an inexpensive small-load motor can be provided to move the monitor. In one embodiment, a button is provided to actuate the motor.

In some embodiments, monitor support mechanism 10 includes one or more of the features of other mechanisms described below. Accordingly, the details and features described in the other embodiments are incorporated herein by reference.

Figure 3B:
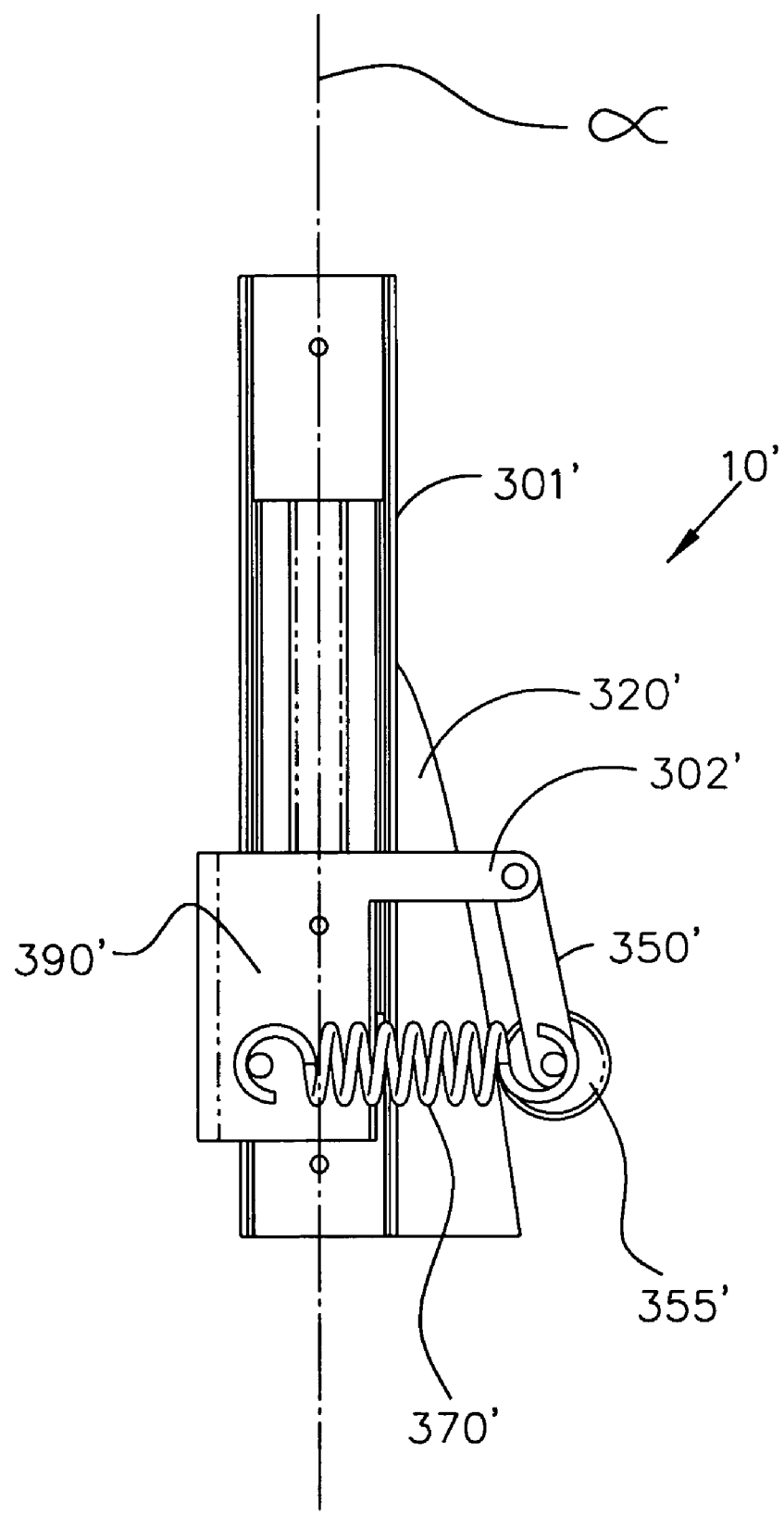
FIG. 3B shows a front view of a monitor support mechanism constructed in accordance with one embodiment.

FIG. 3B shows a monitor support mechanism 10' according to one embodiment of the present invention. Monitor support mechanism 10' generally includes a first section 301', and a second section 302' which is slidably coupled to the first section along a motion of direction axis a so as to define a path of motion. As discussed above, axis α can be vertical, angled, horizontal, and 3-dimensional in various embodiments. First section 301' includes a cam 320'. Second section 302' includes a cam follower 355' attached to the end of an arm 350', an energy storage member 370', such as a tension spring, and a truck 390', which is translatable along axis α of first section 301'.

Monitor support mechanism 10' is substantially similar to monitor support mechanism 10 and the discussion above is incorporated herein by reference. Monitor support mechanism 10' includes a single cam instead of a pair of opposing cams.

Figure 3C:
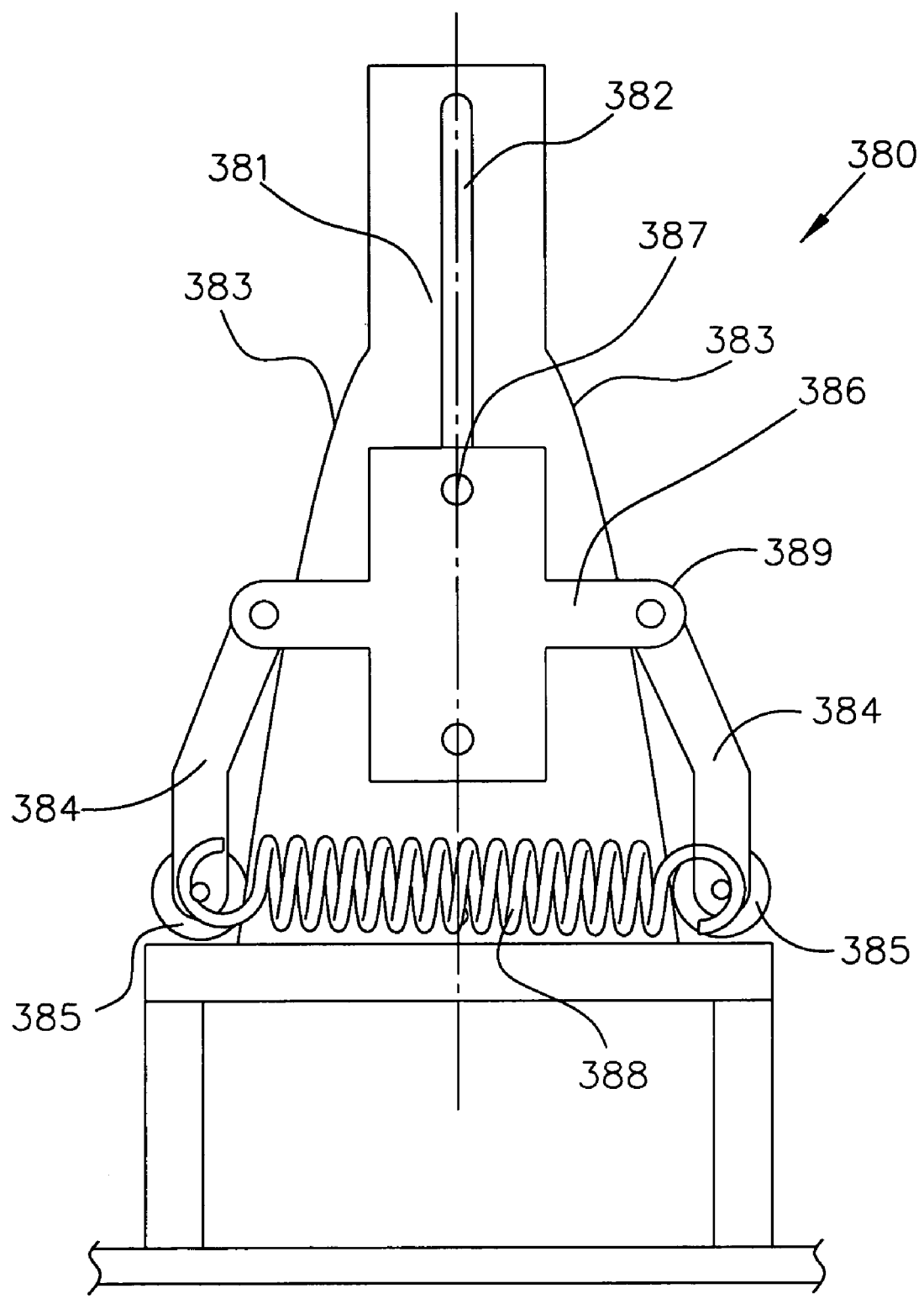
FIG. 3C is a front view illustrating a monitor support mechanism constructed in accordance with one embodiment.
Figure 3D:
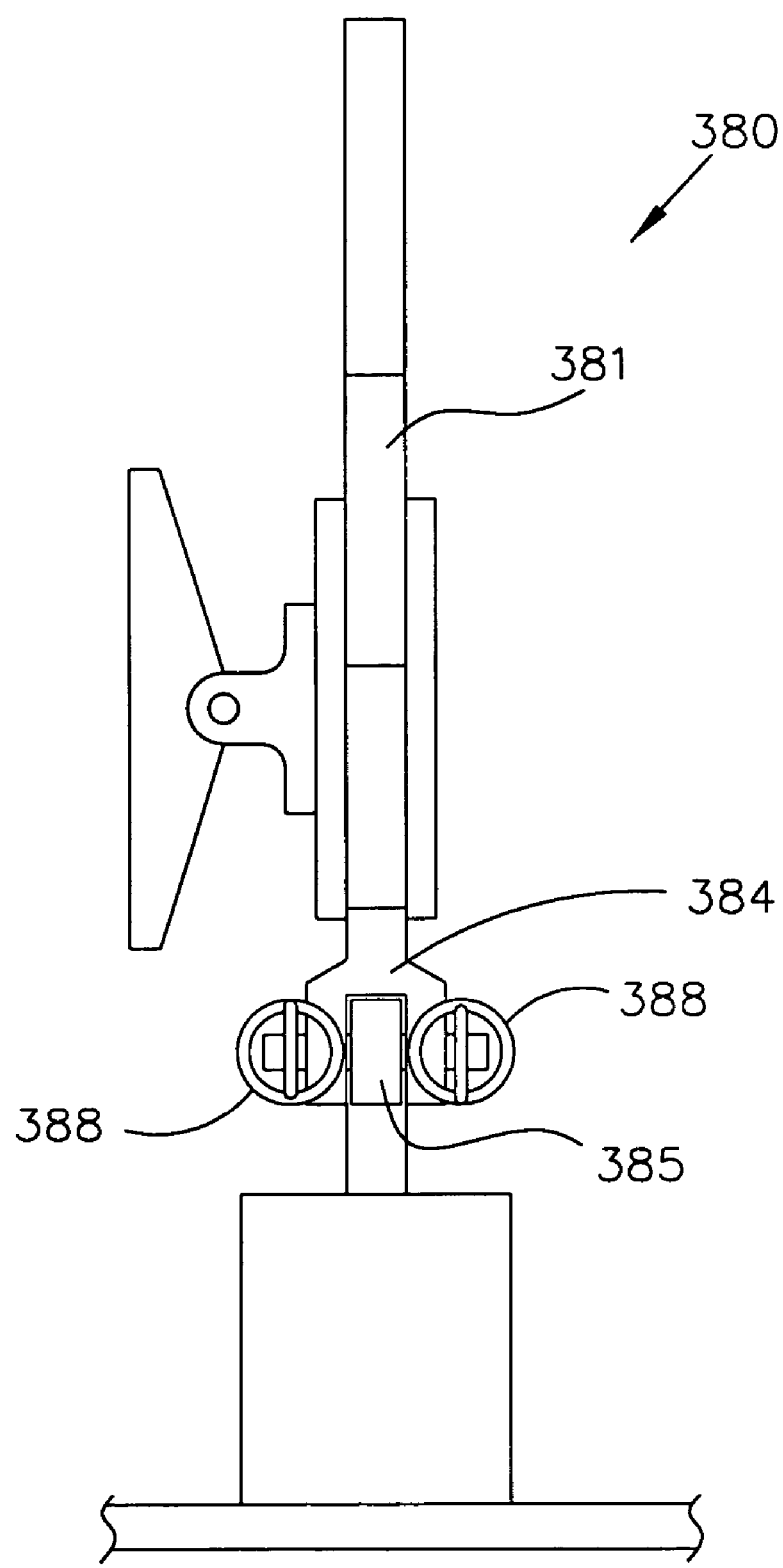
FIG. 3D is a side view of the monitor support mechanism of FIG. 3C.

FIGS. 3C and 3D illustrate a front and side view of a monitor support mechanism 380 according to one embodiment. One or more aspects of mechanism 380 are similar to mechanism 10 and will be omitted for the sake of clarity. In one embodiment, mechanism 380 includes a first section 381 a guide groove 382 and cams 383 integral therewith. A second section 389 of mechanism 380 includes one or more guide members 387 attached to a truck 386 for guiding the truck along groove 382. One or more arms 384 are coupled to truck 386 and have cam followers 385 attached to a distal end of the arms. An energy storage member, such as tension spring 388 is attached to each of arms 384 to force cam followers 385 against cam surfaces 383.

Referring to FIG. 3D, in this embodiment arm 384 bifurcates at its distal end and two springs 388 are utilized in mechanism 380. This provides support and balance for the mechanism.

In one embodiment, one or more of first section 381, truck 386, arms 384, cam followers 385, and/or spring 388 are made from a non-metallic material. For instance, in one embodiment first section 381 is an injection molded plastic member with groove 382 and cam 383 integrally molded with the body as one section. Likewise truck 386 can be injection molded. In various embodiments, the members are made from various plastics, plastic composites, polymers, fiberglass, and other non-metallic materials. In one embodiment, spring 388 is a fiberglass composite material. Advantageously, using such non-metallic material provides a lightweight, low-cost, mass producible mechanism.

Monitor support mechanism 10' generally includes a first section 301', and a second section 302' which is slidably coupled to the first section along a motion of direction axis α so as to define a path of motion. As discussed above, axis α can be vertical, angled, horizontal, and 3-dimensional in various embodiments. First section 301' includes a cam 320'. Second section 302' includes a cam follower 355' attached to the end of an arm 350', an energy storage member 370', such as a tension spring, and a truck 390', which is translatable along axis α of first section 301'.

Monitor support mechanism 10' is substantially similar to monitor support mechanism 10 and the discussion above is incorporated herein by reference. Monitor support mechanism 10' includes a single cam instead of a pair of opposing cams.

Figure 4A:
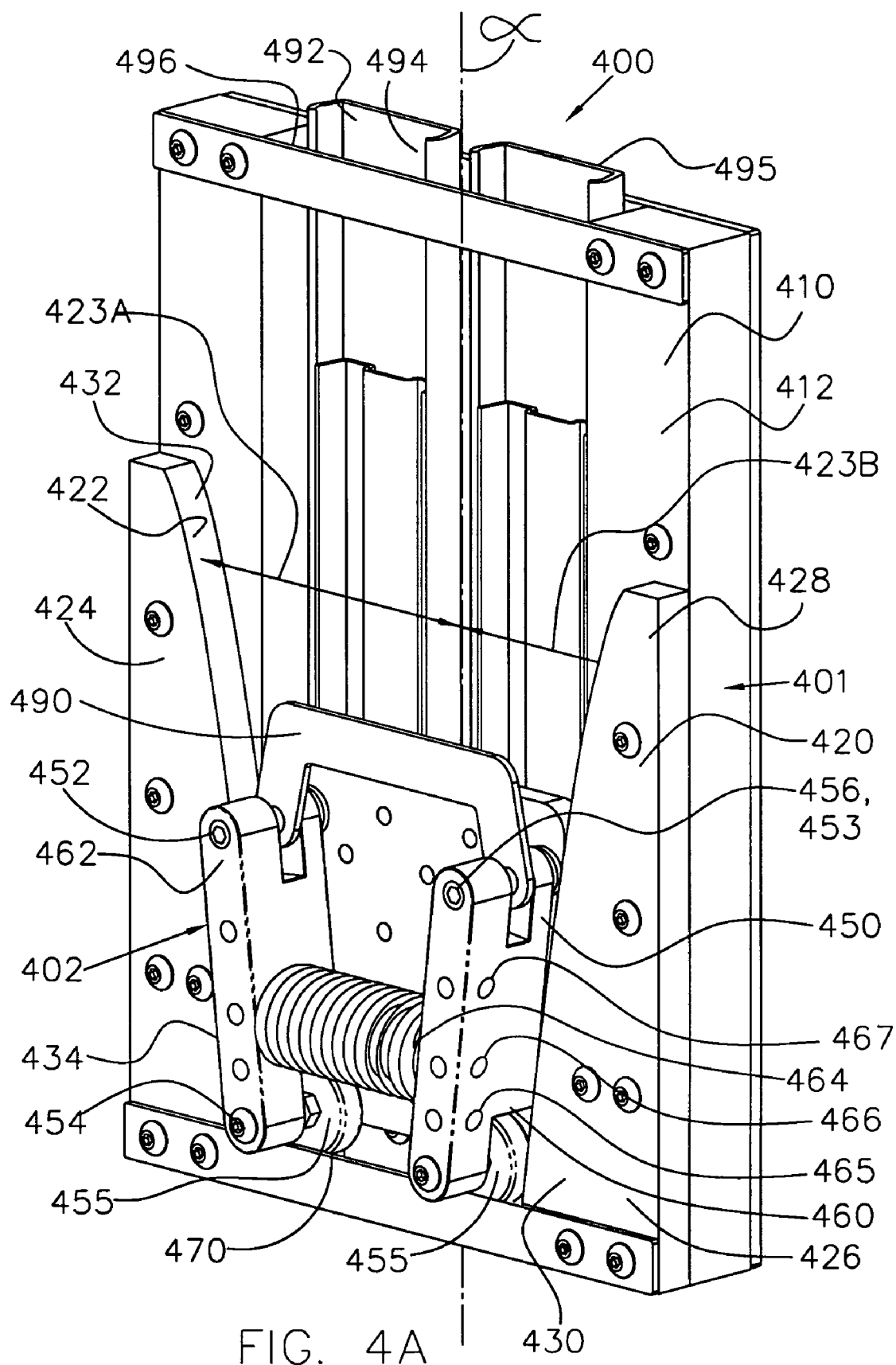
FIG. 4A is a perspective view illustrating a monitor support mechanism constructed in accordance with one embodiment.

FIG. 4A shows a monitor support mechanism 400 according to one embodiment.

Monitor support mechanism 400 generally includes a first section 401 and a second section 402. Second section 402 is slidably coupled to first section 401 along a path of motion defining a direction of motion axis α. In one embodiment, the direction of motion is a linear motion in a vertical direction. Other embodiments provide for a horizontal direction of motion. Other attitudes between horizontal and vertical are also within the scope of the present system. Moreover, some embodiments provide a 3-dimensional axis of motion. First section 401 includes at least one cam 420. Second section 402 includes at least one arm 450, an energy storage member 470, such as a compressive spring, and a truck 490, which moves along axis α of first section 401.

In this embodiment, cam 420 has a generally vertical orientation and generally faces the path of motion while energy storage member 470 has a generally horizontal orientation relative to the path. This configuration helps provide for a relatively long range of travel of the two members with respect to each other since the spring can travel a great distance vertically while only compressing a relatively small distance laterally.

Cam 420 works in conjunction with a cam follower 455 attached to arm 450. Disposed at the distal end 434 of arm 450, cam follower 455, such as a bearing, is adapted to ride on cam 420. In various embodiments, cam followers 455 are wheels. In some embodiments, the cam follower is the distal portion of arm 450 riding directly against the cam surface.

In one embodiment, the at least one cam 420 is coupled with a support 410. The at least one cam 420 includes a cam surface 422, on which the at least one arm 450 rides, as further discussed below. The cam surface 422, in one embodiment, generally has a curved profile. Optionally, cam surface 422 includes multiple cam profiles. The cam surface 422 is derived, as described above regarding FIGS. 36A-37B.

In one embodiment, the monitor support mechanism 400 includes two opposed cams 424, 426, each having a cam surface 422, and defining distances 423*a* and 423*b* between axis α and the two opposed cams 424, 426, respectively. The cam surface 422 of the two opposed cams 424, 426 extends from a first upper end 428 to a second lower end 430, where the cam surface 422 is generally curved from the first upper end 428 to the second lower end 430. The cam surface 422 generally faces towards axis α and is a varying distance away from the axis while not intersecting the axis. In one or more embodiments, this helps to provide a scalable design since the monitor support mechanism as shown can be lengthened or shortened in the axial direction without having to expand laterally or have additional supporting members added to the system.

The cam surface 422 is shaped, in one embodiment, such that the distances 423*a* and 423*b* gradually decrease from the upper end 428 to the second lower end 430. Optionally, the cam surface 422 is adapted to adjust the load on the energy storage member 470 as the energy storage member 470 becomes more compressed.

In one embodiment, cam surface 422 is shaped so that the distances 423*a* and 423*b* change at a relatively rapid rate at the upper end 428 of the cam and gradually decrease to a relatively lower compression rate as the truck descends to the lower end 430 of the cam.

Thus, in one embodiment, the shape of cam surface 422 changes the rate of spring compression to provide a counterbalance force on a monitor in the direction of motion of the monitor.

Similarly to mechanism 10, in one embodiment, the shape of the cam surface 422 is designed to keep the axial (here, vertical) force component constant even as the perpendicular force component increases or decreases. Thus, the shape of cam surface 422, in combination with the energy storage member 470, provides a constant axial force against truck 490 during translation of the truck and monitor in the axial direction.

In one embodiment, the shape of cam surface 422 in combination with the energy storage member 470, provides a constant horizontal force during horizontal translation of the truck. For instance in one embodiment, exemplary cam surface 422 of the present embodiment provides an exemplary compression rate curve 5 of graph 36B. This compression rate results in the constant axial force curve 4 of graph 36A. Other embodiments provide variable, predetermined forces along varying attitudes of travel, as depicted and described above regarding FIGS. 37A-37B. For instance, in some embodiments, the cam surfaces provide varying axial forces over the axial length of the cam. For instance, upper portion 432 of cam surface 422 could be shaped to provide for supporting a 20 lb. load, and lower portion 434 could be shaped to provide for supporting a 15 lb. load, or vice versa.

In one embodiment, monitor support mechanism 400, includes two movable arms 450 such as arms 460, 462. Each of the two arms 460, 462 extends from a proximal end 452 to a distal end 454. Each of the two arms 460, 462 is adapted to pivot at hinge points about the proximal end 452, where the proximal end 452 is rotatably coupled with the truck 490. For example, the proximal end 452 includes a bore 453 therethrough, and disposed within the bore 453 is a mechanical fastener 456. The fastener 456 and the bore 453 are sized to allow each arm 460, 462 to rotate freely about the fastener 456. In one alternative, the fastener 456 and the bore 453 are sized to frictionally engage the arms 460, 462. The amount of frictional engagement can be varied to change the amount of force necessary to move the monitor support mechanism. For example, friction provides stability for supporting a component, and control when adjusting or moving the component. In the exemplary embodiment, a frictional force of approximately 2.5 pounds is provided. Depending on use of monitor support mechanism 400, and material incorporated therein, the frictional force can range accordingly.

Disposed between the two arms 460, 462 is the force or spring component 470. In one option, the spring component 470 is disposed adjacent to the distal end 454 of the two arms 460, 462. The spring component 470 is mechanically retained to the two arms 460, 462, for example, by a mechanical component, or a bonded type of joint, such as a welded joint. Optionally, each of the two arms 460, 462 includes a spring hub 464 which can be attached at either connection points 465, 466, or 467 along arms 460 and 462. Spring hub 464 is adapted to retain the spring component 470 thereon.

In one embodiment, the monitor support mechanism 400 is an adjustable force mechanism. In the case of an adjustable mechanism, the cam surface 422 is curved to provide a maximum expected counterbalance, and load weight adjustments are made by changing the position of the spring component along arms 460 and/or 462 to increase or decrease the moment length (the length between the spring force and the pivot point 453). For instance, in one embodiment this is accomplished by moving spring hub 464 up or down along arms 460 and 462 to the various connection points 465, 466, or 467. The connection points shown are exemplary and fewer or more may be provided on the arms 460 and 462.

Alternatively, in one embodiment, a load weight adjustment can be accomplished by changing the spacing between the cam surfaces. Thus, either or both cams 424 and 426 could be coupled to support 410 so that a user could move the cam in a horizontal direction either in towards axis α or away from the axis. By moving the cam, the user would change the geometry of the system accordingly, which in turn would affect the force supplied by energy storage member 470.

Advantageously, in the present embodiment and in other embodiments discussed above and below, the moving components of monitor support mechanism 400 (i.e., the pivot arms, the spring, the truck, the cam followers) are connected to each and move in the same general plane of motion. This provides that monitor support mechanism 400 can be manufactured to be a relatively thin mechanism.

Figure 4B:
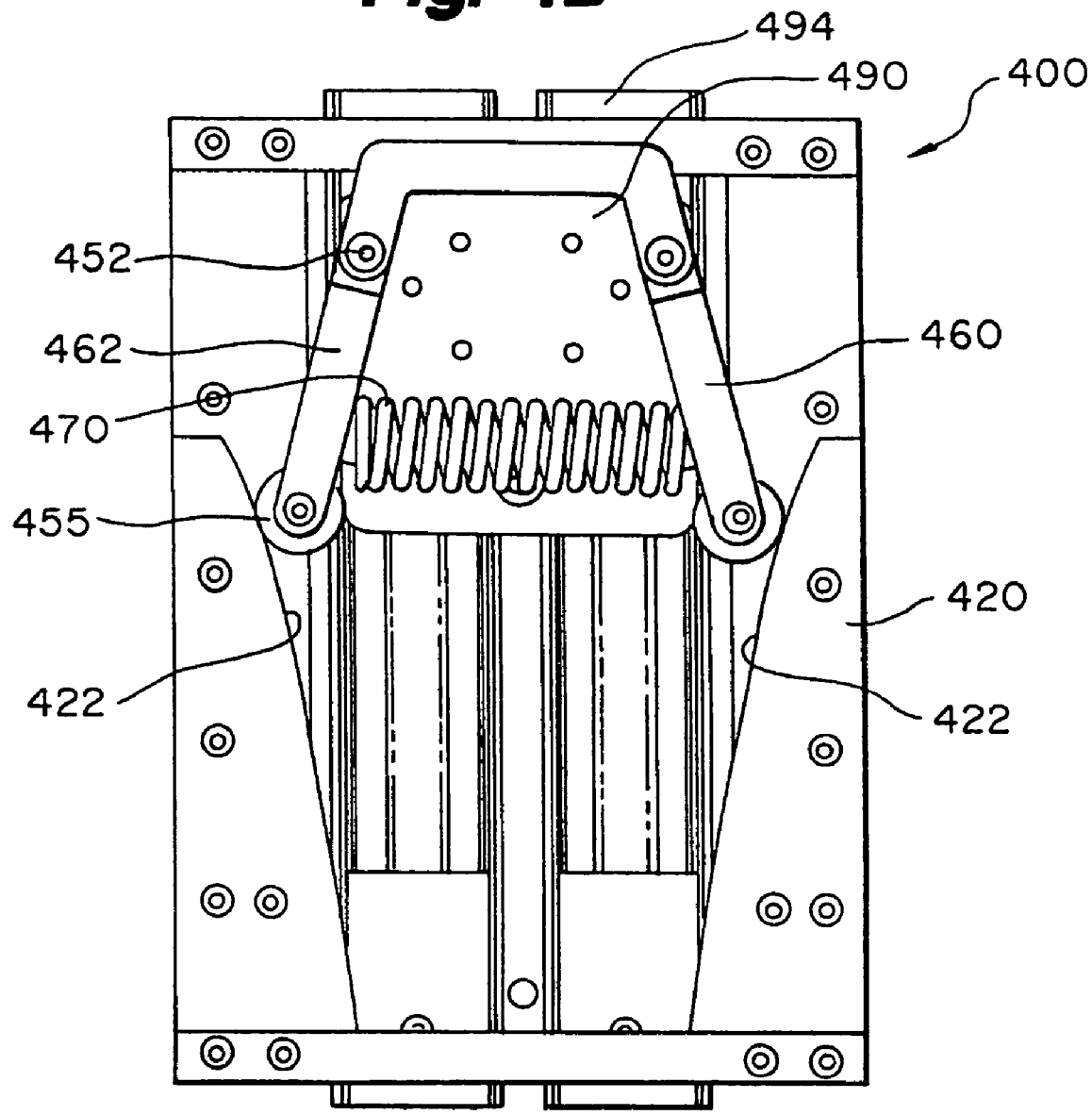
FIG. 4B is a front view of the monitor support mechanism of FIG. 4A.

Referring to FIGS. 4A and 4B, in one exemplary use of monitor support mechanism 400, the position of a monitor can be adjusted. In this example, the monitor would be moved in a vertical direction, other embodiments, to be discussed below, move the monitor along a horizontal path, a path angled between vertical and horizontal, a curved path, and other paths having 1, 2, 3, dimensions and having 1, 2, or 3 degrees of freedom.

One method, for example, includes coupling pivot members 460 and 462 at hinge points 453 on a truck 490, each pivot member 460 and 462 extending from a proximal end 452 at the hinge points 453 to a distal end 454. A compression spring 470 is disposed between the pivot members 460 and 462, where the compression spring 470 is disposed adjacent to the distal ends 454 of the pivot members 460 and 462. In addition, a cam follower 455 is disposed on the distal end 434 of each of the pivot members 460 and 462. In various embodiments, the cam follower includes a bearing, a wheel, and a slide with, for example, a coating thereon.

The truck 490 is movably coupled with an axial guide 492 and coupled to the load, such as a flat screen monitor. To move the monitor, a portion of the truck 490 or the monitor is grasped, and force is applied to overcome the frictional restraint of the components of the mechanism, which can be around 2.5 pounds, by way of example. (The friction is easily adjustable by tightening or loosening various components or using different elements having a given frictional component). As each cam follower 455 slides against a cam surface 422, the compression spring 470 becomes either compressed, as shown in FIG. 4A, or expands, as shown in FIG. 4B, for example.

In the exemplary embodiment, cam surface 422 is shaped so that the force applied by truck 490 on the load is approximately equal to the force of the load itself all along the axial range of the cam. Thus, wherever the load is positioned along guide 492, it is balanced. To move the load, such as a component, the frictional restraint must be overcome, but wherever the load is finally moved to it will then be balanced again. Thus, large and small loads are easily and smoothly adjustable using the present system. In other embodiments, a pre-determined variable force can be achieved by changing the cam profile and/or the type of spring.

In some embodiments, mechanism 400 includes one or more of the features of other mechanisms described above and below. Accordingly, the details and features described in the other embodiments are incorporated herein by reference.

FIGS. 5A and 5B illustrate a monitor support mechanism 500 in accord with one embodiment. FIG. 5A shows a front view and FIG. 5B shows a side view of monitor support mechanism 500. The monitor support mechanism 500 generally includes a first section 501 and a second section 502. Second section 502 is slidably coupled to the first section along a path of motion defined by a direction of motion axis α. In this embodiment, motion axis α is a linear, vertical axis. Other embodiments include a horizontal axis and an axis somewhere between vertical and horizontal. Some embodiments have a 3-dimensional axis. First section 501 includes a cam 520. Second section 502 includes a cam follower 555 coupled to an arm 550, and a truck 590, which is translatable along axis α of first section 501. Arm 550 is secured to the truck 590 and the arm itself comprises an energy storage member such as a leaf spring. The distal end 570 of the spring component or arm 550 resists movement thereto. The spring component provides the spring force applied by cam follower 555 to the cam 520. The spring component is adapted to provide energy to counterbalance a load from a component, such as a monitor, which is mounted on the truck 590.

Cam 520 is coupled with a support 510. The cam 520 includes a cam surface 522, on which the distal end 570 of the arm 550 rides. The cam surface 522, in one embodiment, generally has a curved profile. In one embodiment, the cam surface 522 is shaped to provide for a balancing of forces, as discussed above.

The cam surface 522 of the cam extends from a first upper end 528 to a second lower end 530, where the cam surface 522 is generally curved from the first upper end 528 to the second lower end 530. The cam surface 522 is shaped, in one embodiment, such that a distance 523 between the cam surface and the axis α gradually increases from the upper end 528 to the second lower end 530. In one embodiment, cam surface 522 provides a constant force in the axial direction axis α. In another embodiment, the surface provides a pre-determined variable force along the axis α.

In one embodiment, cam surface 522 is shaped so that the distance 523 changes at a relatively rapid rate at the upper end 528 of the cam and gradually decreases to a relatively lower rate as the truck descends to the lower end 530 of the cam. This rate change corresponds directly to the amount of energy from the spring required to provide a counterbalance to a load on the truck. Thus, when the leaf spring force is weak, the deflection rate is high, and as the spring force gets stronger, the deflection rate is slowed down for each unit of descent along the cam. By changing the rate of leaf spring deflection, a constant or pre-determined level of force is applied by the spring along axis α via the cam.

Thus, the shape of cam surface 522 changes the rate of leaf spring deflection to provide a counter force to a load. This changing rate of deflection converts the ascending force curve of spring component 550 into a constant force in one embodiment. Other embodiments provide a variable force. Thus, the cam surface 522 in combination with the energy storage member or leaf spring arm 550, provides a pre-determined force in the motion of direction during movement of the truck along that direction of motion. In general, other details of the profile shape of cam surface 522 are the same as cam surface 322, as discussed above and incorporated herein by reference.

The cam 520 works in conjunction with the arm 550. Disposed at the distal end 570 of arm 550 is a cam follower, such as a portion of the end of the arm, a bearing, or wheel 555 which is adapted to ride on cam 520. In one embodiment, the monitor support mechanism 500 includes two opposed cams, each having a cam surface 522.

The truck 590 is adapted to translate along a guide 592. In one embodiment, the guide 592 comprises the outer perimeter of the sides of support 510. In other embodiments, a track, such as a drawer glide can be secured to the support, or be integral with the support.

In one embodiment, monitor support mechanism 500 includes a knob 560 or other forcing member which can be used to vary the pre-load on spring component 550. Knob 560 can be tightened to increase the pre-load on the spring and thus provide for a higher final weight load, or it can be loosened to provide for a lower weight load.

In some embodiments, mechanism 500 includes one or more of the features of other mechanisms described above and below. Accordingly, the details and features described in the other embodiments are incorporated herein by reference.

Figure 6:
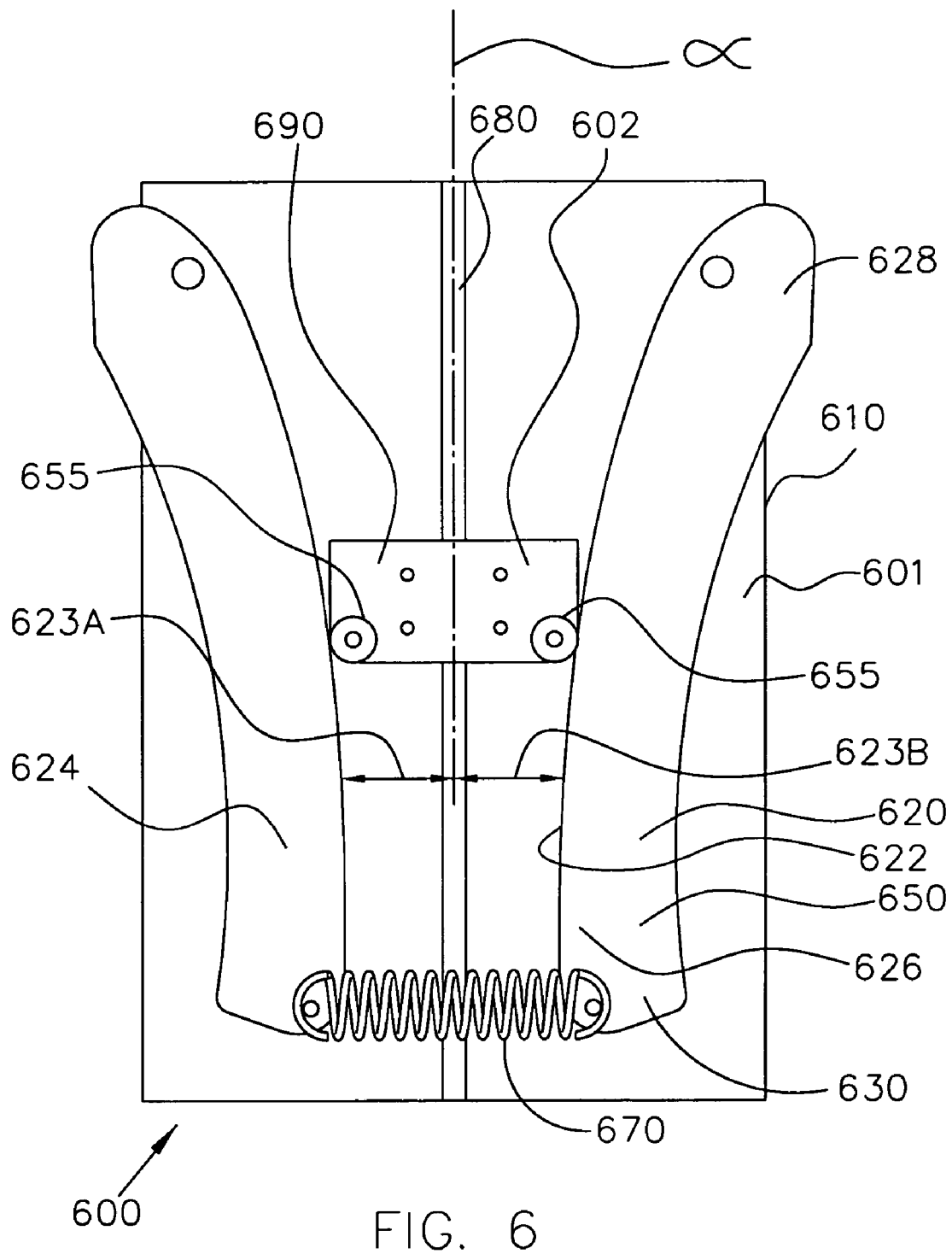
FIG. 6 is a front view illustrating a monitor support mechanism constructed in accordance with one embodiment.

FIG. 6 shows a monitor support mechanism 600 according to one embodiment. Monitor support mechanism 600 generally includes a first section 601 and a second section 602. Second section 602 is slidably coupled to the first section along a path of motion defining a linear axis α. First section 601 includes a cam 620. Second section 602 includes a truck 690 which is translatable along motion of direction axis α of first section 601 along a guide 680.

In one embodiment, cam 620 includes a cam arm 650, which is rotatably coupled to a support 610 and has a cam surface 622. In one embodiment, the monitor support mechanism 600 includes two opposed cams 624, 626, each having a cam surface 622, and defining distances 623a and 623b between axis α and the two opposed cam surfaces 624, 626, respectively. The cam surfaces 622 of the two opposed cams 624, 626 are generally curved from the first upper end 628 to the second lower end 630. The cam surface 622 is shaped, in one embodiment, such that the distances 623a and 623b gradually decrease from the upper end 628 to the second lower end 630.

An ascending energy storage member, such as a tension spring 670, is coupled to the cam and forces cam 620 into contact with a cam follower such as wheel 655 on truck 690.

Generally, cam surface 622 has a profile analogous to cam surface 322 of monitor support mechanism 10. Tension spring 670 of monitor support mechanism 600 provides an analogous axial force via cams 624 and 626 as the expansion spring 14 of monitor support mechanism 10. Other details of monitor support mechanism 600 are substantially similar to the other monitor support mechanisms discussed herein and operates by generally the same principles, and the descriptions above are incorporated herein by reference.

In this embodiment, the movement of truck 690 down axis α causes cam followers 655 to force cams 624 and 626 to rotate accordingly. As the cams (or cam) rotate, energy storage member or spring 670 is stretched and the energy storage member provides an opposing force to the action of the cam followers. The spring force is converted by the cam surface into vertical (axial) and horizontal (perpendicular) components. In one embodiment, the shape of the cam surfaces is adapted so that the axial component force of the cams on cam followers 655 is constant as the truck translates up and down guide 680, even as the perpendicular component of the force changes. In one embodiment, the shape of the cam surfaces is adapted so that the axial component force of the cams on cam followers 655 is variable as the truck translates up and down guide 680, even as the perpendicular component of the force changes.

In some embodiments, mechanism 600 includes one or more of the features of other mechanisms described above and below. Accordingly, the details and features described in the other embodiments are incorporated herein by reference.

Figure 7:
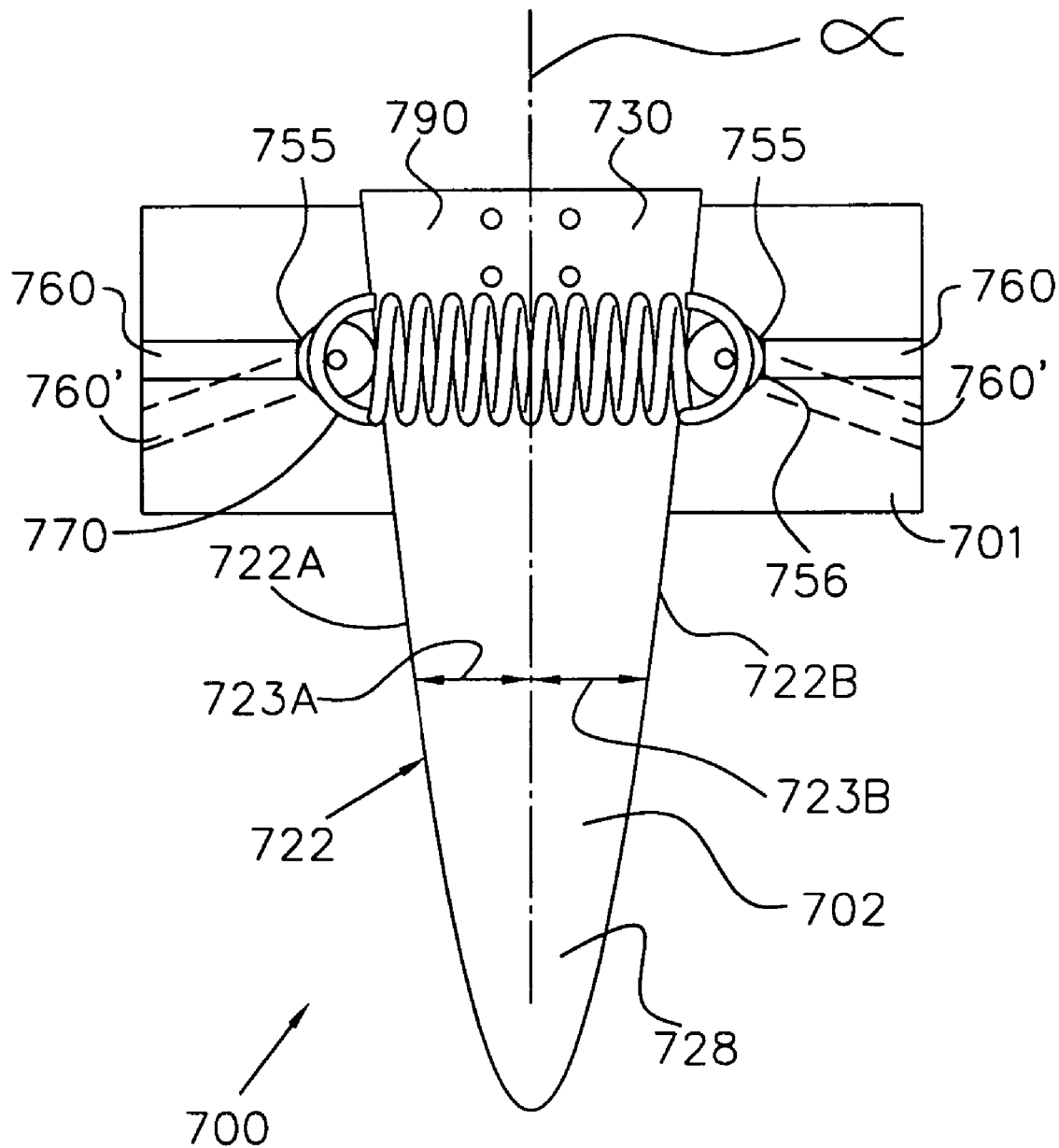
FIG. 7 is a front view illustrating a monitor support mechanism constructed in accordance with one embodiment.

FIG. 7 shows a monitor support mechanism 700 according to one embodiment. Monitor support mechanism 700 generally includes a first section 701, and a second section 702 which is slidably coupled to the first section along a path of motion which defines a direction of motion axis α. As discussed above, axis α can be vertical, angled, horizontal, and 3-dimensional in various embodiments. Second section 702 includes a cam 720 and a truck 790, which is translatable along axis α of first section 701.

In this embodiment, cam 720 includes a pair of outward facing cam surfaces 722a and 722b, located a varying distance 723a and 723b from axis α, respectively. A force member 770, such as a tension spring, is coupled at either end to a pair of cam followers such as wheels or bearings 755. The cam followers are coupled to movable members 756 which are slidably coupled within cam follower guides 760. In one embodiment, guides 760 are generally horizontally oriented as shown in FIG. 7. In one embodiment, the guides are angled downward at an orientation generally normal to the cam surface of cam 720. These are shown as guides 760'. Force member 770 forces wheels 755 into contact with cam surface 722. As truck 790 is translated up and down axis α, cam surfaces 722a and 722b force wheels 755 to translate within guide member 760, thus changing the compression or tension in force member 770. In one embodiment, a guide such as a track is used to keep cam 720 in a straight, axial position.

In one embodiment, cam surface 722 is curved so that the distances 723a and 723b change at a relatively rapid rate at a first lower end 728 of the cam and gradually decrease to a relatively lower rate as the truck moves to a second upper end 730 of the cam. This rate change corresponds directly to the amount of energy from the spring required to provide a counterbalance to a load on the truck. Thus, when the spring force is weak, the spring expansion rate is high, and as the spring force gets stronger, the spring expansion rate is slowed down for each unit of ascent of the cam. By changing the rate of leaf spring expansion, a constant or pre-determined variable level of vertical (or other axial) force is applied by the spring along axis α via the cam, even as the horizontal (or other perpendicular) force component increases or decreases.

In one embodiment, one or more members of mechanism 700 are plastics, polymerics, or other non-metallic composite materials. In some embodiments, another cam such as cam 790 is mounted to the back side of section 701 and the cams are coupled together. This helps provide stability and guide the cams as they move.

In some embodiments, monitor support mechanism 700 includes one or more of the features of other mechanisms described above and below. Accordingly, the details and features described in the other embodiments are incorporated herein by reference.

Figure 8A:
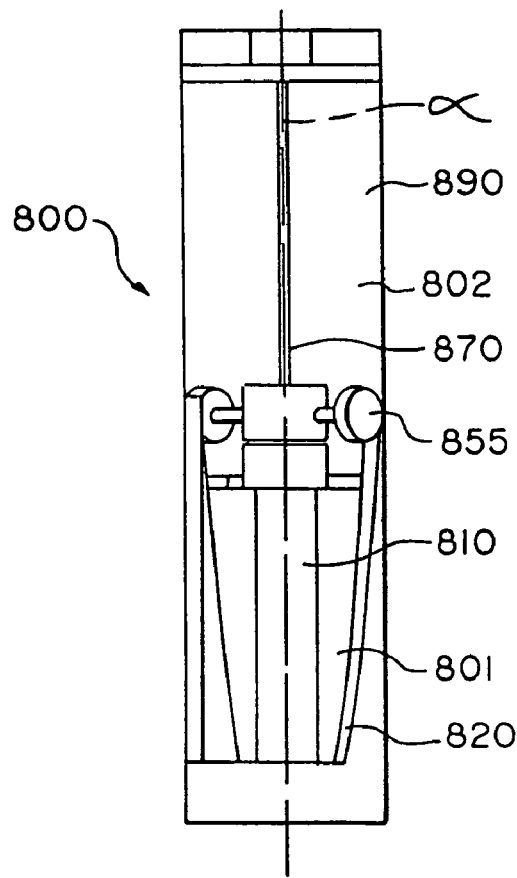
FIG. 8A shows a front view of a monitor support mechanism constructed in accordance with one embodiment.
Figure 8B:
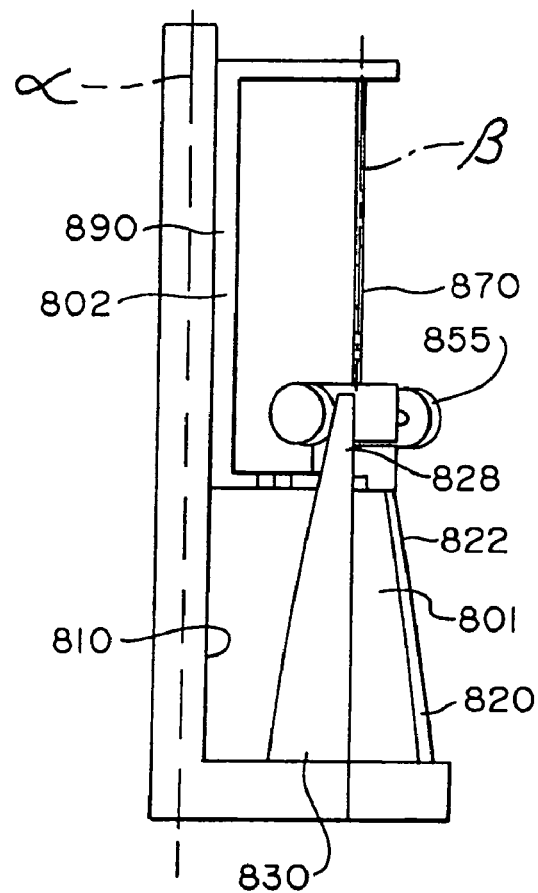
FIG. 8B shows a side view of the monitor support mechanism of FIG. 8A.

FIGS. 8A and 8B show a front and side view respectively of a monitor support mechanism 800 according to one embodiment. Monitor support mechanism 800 generally includes a first section 801, and a second section 802. Second section 802 is slidably coupled to the first section along a path of motion which defines a direction of motion axis α, and rotatably coupled around an axis β. As discussed above, axis α can be vertical, angled, horizontal, and 3-dimensional in various embodiments. First section 801 includes a cam 820. Second section 802 includes a force member such as torsion bar spring 870, and a truck 890, which is translatable along axis α of first section 801 along a guide such as track 810.

In this embodiment, cam 820 includes a cam surface 822 which lies in a generally circular or curved position around axis β, which in this embodiment is parallel to the motion of direction axis α. Force member 870 forces cam followers such as wheels 855 into contact with cam surface 822. As truck 890 is translated up and down axis α, cam surface 822 forces wheels 855 to rotate around axis β, thus changing the tension in force member 870.

In one embodiment, cam surface 822 is shaped so that the spring tension rate changes at a relatively rapid rate at a first upper end 828 of the cam and gradually decreases to a relatively lower rate as the truck moves to a second lower end 830 of the cam. This rate change corresponds directly to the amount of energy from the torsion spring required to provide a counterbalance to a load on the truck. Thus, when the spring force is weak, the spring tension rate is high, and as the spring force gets stronger, the spring tension rate is slowed down for each unit of ascent of the cam. In one embodiment, by changing the rate of spring expansion, a constant or predetermined level of vertical or other axial force is applied by the spring along axis β via the cam, even as the horizontal force component increases or decreases.

In general, other details of the profile shape of cam surface 822, and other details of monitor support mechanism 800 are the same as other cam surfaces and monitor support mechanisms discussed above, which are incorporated herein by reference.

Figure 9A:
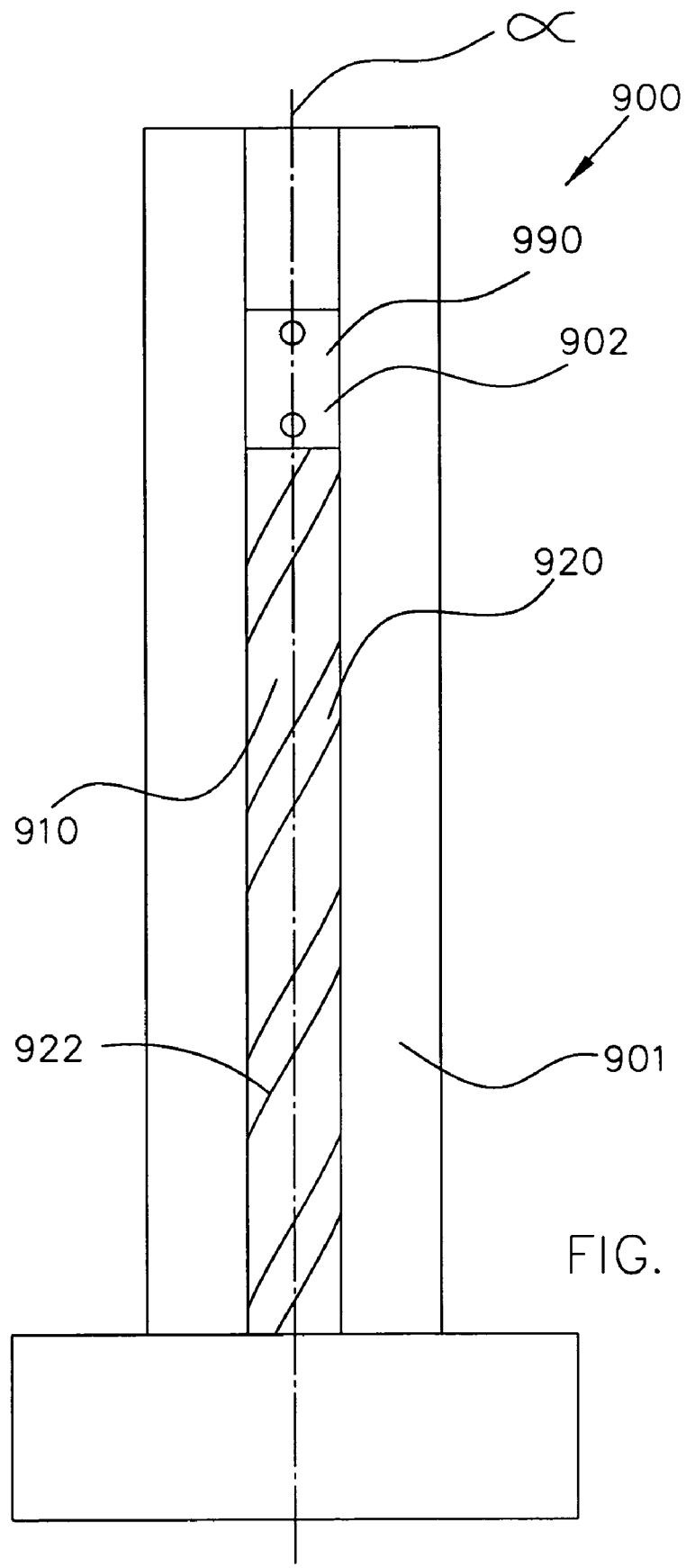
FIG. 9A shows a front view of a monitor support mechanism constructed in accordance with one embodiment.
Figure 9B:
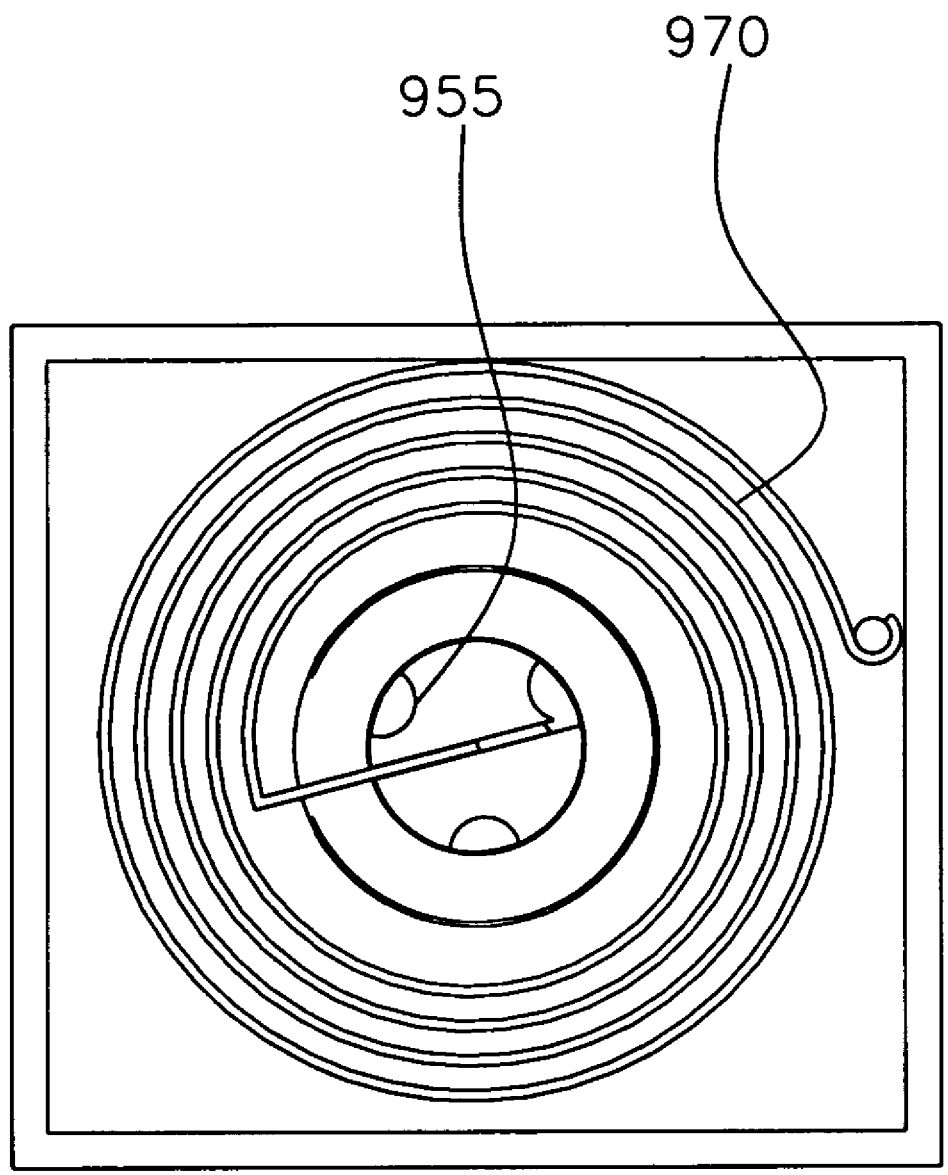
FIG. 9B shows a top view of the monitor support mechanism of FIG. 9A.
Figure 9C:
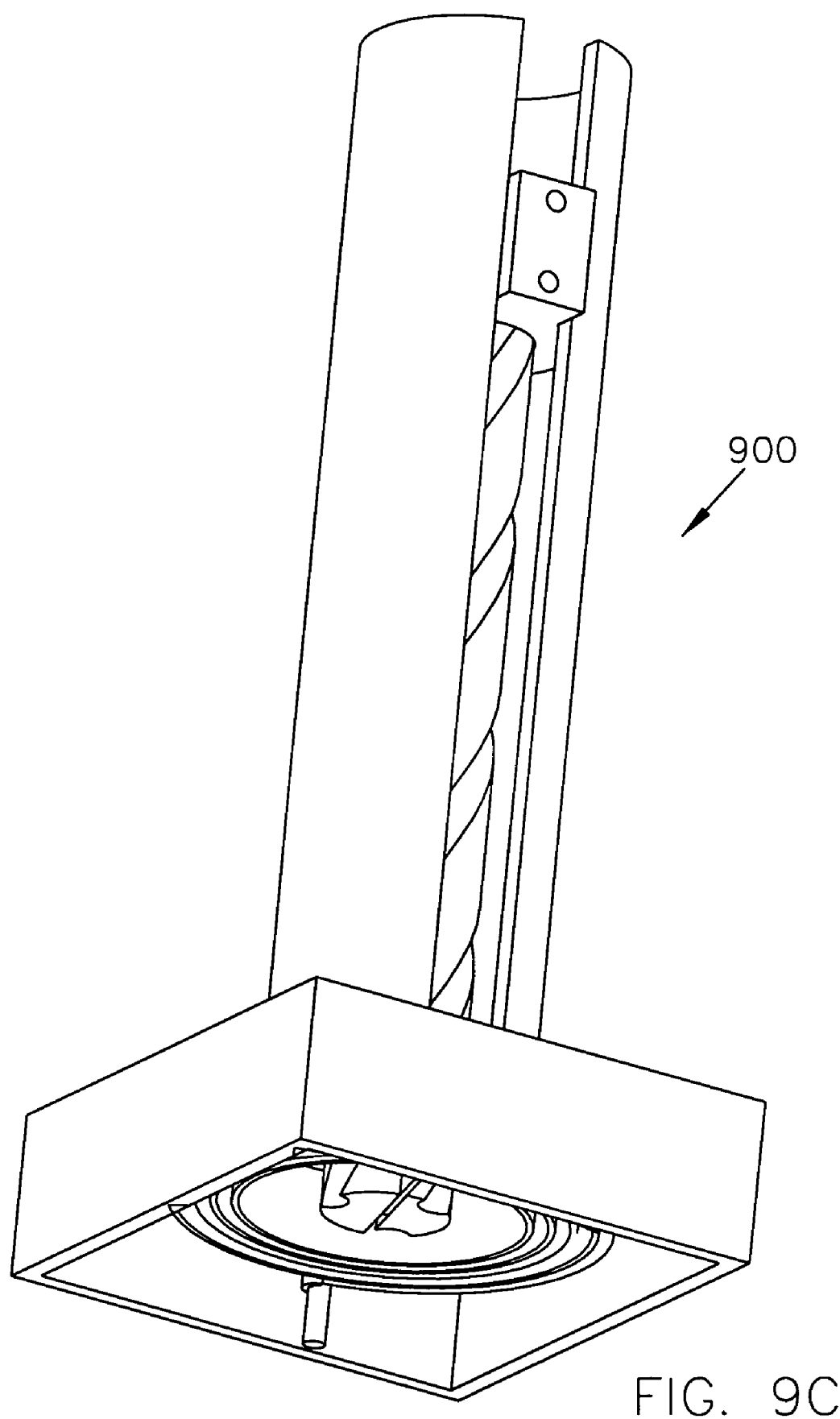
FIG. 9C shows a perspective view of the monitor support mechanism of FIGS. 9A and 9B.

FIGS. 9A, 9B and 9C show a front, a top and a perspective view respectively of a monitor support mechanism 900 according to one embodiment. Monitor support mechanism 900 generally includes a first section 901, and a second section 902 which is slidably coupled to the first section along a path of motion which defines a linear axis α. First section 901 includes a cam 920. Second section 902 includes a force member such as coil spring 970, and a truck 990, which is translatable along axis α of first section 901.

In this embodiment, cam 920 includes a cam surface 922 which lies in a curved configuration around axis α. As discussed above, axis α can be vertical, angled, horizontal, and 3-dimensional in various embodiments. Force member 970 forces cam followers 955 into contact with cam surface 922. As truck 990 is translated up and down axis α along a guide member 910, cam surface 922 forces cam followers 955 to rotate around axis α, thus changing the tension in force member 970. In one embodiment, the shape of surface 922 provides that the spring applies a constant axial component force on the cam followers 955 (and truck 990) via the cam surface.

In one embodiment, the shape of surface 922 provides that the spring applies a pre-determined variable axial component force on the cam followers 955 (and truck 990) via the cam surface.

In some embodiments, monitor support mechanism 900 includes one or more of the features of other mechanisms described above and below. Accordingly, the details and features described in the other embodiments are incorporated herein by reference.

Figure 10:
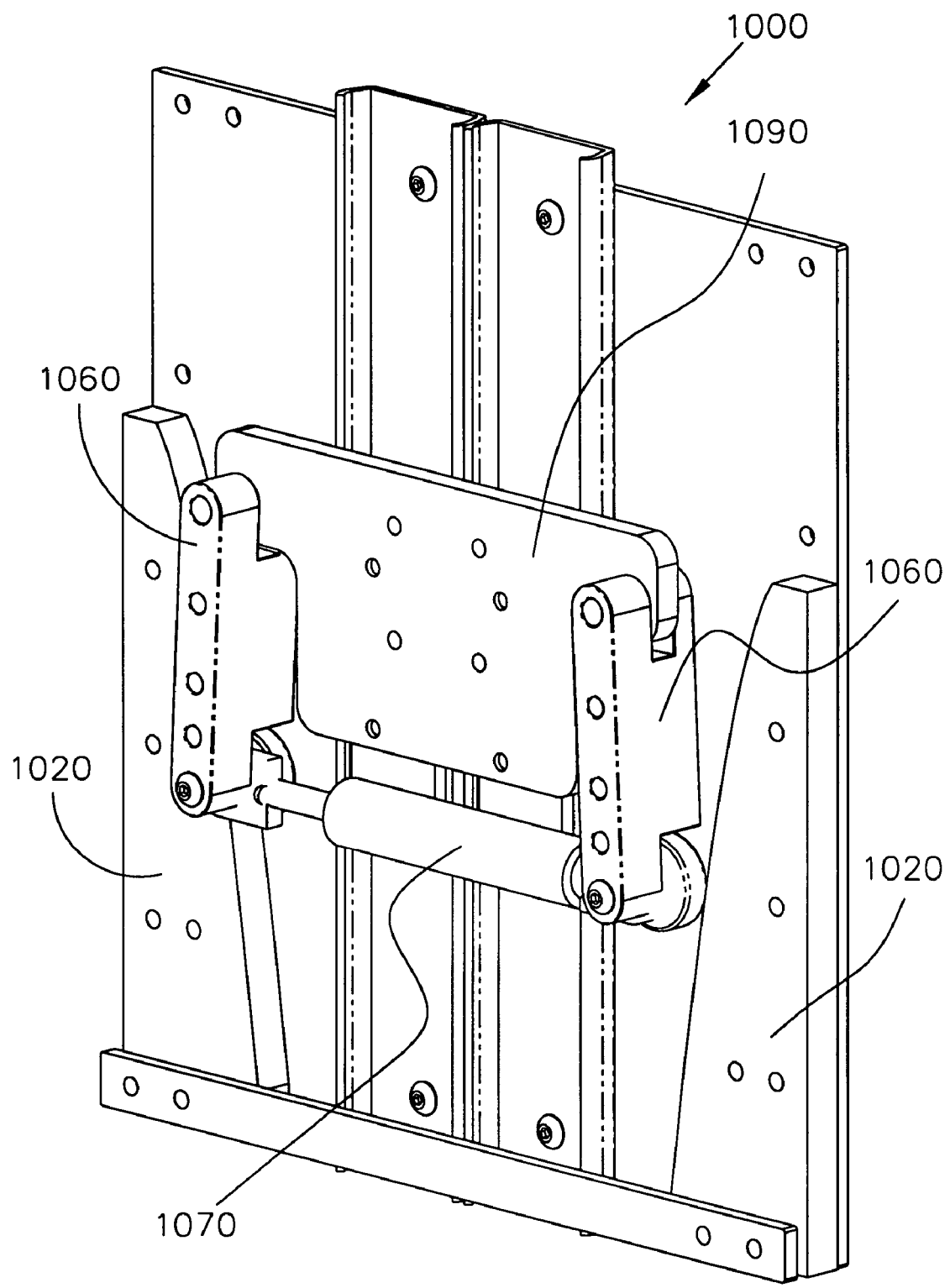
FIG. 10 is a perspective view illustrating a monitor support mechanism constructed in accordance with one embodiment.

FIG. 10 shows a monitor support mechanism 1000 according to one embodiment. Monitor support mechanism 1000 generally includes one or more of the features discussed herein regarding other embodiments of monitor support mechanisms, and those discussions are incorporated herein by reference. In this embodiment, monitor support mechanism 1000 includes a truck 1090, arms 1060, cams 1020, and a gas spring 1070, which supplies the stored energy force for the system.

FIGS. 11A and 11B show a generally schematic representation of a mechanism 1100 according to one embodiment. Mechanism 1100 includes a carriage or truck 1102 and an energy storage member 1104. In this embodiment, energy storage member 1104 includes a first member 1104a and a second member 1104b. The members 1104a and 1104b of energy storage member 1104 are attached at one end to a base 1106.

As can be seen referring to FIGS. 11A and 11B, truck 1102 moves relative to energy storage member 1104 along a path defined by an axis α. As the truck moves, cam followers 1108 and 1110, which are a fixed distance apart, force the energy storage members 1104a and 1104b to bend or deflect inward. This motion increases the force that the members 1104a and 1104b apply to cam followers 1110 and 1108, respectively. The cam followers then support truck 1102. The degree of bend in arms 1104a and 1104b defines how much of the energy and force stored in the arms is transferred to cam followers 1108 and 1110. In some embodiments, cam followers 1108 and 1110 and arms 1104a and 1104b are configured to provide a constant supporting force on truck 1102 as the truck travels up and down axis α. In some embodiment, a pre-determined variable force is provided.

In one embodiment, a supplement spring 1120 is positioned between members 1104a and 1104b. This can help increase the overall force of the mechanism. Advantageously, members 1104a and 1104b act as both truck guides and as energy storage members in this embodiment. This provides for a compact mechanism.

In various embodiments, members 1104a and 1104b have different shapes depending on their use. For instance, in one embodiment, each member is approximately one or two inches wide and generally has a rectangular cross-section. In one embodiment, each member is approximately four inches wide. In one embodiment, the members have a thicker bottom and are tapered as they reach the top, thus having a trapezoidal cross-section.

In some embodiments, mechanism 1100 includes one or more of the features of other mechanisms described above and below. Accordingly, the details and features described in the other embodiments are incorporated herein by reference.

FIGS. 12A and 12B show a generally schematic representation of a mechanism 1200 according to one embodiment. Mechanism 1200 includes a carriage or truck 1202, an energy storage member 1204, and a combination base/cam 1206. A monitor 1208 is coupled to truck 1202 which moves relative to cam 1206 along a path of movement defined by an axis α. In this embodiment, energy storage member 1204 is attached to truck 1202 and includes one or more arms 1210 which increase in force and energy as they move down along the cam surface. Cam followers 1212 are attached to one end of each of arms 1210 and are forced against the surface of cam 1206 by energy storage member 1204.

As truck 1202 moves relative to cam 1206 along axis α, the energy in member 1204 increases. In one embodiment, the shape of the cam 1206 provides a constant supporting force in the direction parallel to axis α. This provides that a user can easily move monitor 1208 up and down the path of motion of axis α by merely overcoming the frictional force of the components. Some embodiments provide a pre-determined variable force. In one embodiment, base/cam 1206 is shaped to provide the shape shown in three-dimensions. This provides that monitor 1208 can be rotated and still be supported by the cam surface.

FIG. 12B shows one embodiment of energy force member 1204 having an adjustable band 1214 positioned around the arms 1210 of the member. Band 1214 provides a counterforce as the arms 1210 try to spread apart. This provides that a user can adjust the supporting force of mechanism 1200 depending on the weight or load applied against it.

In one embodiment, the cam of mechanism 1200 can be inverted. In other words, the cam surface can be within the base, and energy storage member 1204 would ride within the base and exert its force outwards.

In one embodiment, energy storage member 1204 includes a rolling expansion spring which moves relative to cam 1206 along axis α. In one embodiment, energy storage member 1204 includes integrated ball bearings which provide rotation motion around the cam. This provides that a load can be rotated and still be supported by the cam surface.

In some embodiments, mechanism 1200 includes one or more of the features of other mechanisms described above and below. Accordingly, the details and features described in the other embodiments are incorporated herein by reference.

Figure 13A:
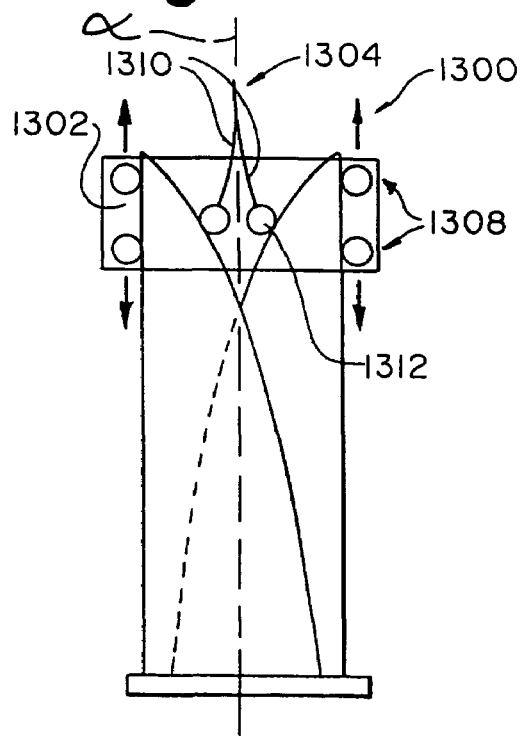
FIG. 13A shows a schematic view of a mechanism constructed in accordance with one embodiment.
Figure 13B:
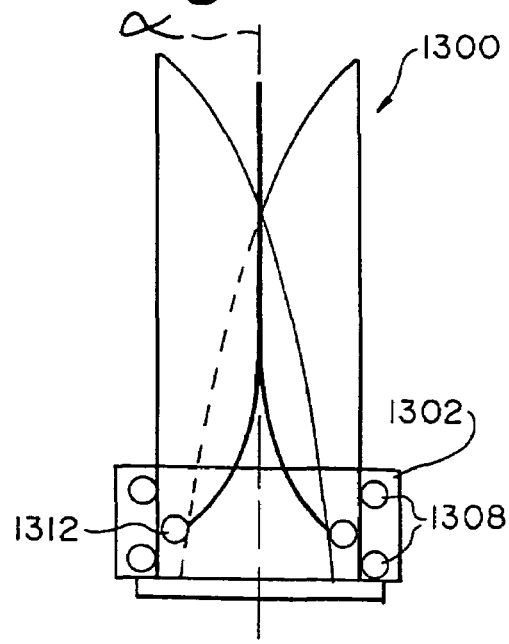
FIG. 13B is another view of the mechanism of FIG. 13A.
Figure 13C:
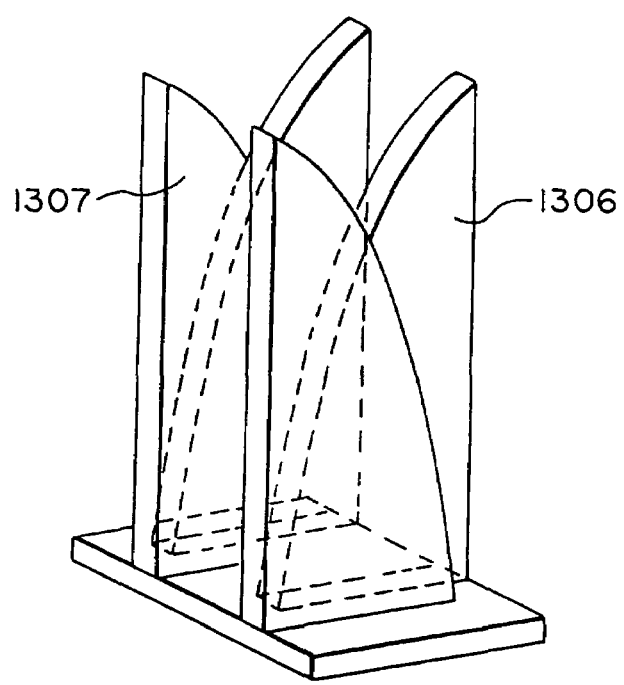
FIG. 13C shows an isometric view of the cams of the mechanism of FIG. 13A.

FIGS. 13A, 13B, and 13C show a generally schematic representation of a mechanism 1300 according to one embodiment. Mechanism 1300 includes a carriage or truck 1302 coupled with an energy storage member 1304, such as leaf spring arms 1310, and coupled to one or more guide rollers 1308. Mechanism 1300 also includes a pair of cams 1306 and 1307 arranged in a scissors cam configuration. Cams 1306 and 1307 provide inward facing, generally vertically oriented cam surfaces. The surfaces overlap each other and axis α. This provides a compact configuration while still permitting a long range of travel for the truck.

In this embodiment, the one or more guide rollers 1308 guide the truck 1302 along a path of motion defining an axis of motion a. A monitor or other load can be coupled to truck 1302. The truck 1302 moves relative to cams 1306 and 1307 along axis α. In this embodiment, arms 1310 increase in force and energy as they move down along the cam surface. Cam followers 1312 are attached to one end of each of arms 1310 and are forced against the surface of cams 1306 and 1307 by energy storage member 1304. The cam surfaces convert the force and energy of the energy storage member into a supporting force.

As truck 1302 moves along axis α, (see FIG. 13B), the energy in member 1304 increases. In one embodiment, the shape of the cams provides a constant supporting force in the direction parallel to axis α. Some embodiments provide a pre-determined variable force.

FIG. 13C shows an isometric view of cams 1306 and 1307 according to one embodiment.

In some embodiments, mechanism 1300 includes one or more of the features of other mechanisms described above and below. Accordingly, the details and features described in the other embodiments are incorporated herein by reference.

Figure 14A:
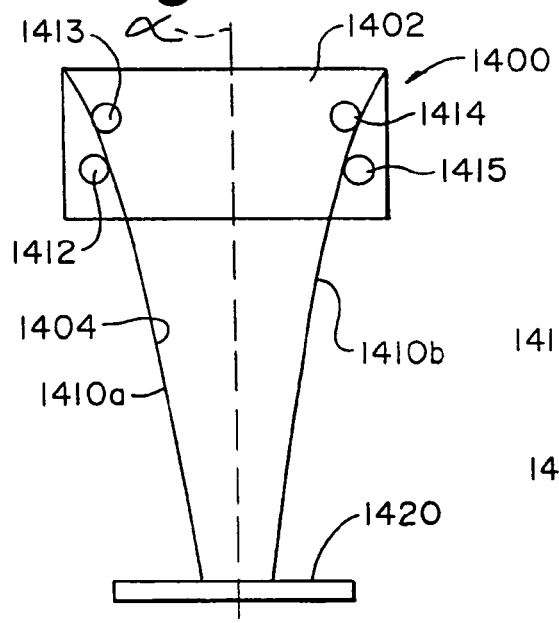
FIG. 14A shows a schematic view of a mechanism constructed in accordance with one embodiment.
Figure 14B:
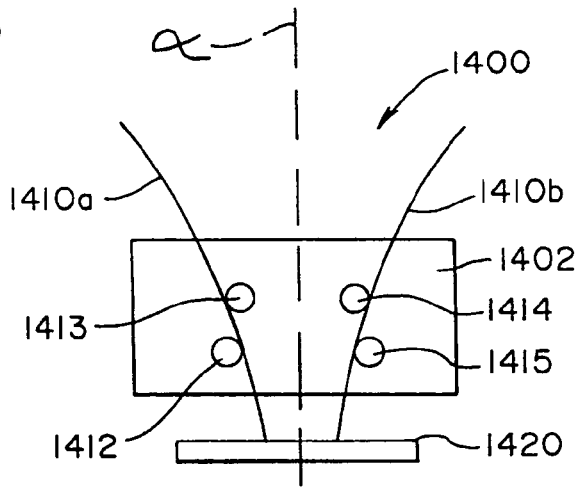
FIG. 14B is another view of the mechanism of FIG. 14A.

FIGS. 14A and 14B show a generally schematic representation of a mechanism 1400 according to one embodiment. Mechanism 1400 includes a carriage or truck 1402, an energy storage member 1404 such as leaf spring arms 1410a and 1410b, and two sets of cam followers 1412-1415 which are attached to truck 1402.

The cam followers are attached to truck 1402 and remain a fixed distance apart from each other as the truck moves down along a path of motion which defines an axis α. In one embodiment, arms 1410a and 1410b act as both axis guides for the truck and as energy storage members.

Arms 1410a and 1410b are attached at one end to a base 1420. As can be seen referring to FIGS. 14A and 14B, as the truck moves, the cam followers force arms 1410a and 1410b to bend or deflect outward. This motion increases the force that the arms 1410a and 1410b apply to the cam followers 1412-1415. The cam followers then support truck 1402. The degree of bend in arms 1410a and 1410b defines how much of the energy and force stored in the arms is transferred to the cam followers. In some embodiments, cam followers 1412-1415 and arms 1410a and 1410b are configured to provide a constant supporting force on truck 1402 as the truck travels up and down axis α. In some embodiment, a pre-determined variable force is provided. The cam surfaces convert the force and energy of the energy storage member into a supporting force.

In some embodiments, mechanism 1400 includes one or more of the features of other mechanisms described above and below. Accordingly, the details and features described in the other embodiments are incorporated herein by reference.

Figure 15:
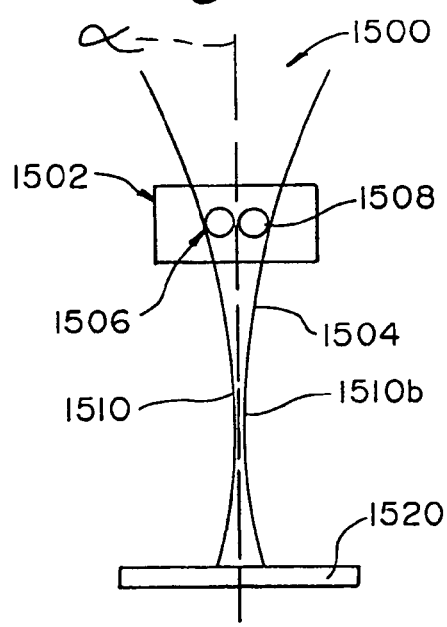
FIG. 15 shows a schematic view of a mechanism constructed in accordance with one embodiment.
Figure 16:
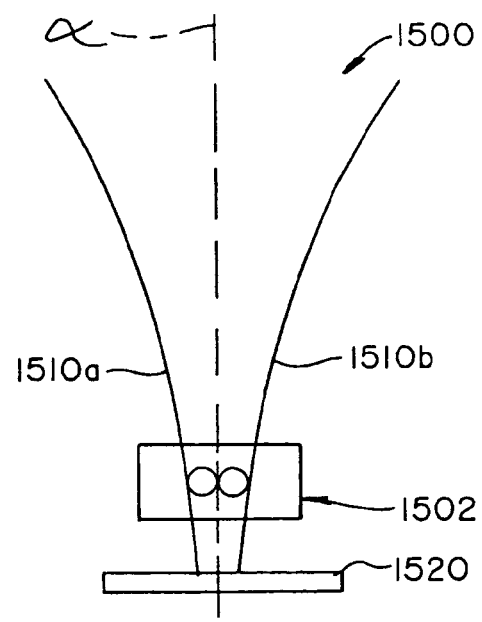
FIG. 16 is another view of the mechanism of FIG. 15.

FIGS. 15 and 16 show a generally schematic representation of a mechanism 1500 according to one embodiment. Mechanism 1500 includes a carriage or truck 1502, an energy storage member 1504 such as leaf spring arms 101510a and 1510b, and cam followers 1506 and 1508 which are attached to truck 1502.

The cam followers are attached to truck 1502 and remain a fixed distance apart from each other as the truck moves down along a path of motion which defines an axis α.

Arms 1510a and 1510b are attached at one end to a base 1520. As can be seen referring to FIGS. 15 and 16, as the truck moves, the cam followers force arms 1510a and 1510b to deflect outward. This motion increases the force the arms 1510a and 1510b apply to the cam followers 1504 and 1506. The cam followers then support truck 1502. The degree of deflection in arms 1510a and 1510b defines how much of the energy and force stored in the arms is transferred to the cam followers. In some embodiments, cam followers 1506 and 1508 and arms 1510a and 1510b are configured to provide a constant supporting force on truck 1502 as the truck travels up and down axis α. In some embodiment, a pre-determined variable force is provided. The cam surfaces convert the force and energy of the energy storage member into a supporting force.

In some embodiments, mechanism 1500 includes one or more of the features of other mechanisms described above and below. Accordingly, the details and features described in the other embodiments are incorporated herein by reference.

Figure 17:
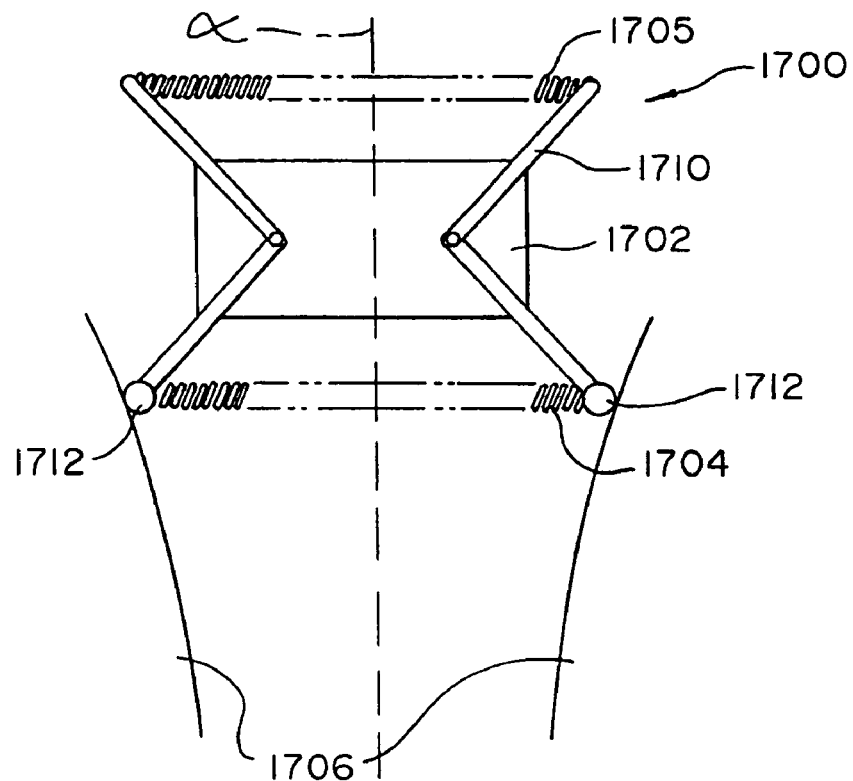
FIG. 17 shows a schematic view of a mechanism constructed in accordance with one embodiment.

FIG. 17 shows a generally schematic representation of a mechanism 1700 according to one embodiment. Mechanism 1700 includes a carnage or truck 1702, a first energy storage member 1704, a second energy storage member 1705, and cams 1706. Truck 1702 moves relative to cams 1706 along a path of movement defined by an axis α. In this embodiment, energy storage member 1704 is a compression spring and is attached to a lower part of arms 1710 of truck 1702. Energy storage member 1705 is an extension spring attached to an upper end of the arms. Cam followers 1712 are attached to one end of each of arms 1710 and are forced against the surface of cam 1706 by energy storage member 1704 and 1705.

As truck 1702 moves relative to cam 1706 along axis α, the cam causes the energy in member 1704 to increase. The cam surface then converts this energy into a supporting force. In one embodiment, the shape of the cam 1706 provides a constant supporting force in the direction parallel to axis α. Some embodiments provide a pre-determined variable supporting force. Mechanism 1700 is similar in many respects to mechanism 400 in FIGS. 4A and 4B except mechanism 1700 includes angled arms 1710 and a pair of springs 1704 and 1705.

In some embodiments, mechanism 1700 includes one or more of the features of other mechanisms described above and below. Accordingly, the details and features described in the other embodiments are incorporated herein by reference.

Figure 18:
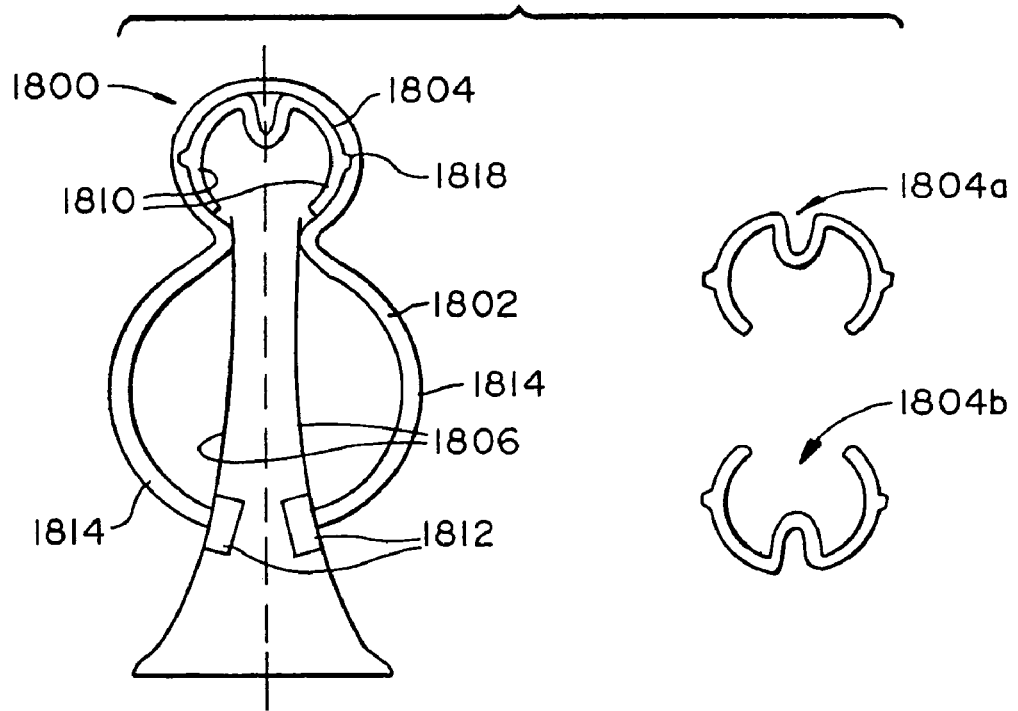
FIG. 18 shows a schematic view of a mechanism constructed in accordance with one embodiment.

FIG. 18 shows a generally schematic representation of a mechanism 1800 according to one embodiment. Mechanism 1800 includes a carriage or truck 1802 which includes arms 1814, an energy storage member 1804, and a cam 1806 which includes a pair of generally vertically oriented inward facing surfaces. Truck 1802 moves relative to cam 1806 along a path of movement defined by an axis α. Truck 1802 includes an upper portion shaped to receive energy storage member 1804.

In this embodiment, energy storage member 1804 includes a generally M-shaped (or W-shaped) plastic spring which is positioned within an upper portion of truck 1802. Energy storage member 1804 includes one or more arms 1810 which decrease in force and energy as the truck and spring move down relative to the cam surface. One or more cam followers 1812 are attached to one end of each of arms 1810. Energy storage member 1804 applies an outward force on arms 1814 which in turn apply an outward force on cam followers 1812, which ride along the cam surfaces of cam 1806. In one embodiment, cam followers 1812 are slides which slide along the cam surface. The frictional force between the slides and the cam surface can be designed to provide a proper amount of pause or control in the mechanism.

As truck 1802 moves relative to cam 1806 along axis α, the energy in member 1804 decreases. However, the shape of the cam surfaces of cam 1806 converts that energy into a first, supporting force parallel to axis α and a second force perpendicular to the first force. In one embodiment, the shape of the cam 1806 provides a constant supporting force in the direction parallel to axis α. This provides that a user can easily move a load up and down the path of motion of axis α by merely overcoming the frictional force of the components. Some embodiments provide a pre-determined variable force.

In one embodiment, energy storage member 1804 includes extending portions 1818 which mate with corresponding cut-outs in truck 1802. This allows member 1804 to be oriented either upwards or downwards. In other words, member 1804 can have either a W-shaped orientation 1804b or an M-shaped orientation 1804a. These different orientations change the spring force supplied by the energy storage member and allow a user to adjust the mechanism.

In one embodiment, essentially the entire mechanism 1800 is made from plastic or polymer components. For instance, one or more of cam 1806, truck 1802, cam followers 1812, and/or spring 1804 are made from a non-metallic material. For instance, in one embodiment cam 1806 is an injection molded plastic member. Likewise truck 1802 can be injection molded. In various embodiments, the members are made from various plastics, plastic composites, polymers, fiberglass, and other non-metallic materials. In one embodiment, spring 1804 is a fiberglass composite material. Advantageously, using such non-metallic material provides a lightweight, low-cost, mass producible mechanism.

In some embodiments, mechanism 1800 includes one or more of the features of other mechanisms described above and below. Accordingly, the details and features described in the other embodiments are incorporated herein by reference.

Figure 19A:
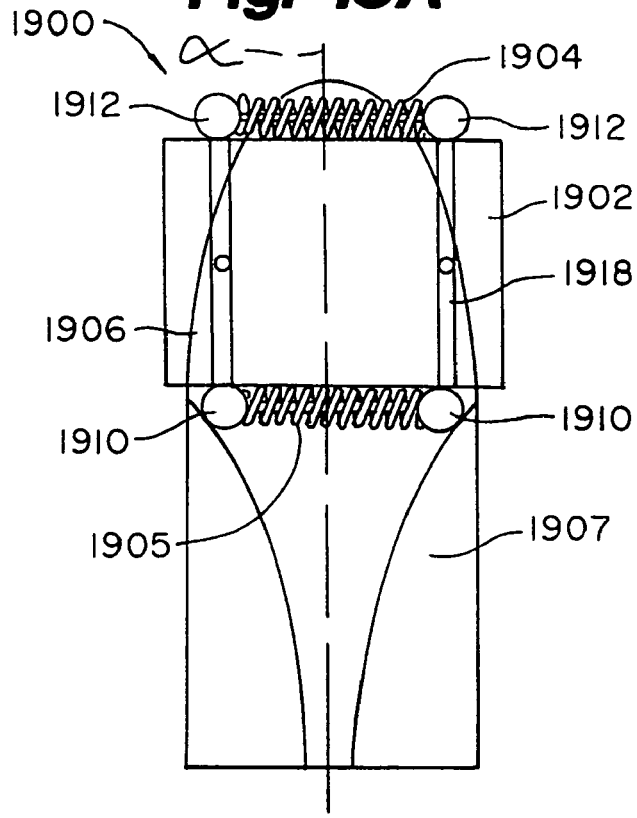
FIG. 19A shows a schematic view of a mechanism constructed in accordance with one embodiment.
Figure 19B:
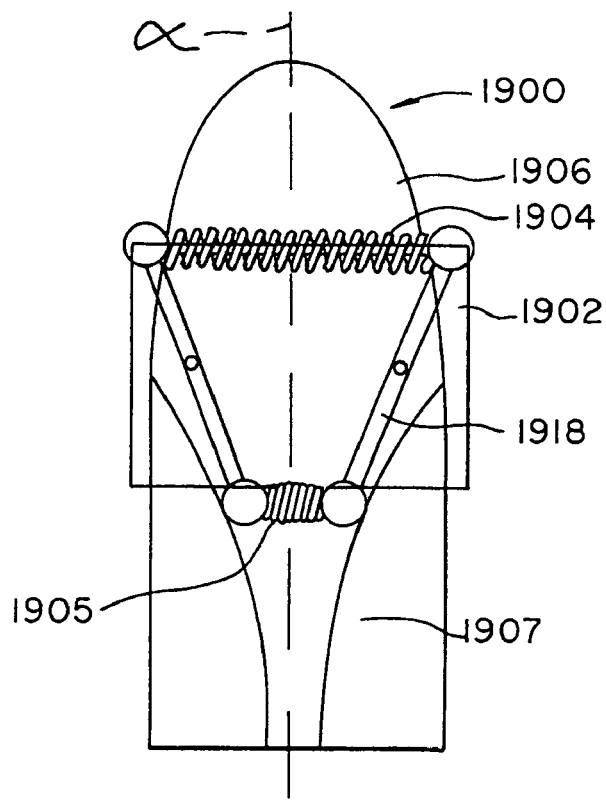
FIG. 19B is another view of the mechanism of FIG. 19A.

FIG. 19 shows a generally schematic representation of a mechanism 1900 according to one embodiment. Mechanism 1900 includes a carnage or truck 1902, an energy storage member 1904, and a pair of cams 1906 and 1907 arranged so that cam 1906 includes one or more outward facing cam surface, while cam 1907 provides one or more inward facing cam surfaces. Each of the cam surfaces includes a generally vertically oriented cam surfaces relative to a path defined by a direction of motion axis $\alpha$.

In this embodiment, one or more cam followers 1910 are coupled to truck 1902 and forced against cam 1907. One or more cam followers 1912 are also attached to truck 1902 and ride along cam 1906. In one embodiment, cam followers 1912 are attached at one end of a pivoting arm 1918 of the truck while cam followers 1910 are attached to the other end of arm 1918. The cam followers help to guide the truck as it moves relative to cams 1906 and 1907 along axis $\alpha$. A monitor or other load can be coupled to truck 1902. In this embodiment, energy storage member 1904 includes an expansion spring and is attached to truck 1902 generally between arms 1918 above the pivot point of arm 1918. Energy storage member 1904 increases in force and energy as the truck and energy storage member move down along the cam surface. The cam surfaces convert the force and energy of the energy storage member into a supporting force. In one embodiment a compression spring 1905 is positioned between arms 1918 below the pivot points of arms 1918.

As truck 1902 moves along axis $\alpha$, (see FIG. 19B), cams 1906 and 1907 cause the energy in member 1904 to increase. Cams 1906 and 1907 then convert the energy storage member force into a first force in a direction parallel to axis $\alpha$ and a second force perpendicular to the first force. In one embodiment, the shape of the cams provides a constant, supporting, first force in the direction parallel to axis $\alpha$. Some embodiments provide a pre-determined variable force.

In some embodiments, mechanism 1900 includes one or more of the features of other mechanisms described above and below. Accordingly, the details and features described in the other embodiments are incorporated herein by reference.

Figure 20:
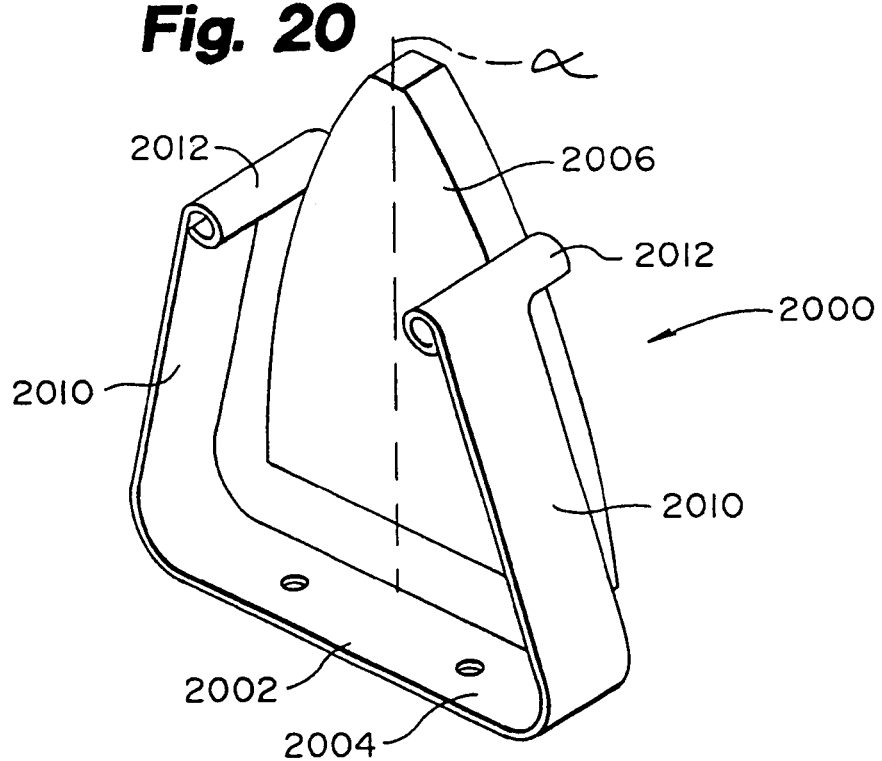
FIG. 20 shows a perspective view of a mechanism constructed in accordance with one embodiment.

FIG. 20 shows an isometric representation of a mechanism 2000 according to one embodiment. Mechanism 2000 includes a carriage or truck 2002, an energy storage member 2004 such as a steel spring, and a cam 2006. Truck 2002 and energy storage member 2004 move relative to cam 2006 along a path of movement defined by an axis $\alpha$. In this embodiment, energy storage member 2004 is integral with truck 2002 and includes arms 2010 which increase in force and energy as they move down along the cam surface. Cam followers 2012 are attached to one end of each of arms 2010 and are forced against the surface of cam 2006 by energy storage member 2004.

As truck 2002 moves relative to cam 2006 along axis $\alpha$, the energy in member 2004 increases. In one embodiment, the shape of the cam 2006 provides a constant supporting force in the direction parallel to axis $\alpha$. This provides that a user can easily move a monitor or other load up and down the path of motion of axis $\alpha$ by merely overcoming the frictional force of cam follower 2012 against the cam surface. Some embodiments provide a pre-determined variable force.

In some embodiments, mechanism 2000 includes one or more of the features of other mechanisms described above and below. Accordingly, the details and features described in the other embodiments are incorporated herein by reference.

Figure 21A:
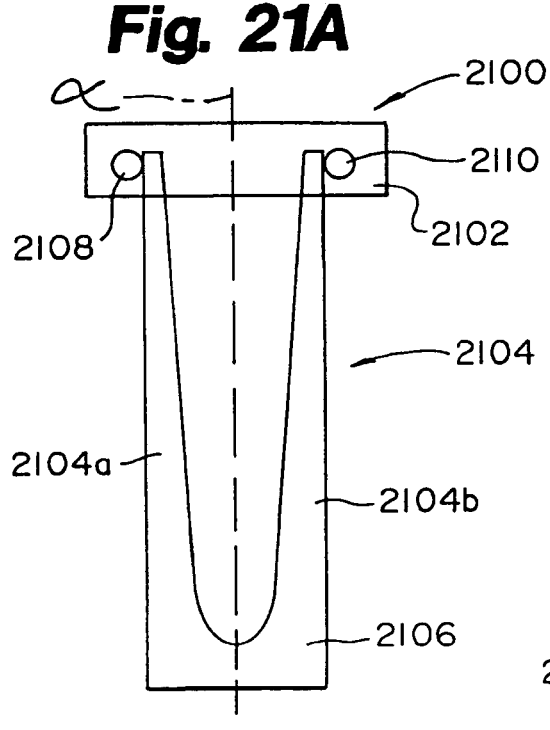
FIG. 21A shows a schematic view of a mechanism constructed in accordance with one embodiment.
Figure 21B:
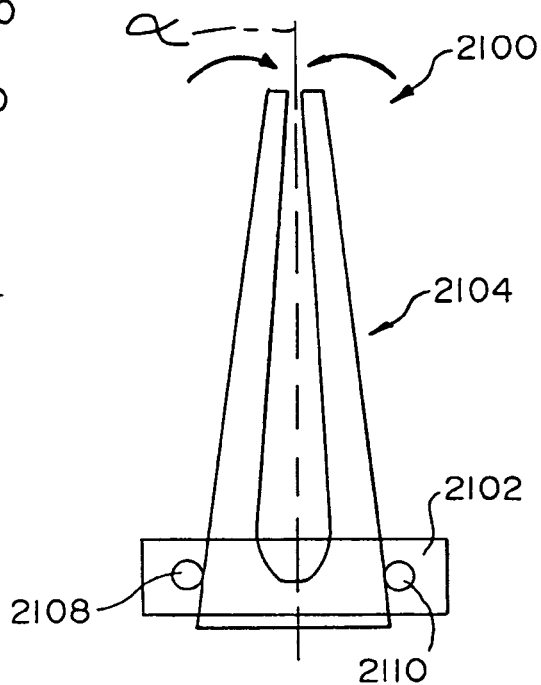
FIG. 21B is another view of the mechanism of FIG. 21A.

FIGS. 21A and 21B show a generally schematic representation of a mechanism 2100 according to one embodiment. Mechanism 2100 includes a carriage or truck 2102 and an energy storage member 2104. In this embodiment, energy storage member 2104 includes a first member 2104a and a second member 2104b coupled to a base 2106.

As can be seen referring to FIGS. 21A and 21B, truck 2102 moves relative to energy storage member 2104 along a path defined by an axis $\alpha$. As the truck moves, cam followers 2108 and 2110, which are a fixed distance apart, force the energy storage members 2104a and 2104b to bend or deflect inward. This motion increases the force the members 2104a and 2104b apply to cam followers 2110 and 2108, respectively. The cam followers then support truck 2102. The degree of bend in arms 2104a and 2104b defines how much of the energy and force stored in the arms is transferred to cam followers 2108 and 2110. In some embodiments, cam followers 2108 and 2110 and arms 2104a and 2104b are configured to provide a constant supporting force on truck 2102 as the truck travels up and down axis $\alpha$. In some embodiment, a pre-determined variable force is provided. In various embodiments, members 2104a and 2104b can have different shapes depending on their use. In one embodiment, members 2104a and 2104b have inwardly sloping sides as shown in FIG. 21A.

In one embodiment, essentially the entire mechanism 2100 is made from plastic or polymer components. For instance, one or more of energy storage member 2104 and/or truck 2102 are made from a non-metallic material. For instance, in one embodiment energy storage member 2104 is an injection molded plastic member. Likewise truck 2102 can be injection molded. In various embodiments, the members are made from various plastics, plastic composites, polymers, fiberglass, and other non-metallic materials. Advantageously, using such non-metallic material provides a lightweight, low-cost, mass producible mechanism.

In some embodiments, mechanism 2100 includes one or more of the features of other mechanisms described above and below. Accordingly, the details and features described in the other embodiments are incorporated herein by reference.

Figure 22A:
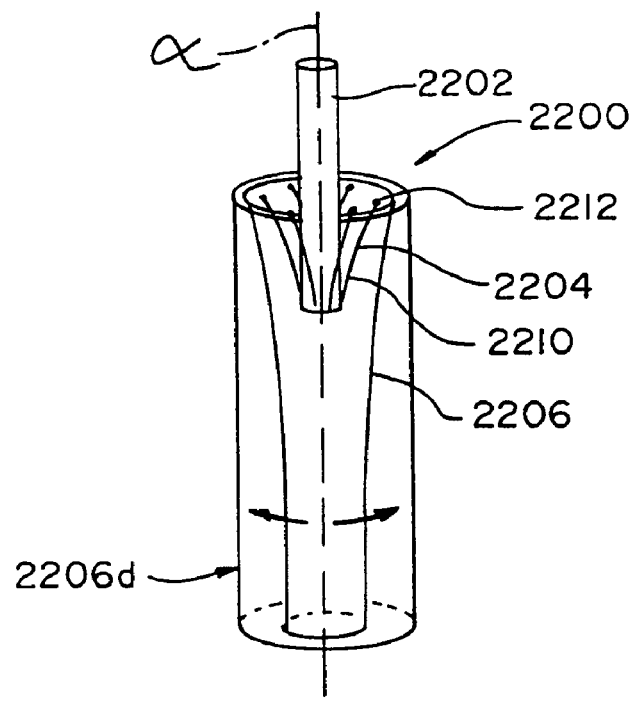
FIG. 22A shows a schematic view of a mechanism constructed in accordance with one embodiment.
Figure 22B:
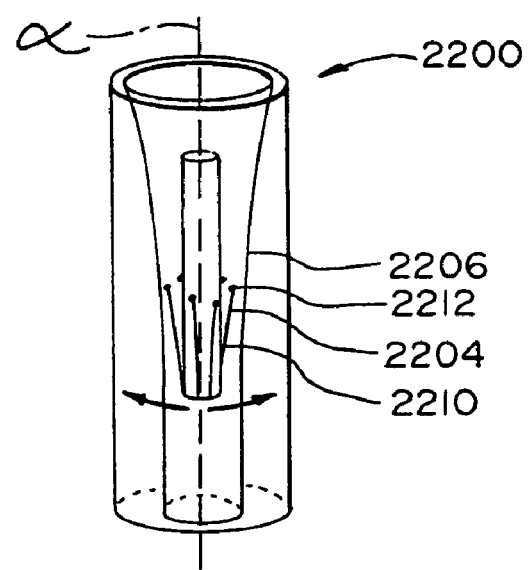
FIG. 22B is another view of the mechanism of FIG. 22A.

FIG. 22 shows a generally schematic representation of a mechanism 2200 according to one embodiment. Mechanism 2200 includes a carriage or truck 2202, an energy storage member 2204, and a cam 2206. Truck 2202 includes a shaft which moves within inner facing cam 2206, along a path of movement defined by an axis $\alpha$. In this embodiment, energy storage member 2204 is attached to truck 2202 and includes one or more arms 2210 which increase in force and energy as they move down along the cam surface. Cam followers 2212 are attached to one end of each of arms 2210 and are forced against the surface of cam 2206 by energy storage member 2204. In one embodiment, cam followers 2212 include ball bearings.

In one embodiment, cam 2206 includes an overall tube shape having a diameter 2206d of approximately one inch. Other embodiments include diameters of two inches, three inches, or greater. In some embodiments, cam 2206 has a length of approximately four inches. Other embodiments include lengths of 6, 9, 12, 15, 20, 24 inches, and higher.

As the shaft of truck 2202 moves relative to cam 2206 along axis $\alpha$, the energy in member 2204 increases. In one embodiment, the shape of the cam 2206 provides a constant supporting force in the direction parallel to axis α. Some embodiments provide a pre-determined variable force.

In one embodiment, the lower portion of the shaft includes a seal and a gas is located within cam 2206 to provide a damping force or additional supporting force.

In some embodiments, mechanism 2200 includes one or more of the features of other mechanisms described above and below. Accordingly, the details and features described in the other embodiments are incorporated herein by reference.

Figure 23A:
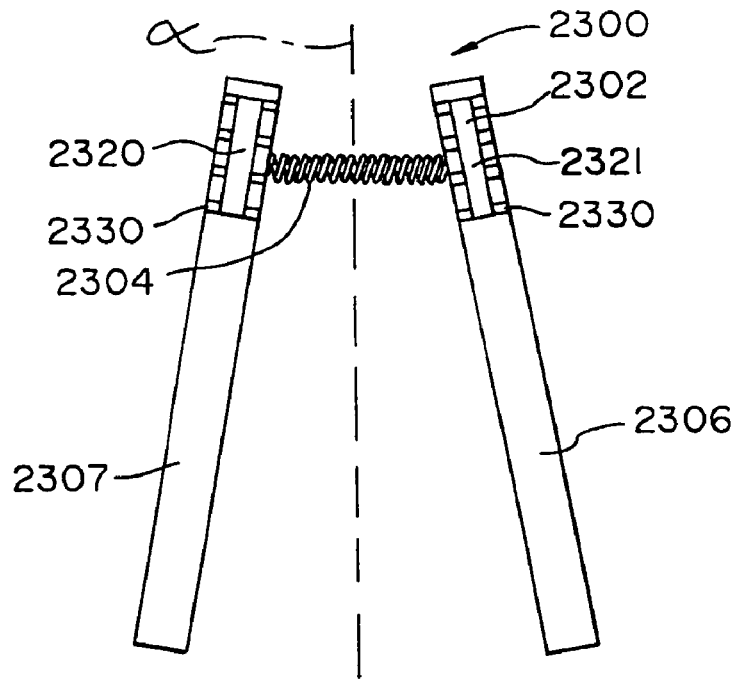
FIG. 23A shows a schematic view of a mechanism constructed in accordance with one embodiment.
Figure 23B:
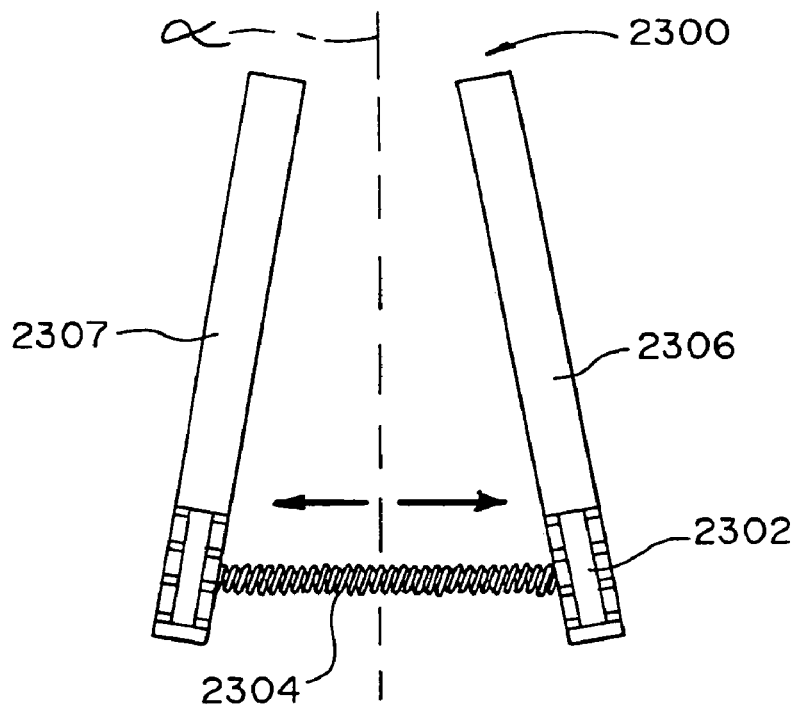
FIG. 23B is another view of the mechanism of FIG. 23A.

FIGS. 23A and 23B show a generally schematic representation of a mechanism 2300 according to one embodiment. Mechanism 2300 includes a carriage or truck 2302, an energy storage member 2304, and cams 2306 and 2307.

Cams 2306 and 2307 include straight cam rails. The truck 2302 is coupled to or integral with at least one slider 2320 or 2321. First slider 2320 includes bearings such as ball bearings or linear bearings 2330 and translates within cam 2307. Second slider 2321 includes bearings such as ball bearings or linear bearings 2330 and translates within cam 2306. In this embodiment, energy storage member 2304 includes an extension spring which is coupled at a first end to first slider 2320 and at a second end to second slider 2321.

Truck 2302 moves relative to cams 2306 and 2307 along a path defined by an axis α. As the truck moves, cams 2306 and 2307 cause energy storage member 2304 to extend. In one embodiment, energy storage member 2304 is a non-linear spring chosen, in combination with the configuration of cams 2306 and 2307, to provide a constant counterbalance force in a direction parallel to the axis α. In some embodiments, a pre-determined variable force is provided.

In some embodiments, mechanism 2300 includes one or more of the features of other mechanisms described above and below. Accordingly, the details and features described in the other embodiments are incorporated herein by reference.

FIG. 24A shows a generally schematic representation of a mechanism 2400 according to one embodiment. Mechanism 2400 includes a carriage or truck 2402, an energy storage member 2404, and cams 2406 and 2407.

Cams 2406 and 2407 include straight cam rails. The truck 2402 is coupled to or integral with at least one slider 2420 or 2421. First slider 2420 includes ball bearings and translates against cam 2407. Second slider 2421 includes ball bearings and translates against cam 2406. In this embodiment, energy storage member 2404 includes a compression spring which is coupled at a first end to first slider 2420 and at a second end to second slider 2421. In one embodiment, a second spring 2404' is added. In one embodiment, all members of mechanism 2400 are manufactured from steel, providing a sturdy, cost-effective mechanism.

Truck 2402 moves relative to cams 2406 and 2407 along a path defined by an axis α. As the truck moves, cams 2406 and 2407 cause energy storage member 2404 (and 2404') to compress. In one embodiment, energy storage member 2404 is a non-linear spring chosen, in combination with the configuration of cams 2406 and 2407 to provide a constant counterbalance force in a direction parallel to the axis α. In some embodiments, a pre-determined variable force is provided.

In some embodiments, mechanism 2400 includes one or more of the features of other mechanisms described above and below. Accordingly, the details and features described in the other embodiments are incorporated herein by reference.

FIG. 24B shows a generally schematic representation of a mechanism 2400' according to one embodiment. Mechanism 2400' is generally similar to mechanism 2400. In one embodiment, mechanism 2400' includes parallel rails 2420 and 2421 and bearings 2440 for guiding a truck 2402'. Mechanism 2400' also includes internally mounted cam 2406' and 2407' for providing a force form energy storage member 2404. In FIG. 24B, the truck is in an upper position at point A and in a lower position at point B.

In some embodiments, mechanism 2400' includes one or more of the features of other mechanisms described above and below. Accordingly, the details and features described in the other embodiments are incorporated herein by reference.

FIG. 24C shows a rail 2450 according to one embodiment. Rail 2450 includes a pair of parallel linear rails 2451 and 2452. A bottom surface 2453 is angled relative to the linear rails 2451 and 2452, thus providing a camming surface as cam followers 2454 and energy storage members 2455 travel along the rail. For example, a truck or carriage is coupled to cam followers 2454 and translates along the rail from a first point A to a second point B.

Figure 25:
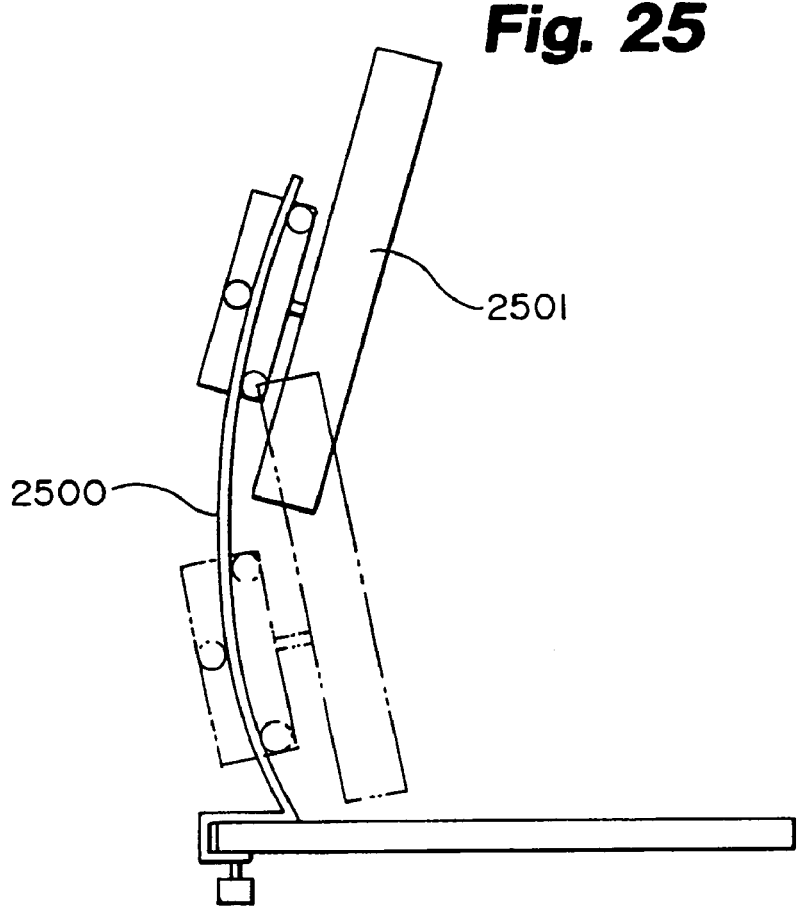
FIG. 25 shows a curved support for a mechanism according to one embodiment.

FIG. 25 shows a side view of a combination monitor support and energy storage member 2500 according to one embodiment. This example shows that some embodiments can provide a tilting or curved path for a component such as monitor 2501. For example, members 1104a and 1104b of FIG. 11A could be curved as shown in FIG. 25.

Figure 26:
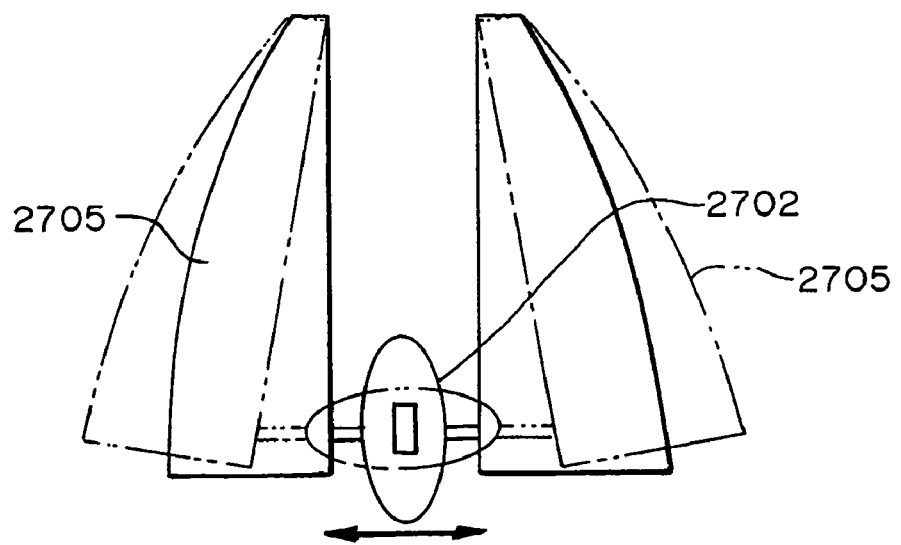
FIG. 26 shows a mechanism having an adjustment mechanism according to one embodiment.

FIG. 26 shows an adjustment mechanism 2602 for adjusting for variable loads on one or more of the support mechanisms described herein. Here a mechanism includes rotating cams 2604 having pivot points 2605. Adjusting mechanism 2602 provides a force on one or both cams to rotate them to provide a different cam surface profile. In one embodiment, mechanism 2602 includes a screw for manual adjustment. In one embodiment, mechanism 2602 includes a spring. This provides for automatic adjustment of the cam profiles. Other embodiments include both a spring and a screw.

FIG. 27 shows an adjustment mechanism 2702 for adjusting for variable loads on one or more of the support mechanisms described herein. Adjusting mechanism 2702 provides a force on one or both cams 2705 to rotate them about a pivot point to provide a different cam surface profile. In one embodiment, mechanism 2702 includes a ratchet mechanism 2704 for locking the cams in position. A user can adjust the ratchet to control the cam angles and profiles. In one embodiment, the cam includes a linkage slot instead of a pivot point to provide other cam profiles (i.e., the top of the cam can be moved also).

FIG. 28 shows a mechanism 2800 which includes an adjustment mechanism 2802 according to one embodiment. In one embodiment, adjusting mechanism 2802 moves the cams 2806 together or apart. Adjustment mechanism 2802 includes a first sprocket 2808 which rotates a threaded shaft 2809 which adjusts the distance between the cams. A chain 2814 connects first sprocket 2808 to a second sprocket 2810. Second sprocket 2802 is driven by a knob 2812. Also attached to knob 2812 is a threaded shaft 2811 which adjusts the distance between the cams. A user can rotate knob 2812 to activate the adjustment mechanism. Some embodiments incorporate a motor for driving the adjustment mechanism. Similarly to FIG. 27, the cam can include a linkage slot instead of a pivot point 2820 to provide other cam profiles.

FIG. 29 shows a mechanism 2900 having an adjustment mechanism 2902 for adjusting for variable loads of one or more of the embodiments described herein. Adjusting mechanism 2902 provides a force on leaf spring 2904 to adjust its pre-load force against cam 2906.

Examples of Supporting Monitors and other Computer Components

In some embodiments, the monitor support mechanisms described above are useful for supporting and lifting a variety of monitors and computer components.

Figure 30:
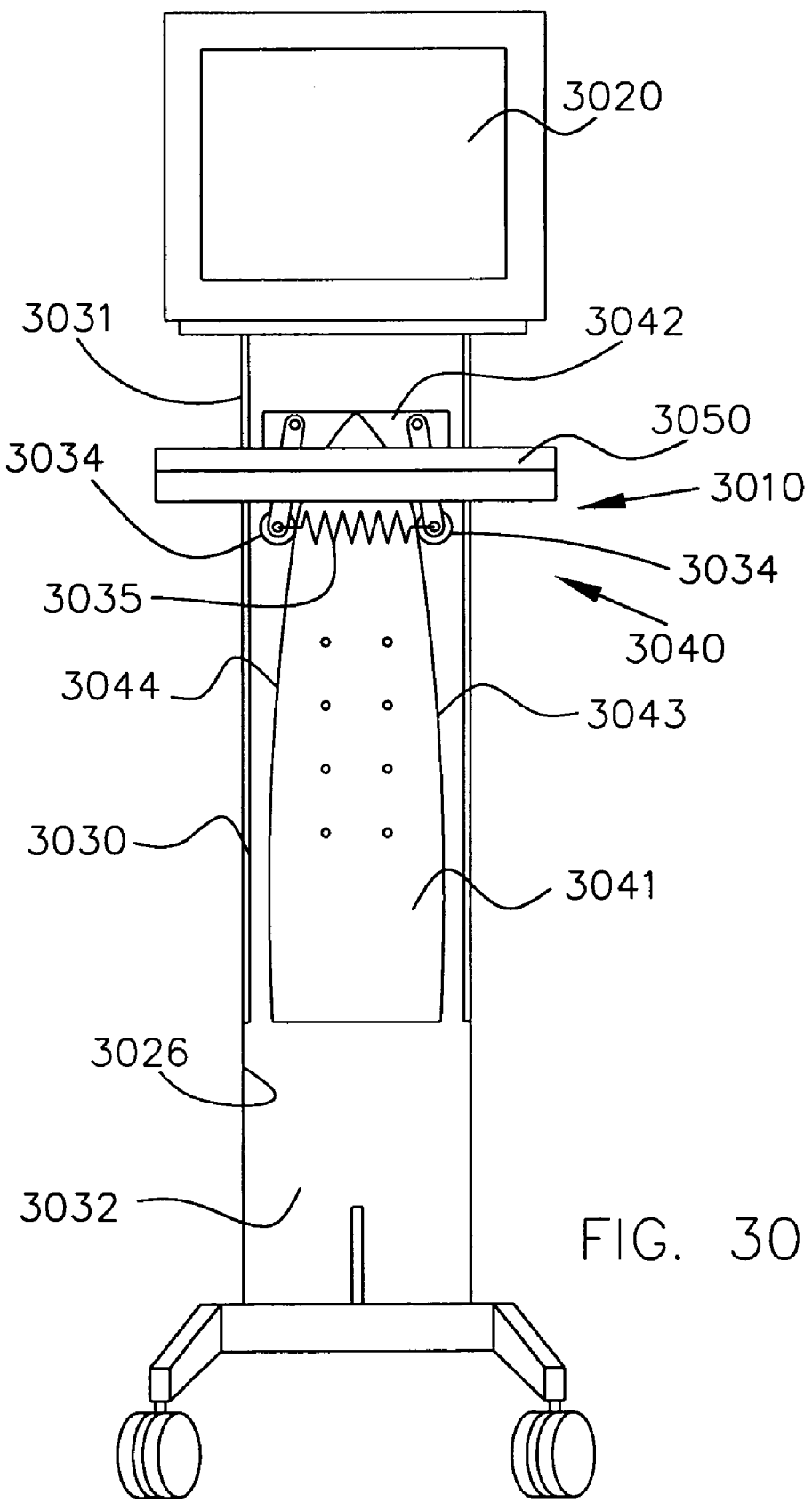
FIG. 30 is a front view illustrating a monitor support mechanism constructed in accordance with one embodiment.

For instance, FIG. 30 shows a computer monitor support system 3010 according to one embodiment. System 3010 includes a monitor 3020, a keyboard 3050, a work center support 3030, and a monitor support mechanism 3040.

Support 3030 includes a base portion 3032 and an upper portion 3031. Upper portion 3031 is slidably coupled to the base portion. Monitor 3020 and keyboard 3050 are attached to upper portion 3031. In this embodiment, the sides of base portion 3032 provide a guide 3026 for keeping upper portion 3031 straight as it is being raised or lowered. Drawer slides or other slides mentioned above may be used. Other alternatives for work centers are within the scope of the present embodiment.

Monitor support mechanism 3040 is coupled between upper section 3031 and lower section 3032 to provide support and adjustability of upper section 3031 relative to lower section 3032. Mechanism 3040 generally includes a carriage or truck 3042 which is attached to upper section 3031 and translates within guide 3026, and a cam 3041 which is coupled to lower section 3032. Cam 3041 includes two outwardly facing cam surfaces 3043 and 3044.

When a downward force is applied to upper section 3031, the force is transferred via the truck to cam followers 3034 which are forced against cam 3041 by an energy storage member, such as a spring 3035. Truck 3042 then moves within the guide. The cam provides an opposing, supporting force on upper section 3031 via the cam followers and spring 3035. In one embodiment, the cam is shaped so that it provides a constant counterbalance force independent of the position of the cam followers along the cam, thus providing a simple system of adjusting and maintaining the position of the monitor and/or keyboard.

Advantageously, the cam surfaces 3043 and 3044 are generally vertically oriented while spring 3035 applies a force in a horizontal direction. This configuration allows for a long run of the monitor 3020 relative to support 3032. In one embodiment, a run of 24 inches is provided. One embodiment provides a run of 36 inches. One embodiment provides a run of longer than 36 inches.

Figure 31A:
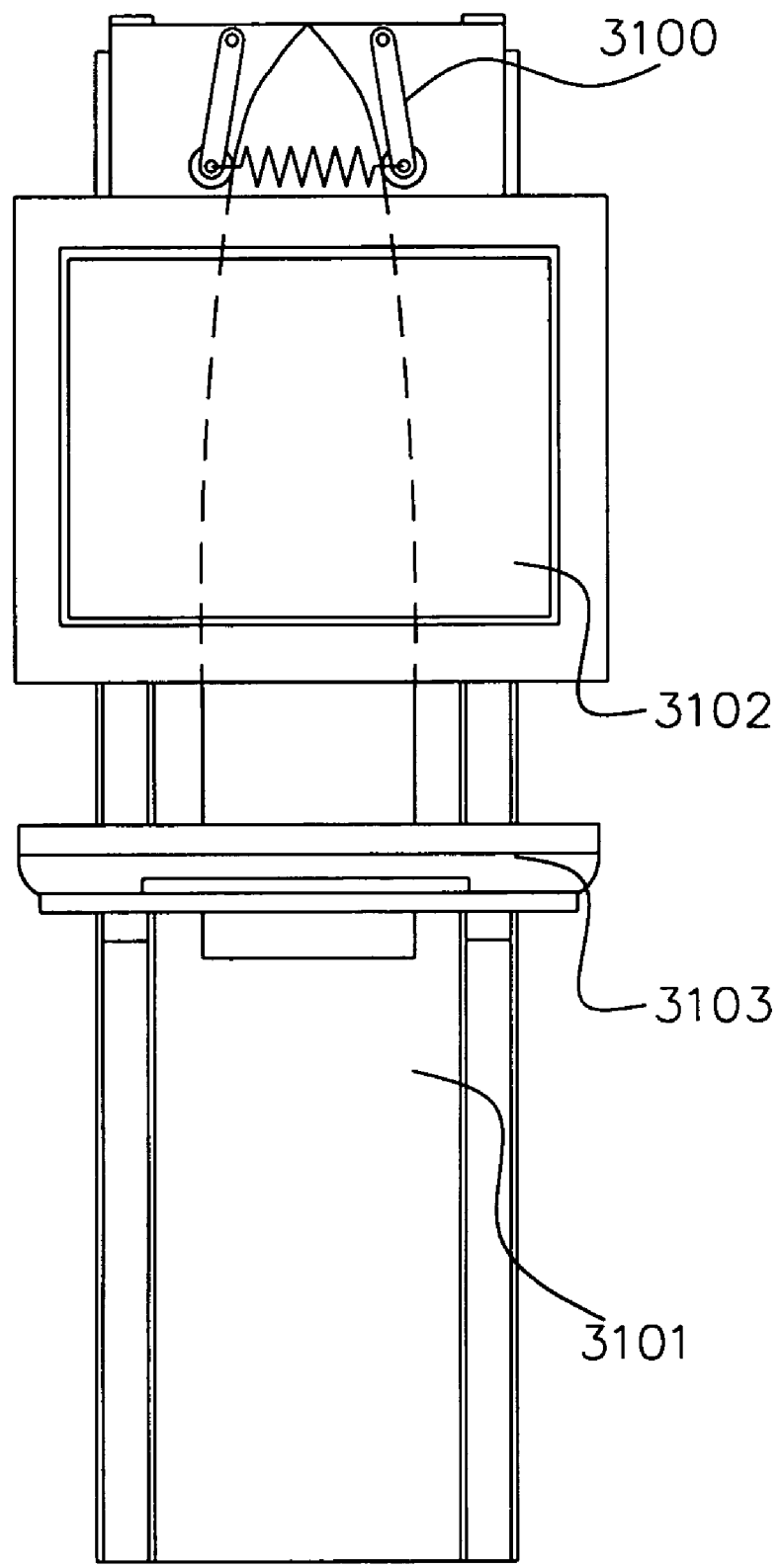
FIG. 31A is a front view illustrating a monitor support mechanism constructed in accordance with one embodiment.
Figure 31B:
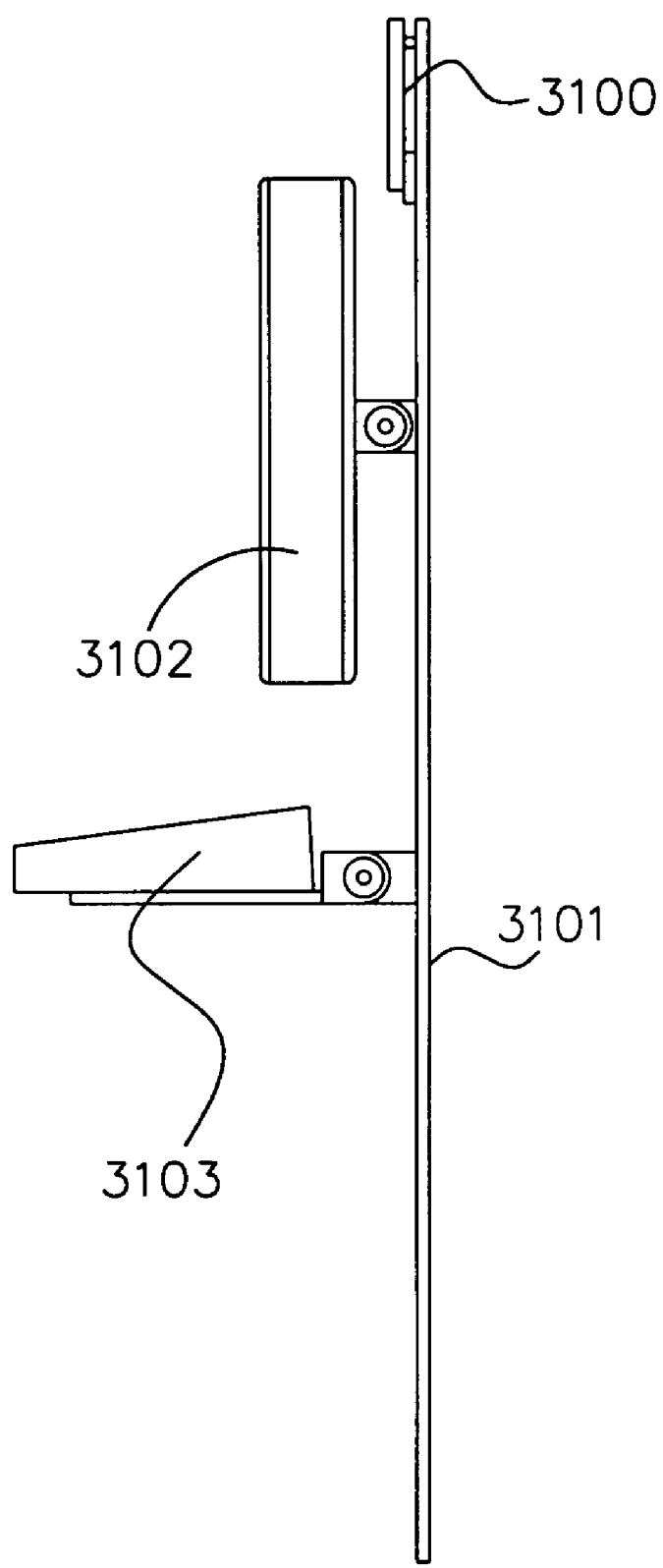
FIG. 31B is a side view of the monitor support mechanism of FIG. 31A.

In another embodiment, FIGS. 31A and 31B show a front and side view, respectively, of another exemplary use of a monitor support mechanism. In FIGS. 31A and 31B, a monitor support mechanism 3100 is used in 20 inch vertical data entry station having a flat panel monitor 3102 and a keyboard 3103 coupled to a support 3101. In other embodiments, the other monitor support mechanisms discussed above can be used in place of monitor support mechanism 3100.

As noted above, in some embodiments all the moving components of the mechanism (i.e., the pivot arms, the spring, the truck, the cam followers) move in the same general plane of motion. This provides that the mechanism can be manufactured to be a relatively thin mechanism. This advantage can be seen in FIG. 31B which shows schematically how close to the wall the mechanism permits the monitor and keyboard to be. In one embodiment, the mechanism permits a monitor to be mounted no greater than 4 inches from a wall. Other embodiments provide various other distances.

In one or more embodiments, several of the components, such as the truck, the bearings and the cams, can be formed of lightweight material. In another option, the mating surfaces of the components can be formed to provide a smooth surface, where a lesser frictional force would occur as the components move relative to one another. Other variations of materials include, for example, thermoformed plastic.

The embodiments discussed above are scalable. In other words, one or more embodiments of the present invention are not limited by the relative size, force, or weight ranges of the mechanisms. The principle behind the present embodiments is applicable to smaller end larger mechanism than those depicted as examples. Moreover, one or more features described above may be combined or substituted in other embodiments.

Additional Examples of Uses

In some embodiments, mechanisms as described above can be incorporated into furniture systems for providing support and adjustability; other embodiments incorporate the mechanisms above in exercise equipment for providing an opposing force against a user's load; some embodiments are incorporated into robotics, military equipment, automobile windows, and other equipment which utilizes a lifting or supporting force.

Examples of Furniture Systems

Figure 32:
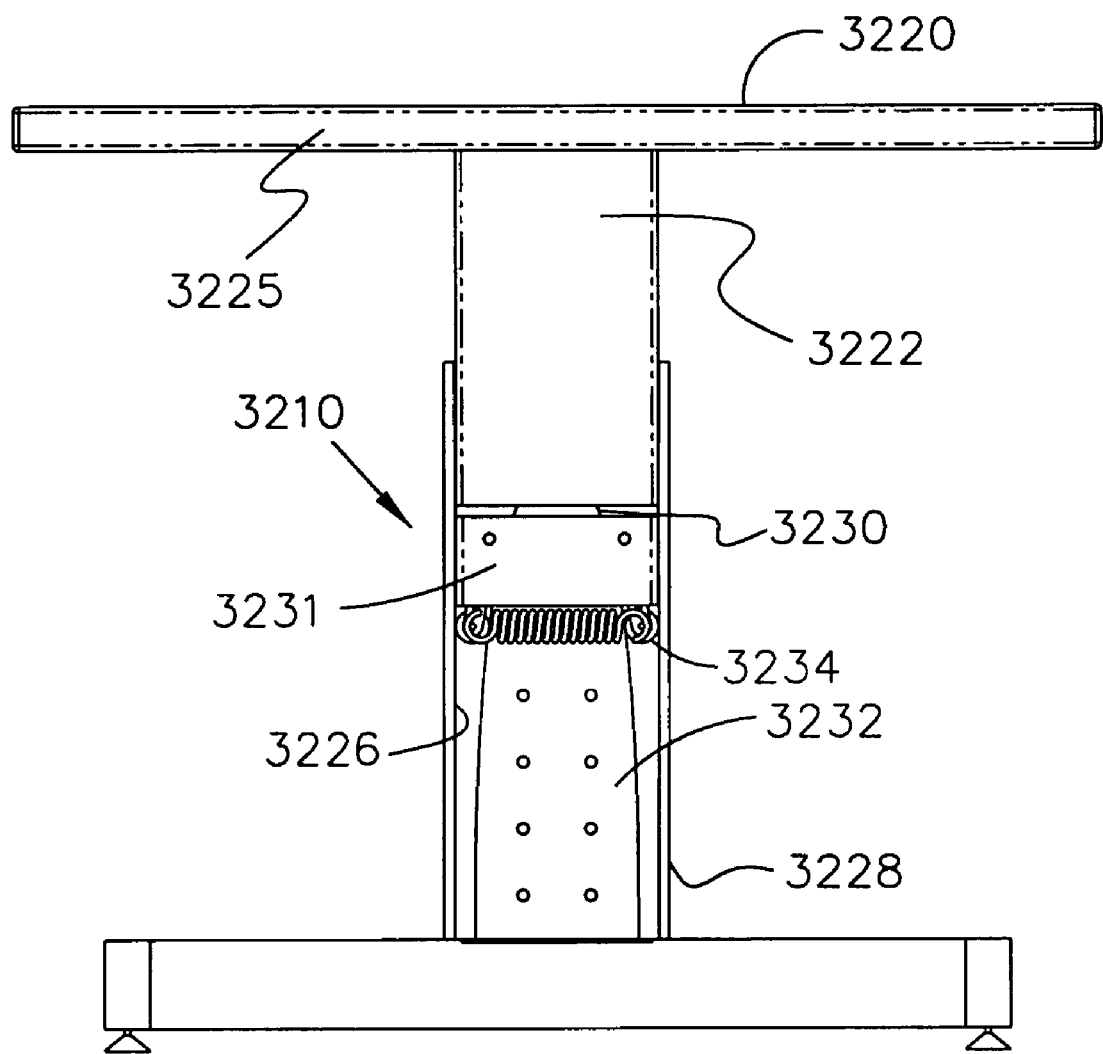
FIG. 32 is a front view illustrating a furniture support mechanism constructed in accordance with one embodiment.

FIG. 32 shows a worktable 3210 constructed in accordance with one embodiment. The features presented are applicable to a wide range of furniture, including children's desks, for example.

Worktable 3210 includes a main body 3220 and a mechanism 3230. Main body 3220 includes a first section 3222 and a second section 3224. Section 3222 includes a work surface or support surface 3225. Second section 3224 is a base section for supporting the first section 3222. First section 3222 is, in one option, slidably coupled with second section 3224 along a guide 3226, which comprises an inner surface of a vertical portion 3228 of second section 3224. Alternatively, first section 3222 can be coupled to an outer portion of vertical portion 3228. Other alternatives for worktables are within the scope of the present embodiment.

Mechanism 3230 is coupled between first section 3222 and second section 3224 to provide support and adjustability of first section 3222 relative to second section 3224. Mechanism 3230 generally includes a truck 3231 which is attached to first section 3222 and translates within guide 3226, and a cam 3232 which is coupled to second section 3224. Alternatively, the truck can be attached to second section 3224 and the cam can be attached to first section 3222. When a downward force is applied to first section 3222, the force is transferred via the truck 3231 to cam followers 3234. Truck 3231 moves within the guide 3226. The cams 3232 provide an opposing, supporting force on first section 3222 via the cam followers 3234.

Mechanism 3230 includes one or more features of the mechanism discussed above. In one embodiment, it provides a constant vertical force, allowing a user to quickly and easily adjust the height of the table surface. Some embodiments include an adjustment mechanism as described above so a user can adjust the overall strength of the mechanism depending on the load.

Figure 33A:
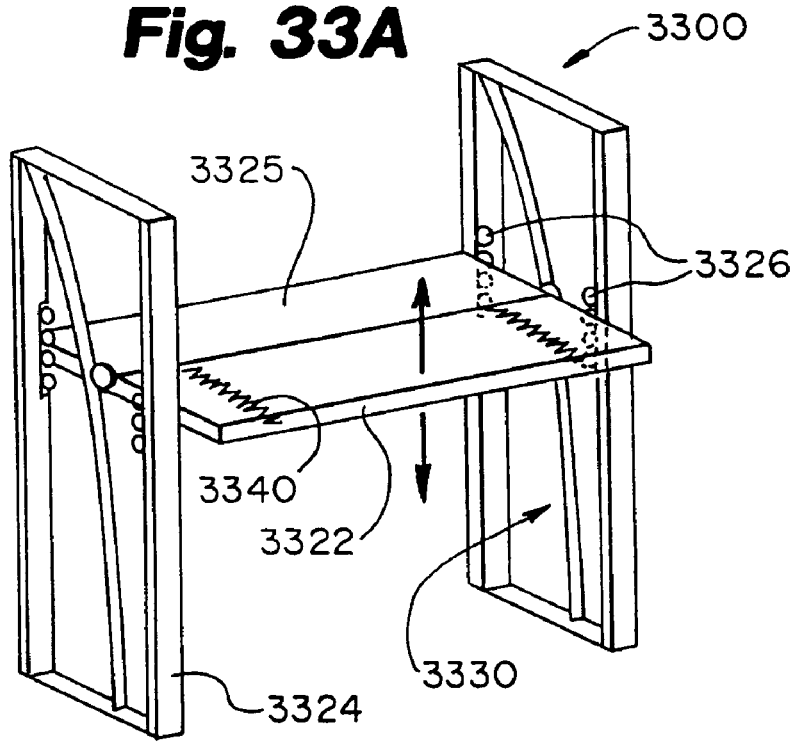
FIG. 33A is an isometric view illustrating a furniture support mechanism constructed in accordance with one embodiment.

FIG. 33A shows an adjustable shelf 3300 according to one embodiment. Shelf 3300 includes a mechanism 3330, a first section 3322, and a second section 3324. Section 3322 includes a work surface or support surface 3325. Second section 3324 is a base section for supporting the first section 3322. First section 3322 is, in one option, slidably coupled with second section 3324 along a guide 3326, which comprises an inner surface of a vertical portion of second section 3324.

Mechanism 3330 is coupled between first section 3322 and second section 3324 to provide support and adjustability of first section 3322 relative to second section 3324. In this embodiment, an energy storage member 3340 is compressed by a cam via one or more cam followers as the work surface 3325 descends.

Mechanism 3330 includes one or more features of the mechanism discussed above. In one embodiment, it provides a constant vertical force, allowing a user to quickly and easily adjust the height of the shelf surface. Some embodiments include an adjustment mechanism as described above so a user can adjust the overall strength of the mechanism depending on the load.

Figure 33B:
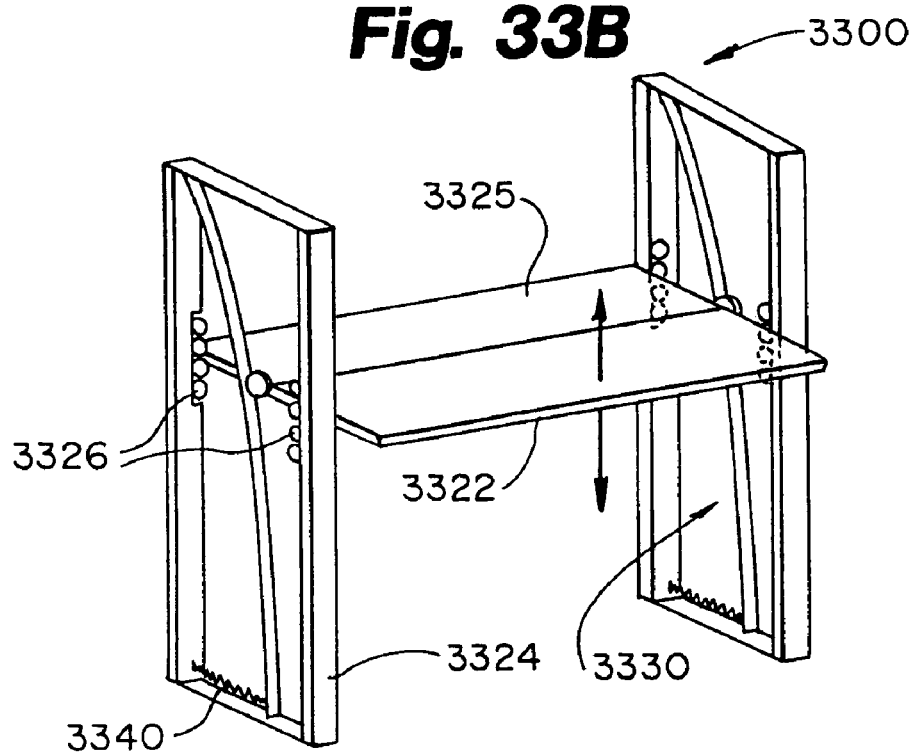
FIG. 33B is an isometric view illustrating a furniture support mechanism constructed in accordance with one embodiment.

FIG. 33B shows adjustable shelf 3300 of FIG. 33A according to another embodiment. In this embodiment, the energy storage member is integral or coupled with the cam and the cam is deflected or displaced as work surface 3325 descends.

Advantageously, the furniture support systems described above are a convenient, cost effective, and reliable way to adjust the position or provide support for furniture.

Examples of Exercise Machine Systems

Figure 34:
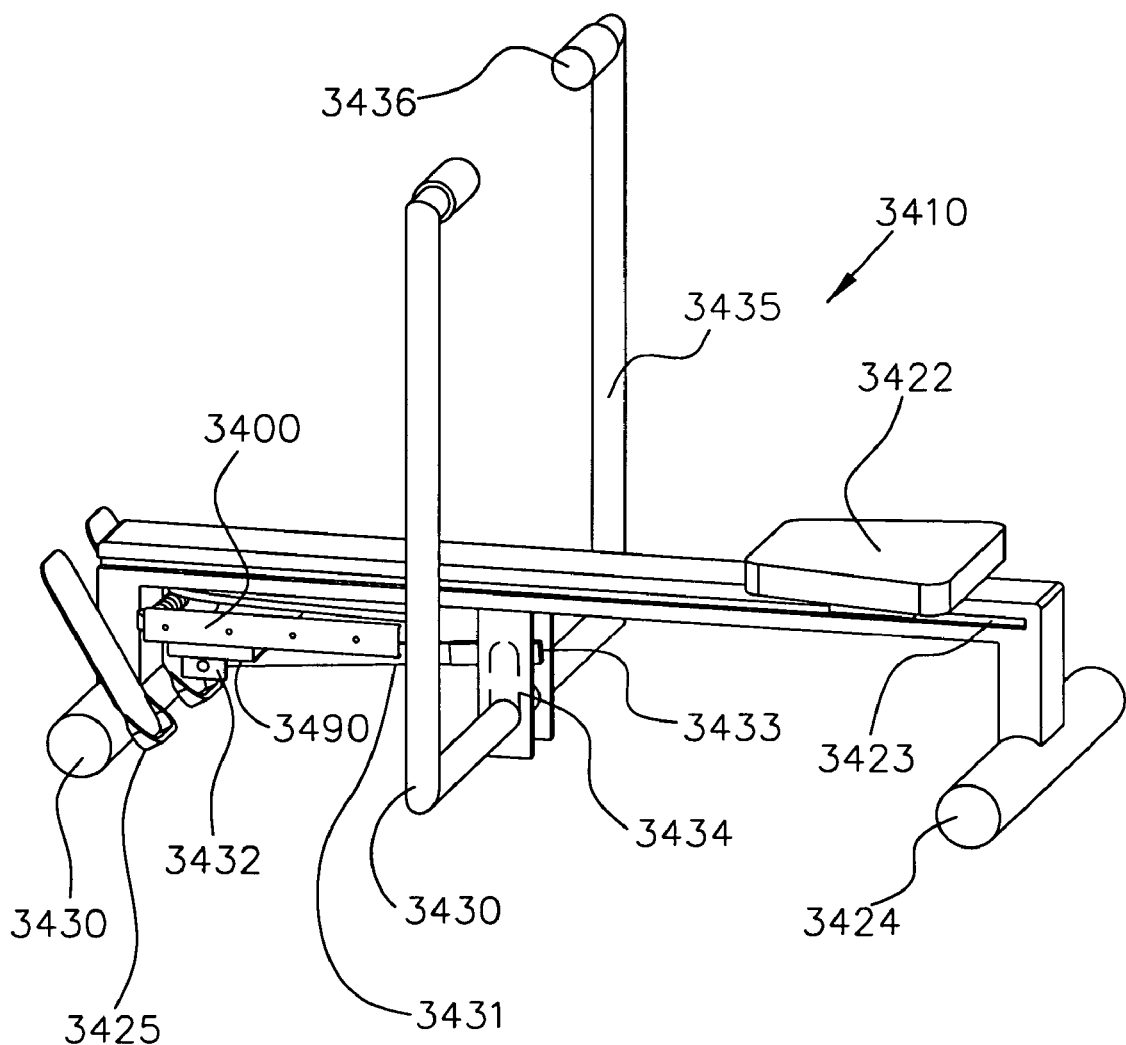
FIG. 34 is a perspective view illustrating an exercise machine constructed in accordance with one embodiment.

FIG. 34 shows an exercise machine 3410. In this embodiment, exercise machine 3410 is a rowing machine. However, the features presented are applicable to a wide range of exercise equipment, such as, but not limited to, weight lifting equipment.

Exercise machine 3410 includes a main body 3420, an interface member 3430, and a force mechanism 3400. Main body 3420 includes a seat 3422 which is slidably coupled to main body 3420 within a guide 3423. Main body 3420 also includes a pair of legs 3424 and a pair of footrests 3425. Other alternatives for main body 3420 are within the scope of the present embodiment.

Interface member 3430 provides a user-controlled connection between the user and force mechanism 3400. Interface member 3430 generally includes a central portion 3437 which is attached to main body 3420 and a coupling portion 3431 which is coupled to mechanism 3400 at a first end 3433. Member 3430 also includes an actuating member 3435, which is rotatably coupled to central portion 3437 so that when actuating member 3435 is rotated, a member 3434 which is attached to actuating member 3435 applies a force on a second end of coupling member 3431 which is transferred via the coupling member to mechanism 3400. Exercise machine 3410 also includes a pair of handles 3436 at the ends of actuating members 3435 for a user to grip and pull on the actuating members.

Mechanism 3400 is attached to main body 3400 and includes a truck 3490 which is coupled to coupling member 3431. When a user pulls on handles 3436, actuating member 3435 is rotated. This in turn applies a force via coupling member 3431 to truck 3490. Truck 3490 then moves within a guide of mechanism 3400 as described above. Mechanism 3400 then provides an opposing force to the force applied by the user. As discussed above, in one embodiment, mechanism 3400 provides a constant resistive force as the truck slides along the guide.

As discussed above, mechanism 3400 provides a slim, simple, adjustable, resistive force mechanism for exercise equipment such as exercise machine 3410.

One or more embodiments described above are useful for providing opposing, resistive force for a variety of exercise machines.

Figure 35:
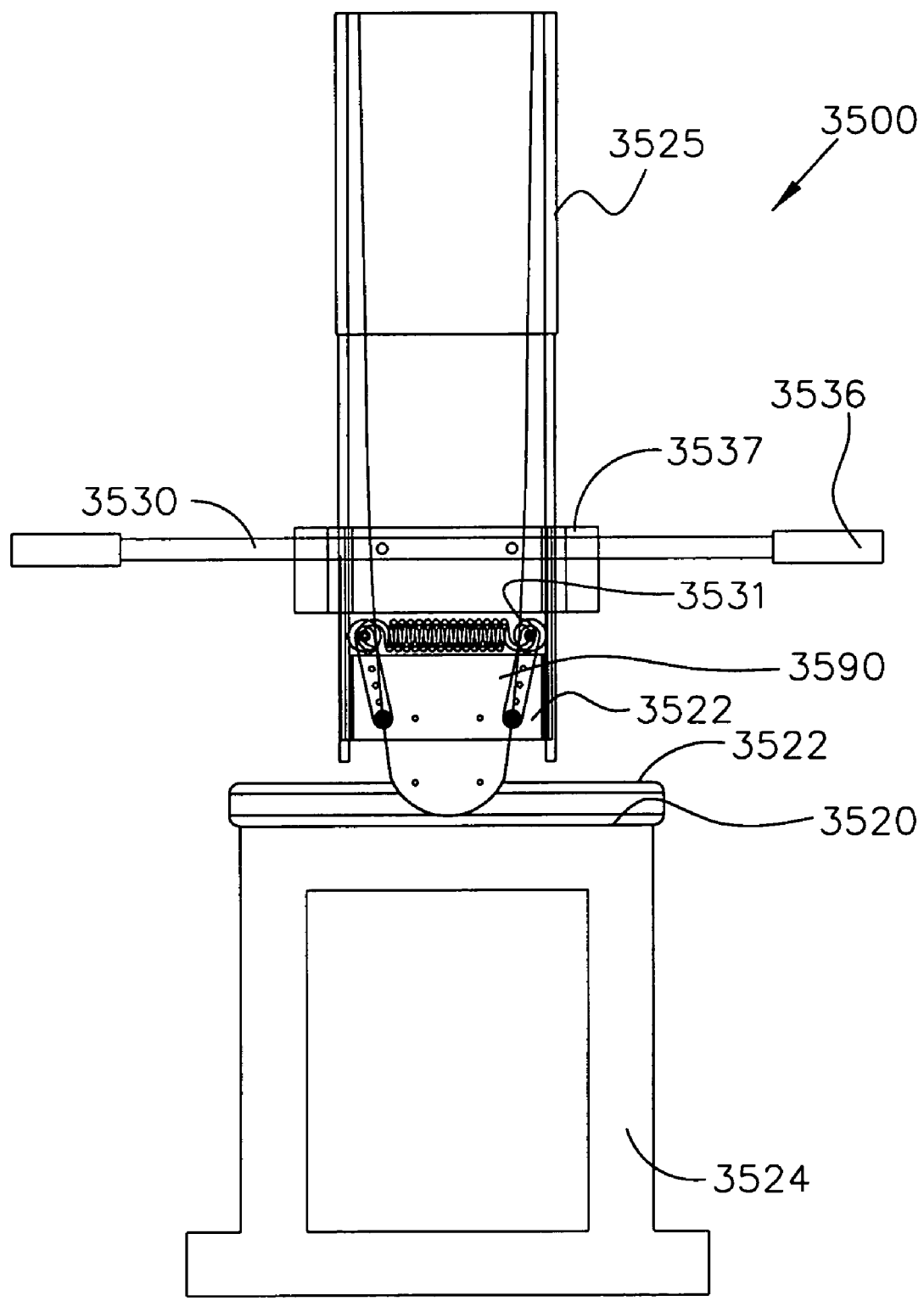
FIG. 35 is a perspective view illustrating an exercise machine constructed in accordance with one embodiment.

FIG. 35 shows a front view of an exercise machine 3510 in accord with one embodiment. In this embodiment, the exercise machine is a bench press system. However, as noted above in regards to FIG. 34, the features presented are applicable to a wide range of exercise equipment.

Exercise machine 3500 includes a main body 3520, an interface member 3530, and a force mechanism 3540. Main body 3520 includes a bench 3522 which is coupled to main body 3520. Main body 3520 also includes support legs 3524. Other alternatives for main body 3520 are well known in the art and are within the scope of the present embodiment.

Interface member 3530 provides a user-controlled connection between the user and force mechanism 3540. Interface member 3530 generally includes a central portion 3537 which is slidably coupled to main body 3520 along a support guide 3525, and a coupling portion 3531 which is coupled to mechanism 3540. Member 3530 also includes an actuating member 3535, which is coupled to central portion 3537 so that when actuating member 3535 is pushed by the user, it provides a force on coupling member 3531 which is transferred via the coupling member to mechanism 3540. Exercise machine 3540 also includes a pair of handles 3536 at the ends of actuating members 3535 for a user to grip and push on the actuating members.

Mechanism 3540 is attached to main body 3524 and includes a truck 3590 which is coupled to coupling member 3531. When a user pushes on handles 3536, actuating member 3535 is raised. This in turn applies a force via coupling member 3531 to truck 3590. Truck 3590 then moves within a guide of mechanism 3540 as described above. Mechanism 3540 then provides an opposing force to the force applied by the user. In other embodiments, the other mechanisms discussed above can be used in place of mechanism 3540.

As noted above, in one embodiment, the present system is incorporated into a robotics system. For instance, one or more mechanisms can be incorporated into dummies or mannequins used for firearm or artillery practice for the police or armed forces. In one example, a mechanism provides the lifting force needed to raise such a dummy after it has been "shot." Since the present system provides a stored energy force, the mechanism can be driven by a small motor, thus decreasing the size and cost of the overall system.

Figure 38:
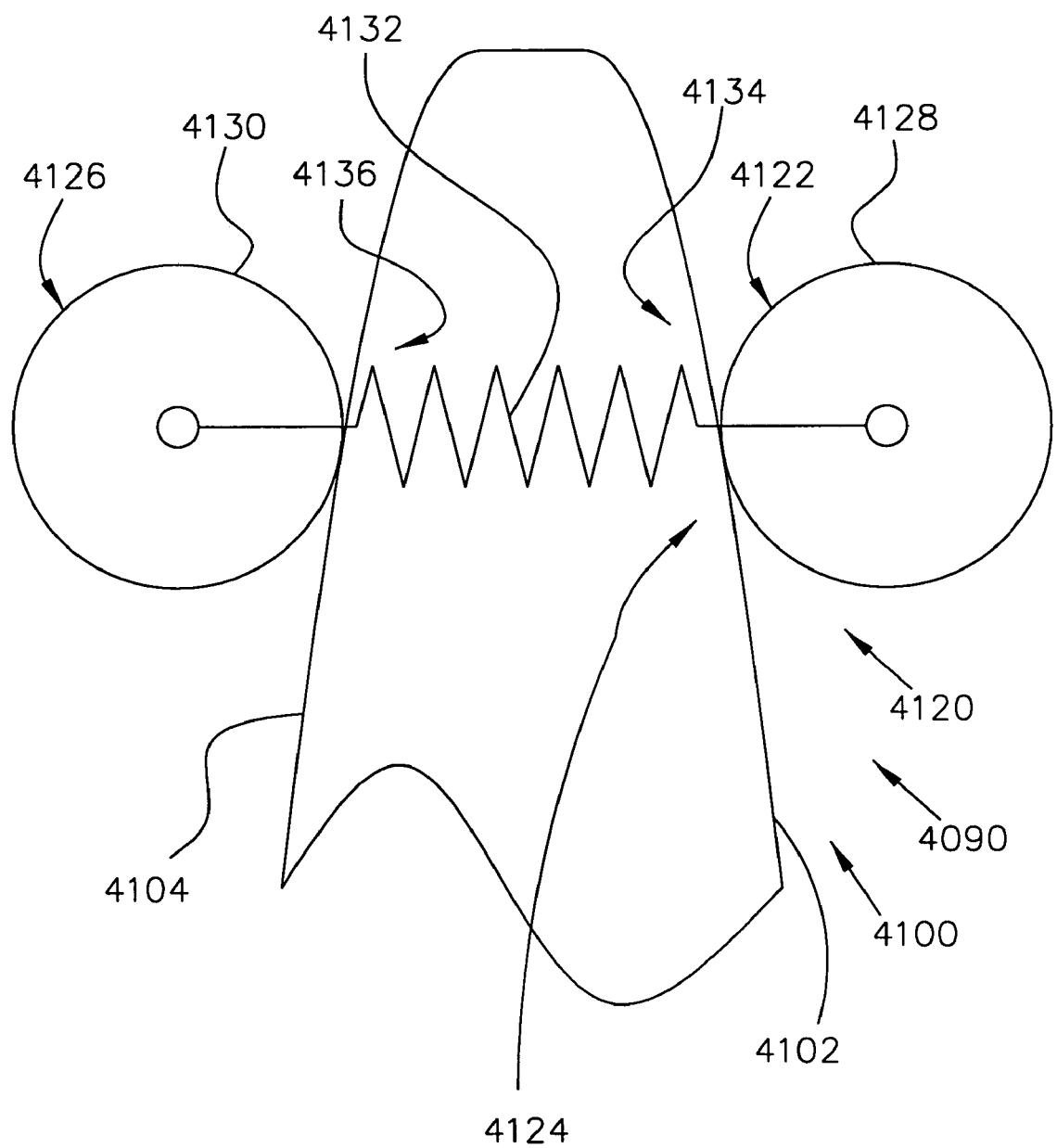
FIG. 38 is a plan view of an apparatus in accordance with an exemplary embodiment of present invention.

FIG. 38 is a plan view of an apparatus 4090 in accordance with an exemplary embodiment of present invention. Apparatus 4090 includes a cam 4100 and a cam following assembly 4120. Cam 4100 comprises a first guiding surface 4102 and a second guiding surface 4104.

It is to be appreciated that various embodiments of cam 4100 are possible without deviating from the spirit and scope of the present invention. For example, a cam in accordance with the present invention may have one, two, and/or more than two guiding surfaces. By way of a second example, an apparatus in accordance with the present invention may include a cam having a generally conical shape.

Cam following assembly 4120 includes a first follower 4122, a second follower 4126, and a spring 4132 having a first end 4134 coupled to first follower 4122 and a second end 4136 coupled to second follower 4126. First follower 4122 has a first following surface 4128 for engaging first guiding surface 4102 of cam 4100 at least at a first contact point 4124. Second follower 4126 has a second following surface 4130 for engaging second guiding surface 4104 of cam 4100.

It is to be appreciated that various embodiments of first follower 4122 and a second follower 4126 are possible without deviating from the spirit and scope of the present invention. For example, embodiments are possible in which first follower 4122 and second follower 4126 each comprise a roller that is adapted to rotate about an axis of rotation. By way of a second example, first follower 4122 and second follower 4126 may each comprise a non-rotating member.

Figure 39:
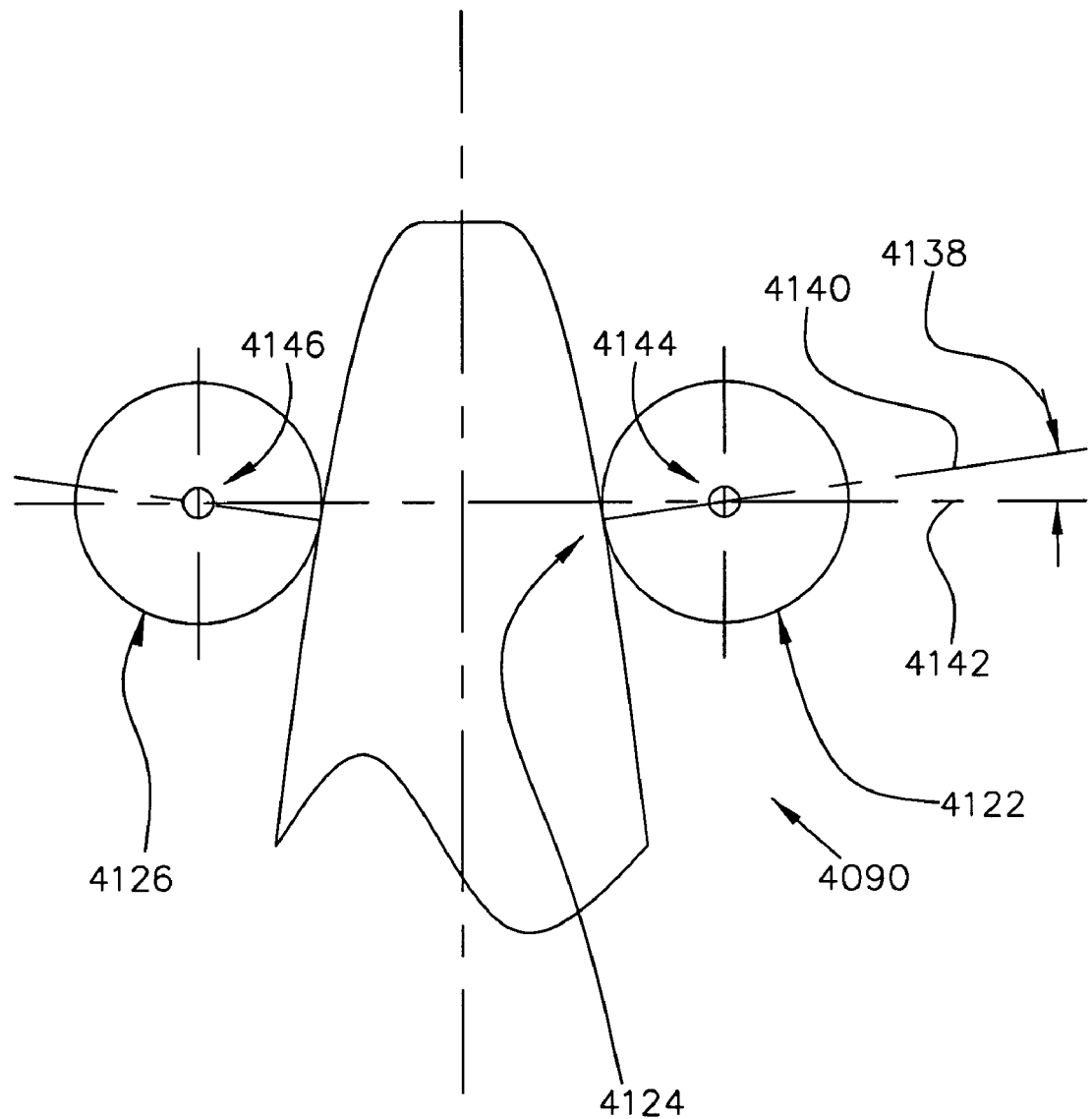
FIG. 39 is an additional plan view showing the apparatus of FIG. 38.

FIG. 39 is an additional plan view showing apparatus 4090 of FIG. 38. In FIG. 39 it may be appreciated that, first follower 4122 has a contact angle 4138 defined by a first imaginary line 4140 extending through first contact point 4124 and a central axis 4144 of first follower 4122, and an imaginary reference line 4142 extending between central axis 4144 of first follower 4122 and a central axis 4146 of second follower 4126.

Figure 40:
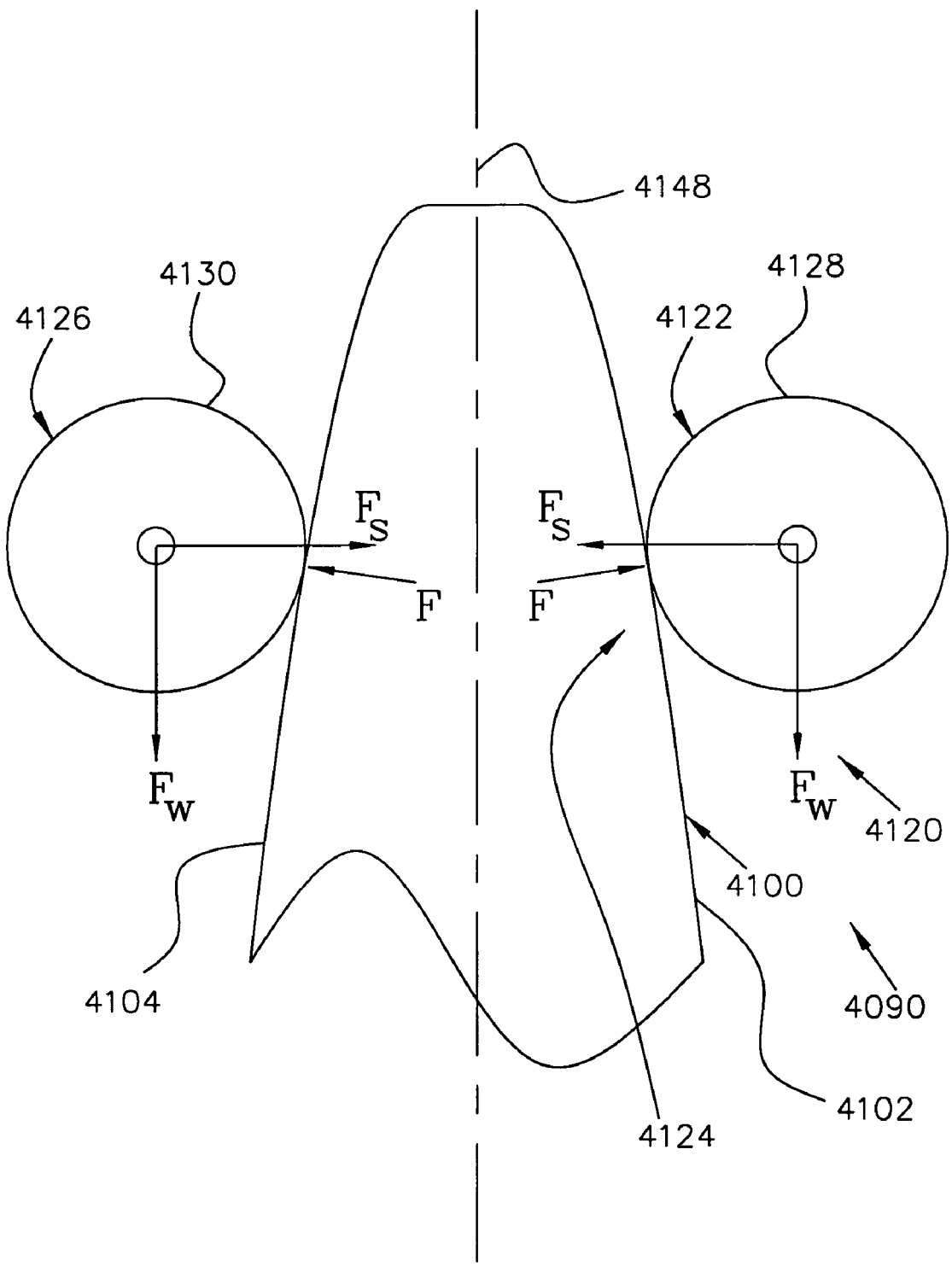
FIG. 40 is an additional plan view showing the apparatus of FIG. 38.

FIG. 40 is an additional plan view showing apparatus 4090 of FIG. 38. In the embodiment of FIG. 40, various forces acting on first follower 4122 and second follower 4126 are illustrated. As shown in FIG. 40, spring 4132 urges first follower 4122 and second follower 4126 toward one another with a force Fs. In the embodiment of FIG. 40, cam following assembly 4120 supports a load. The load supported by cam following assembly 4120 produces a generally downward force of Fw on each roller.

In the embodiment of FIG. 40, first follower 4122 contacts first guiding surface 4102 of cam 4100 at a first contact point 4124. In a preferred embodiment, first following surface 4128 of first follower 4122 and first guiding surface 4102 of cam 4100 are tangent to one another at first contact point 4124. As shown in FIG. 40, first guiding surface 4102 of cam 4100 acts on first following surface 4128 of first follower 4122 with a reactionary force F.

Reactionary force F may be converting into a first reaction force component which is generally parallel to the path of cam following assembly 4120 and a second reaction force component which is generally perpendicular to the first reaction force. In the embodiment of FIG. 40, the path of cam following assembly 4120 is generally parallel to longitudinal axis 4148 of cam 4100.

Figure 41:
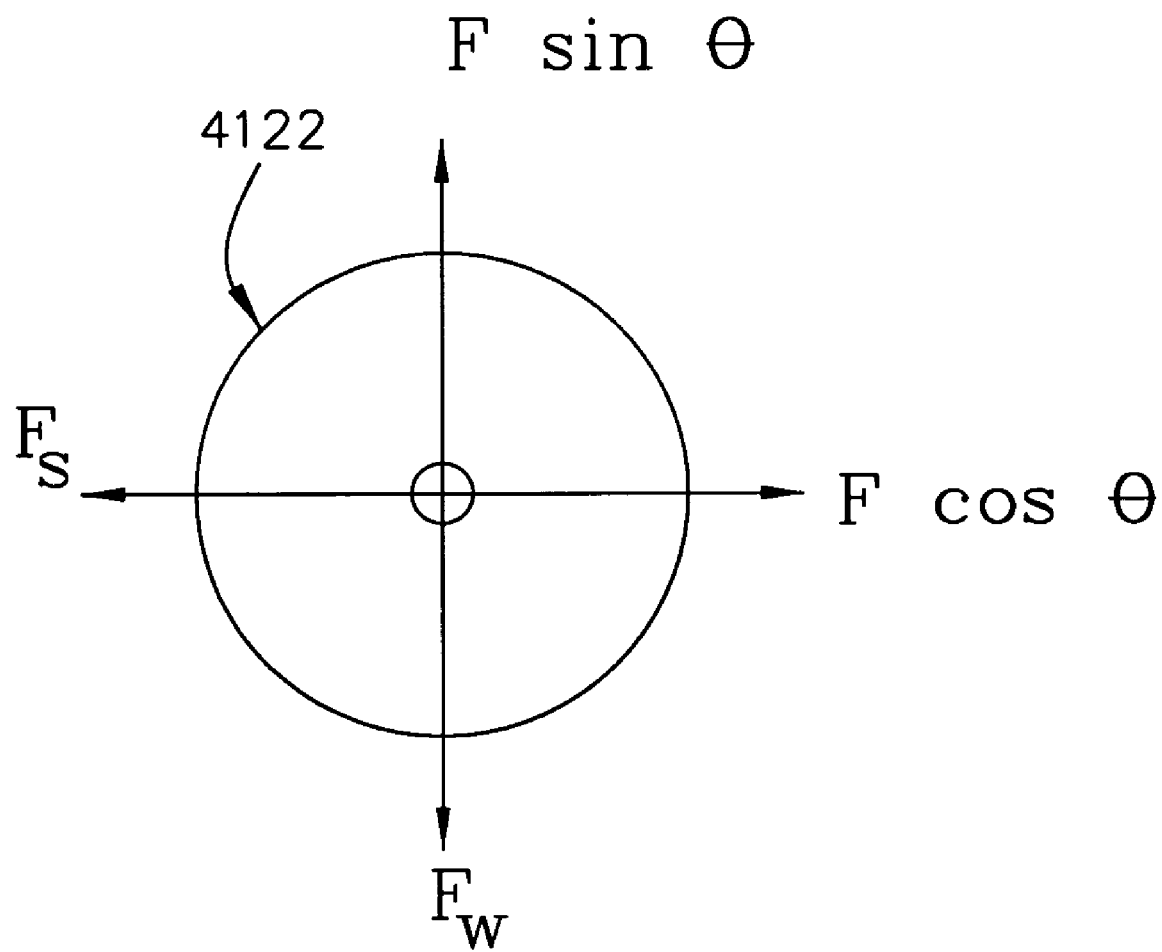
FIG. 41 is a free body diagram of first roller of FIG. 38, FIG. 39, and FIG. 40.

FIG. 41 is a free body diagram of first follower 4122 of FIG. 38, FIG. 39, and FIG. 40. In the embodiment of FIG. 41, first follower 4122 may be considered to be at equilibrium. Balancing the forces acting on first follower 4122 in a direction perpendicular to longitudinal axis 4148 yields:

$Fs = F \cos \Theta$

Balancing the forces acting on first follower 4122 in a direction generally parallel to longitudinal axis 4148 yields:

$Fw = F \sin \Theta$

Solving for F in both expressions above yields:

$$F = \frac{Fs}{\cos \Theta} = \frac{Fw}{\sin \Theta}$$

The weight of the load will remain substantially constant in many applications. Solving for Fw yields:

$Fw = \text{TAN} \Theta (Fs)$

Figure 42:
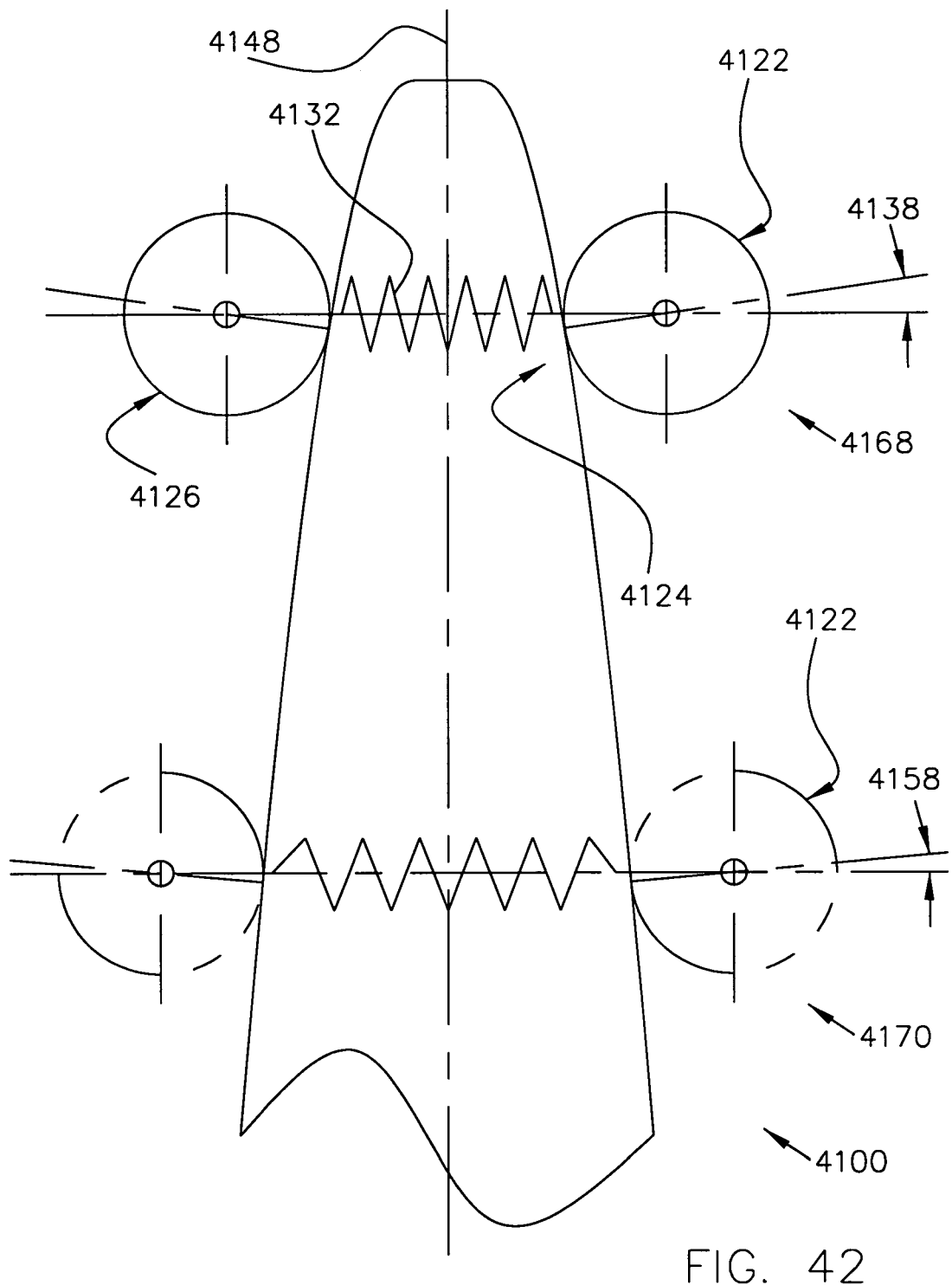
FIG. 42 is an additional plan view including apparatus of FIG. 38.

FIG. 42 is an additional plan view including apparatus 4090 of FIG. 38. In FIG. 42 it may be appreciated that cam following assembly 4120 may be moved between at least a first position 4168 and a second position 4170. In the embodiment of FIG. 42, the first position of first follower 4122 is shown using solid lines and the second position of first follower 4122 is shown using phantom lines.

In a preferred embodiment, the first guiding surface 4102 of the cam 4100 has a continually changing slope and/or a continually changing radius of curvature so that the contact angle 4138 of the first follower 4122 changes as the cam following assembly 4120 moves along longitudinal axis 4148 of the cam 4100. In the embodiment of FIG. 42, spring 4132 has a first deflection when cam following assembly 4120 is in first position 4168 and a second deflection when cam following assembly 4120 is in second position 4170. Also in the embodiment of FIG. 42, first follower 4122 has a first contact angle 4138 when cam following assembly 4120 is in first position 4168 and a second contact angle 4158 when cam following assembly 4120 is in second position 4170. As shown in FIG. 42, first contact angle 4138 is different from second contact angle 4158, and the first deflection is different from the second deflection.

The force exerted by the spring (Fs) is equal to the K factor (K) of the spring multiplied by the total deflection of the spring ($2\partial$). Substituting this relationship into the expression above yields:

$Fw = \text{TAN} \Theta (k)(2\delta)$

At equilibrium the force produced by the mechanism is equal to the weight of the load. This is true at the first position and at the second position.

$\text{TAN} \Theta_1 (k_1)(2\delta_1) = \text{TAN} \Theta_2 (k_2)(2\delta_2)$ $\text{TAN} \Theta_1 (k_1)(\delta_1) = \text{TAN} \Theta_2 (k_2)(\delta_2)$ $\text{TAN} \Theta_1 (\delta_1) = \text{TAN} \Theta_2 (\delta_2)$ $\delta_1 / \delta_2 = \text{TAN} \Theta_2 / \text{TAN} \Theta_1$ In a preferred embodiment, first guiding surface 4102 of the cam 4100 has a continually changing slope and/or a continually changing radius of curvature so that the contact angle of the first follower 4122 changes as the cam following assembly 4120 moves along a longitudinal axis 4148 of the cam 4100. The slope and/or the radius of curvature of first guiding surface 4102 may be selected to produce various desirable force profiles.

In the embodiment of FIG. 42, a constant substantially longitudinal force may be produced between cam 4100 and cam following assembly 4120. In this embodiment, cam 4100 is configured such that the deflection of the spring 4132 varies in a manner substantially inversely proportionally to an associated variation in the trigonometric TAN function of the contact angle 4138 throughout the travel of the cam following assembly 4120.

It is to be appreciated that an apparatus in accordance with the present invention may include various types of springs without deviating from the spirit and scope of the present invention. Examples of springs which may be suitable in: some applications include coil springs, leaf springs, elastameric springs, and gas springs. It should also be appreciated that various embodiments of first follower 4122 and a second end 4136 are possible without deviating from the spirit and scope of the present invention. For example, a follower may comprise a member having a low friction surface and being configured to mate with the guiding surfaces of a cam. By way of a second example, embodiments are possible in which first follower 4122 and second follower 4126 each comprise a roller that is adapted to rotate about an axis of rotation.

Figure 43:
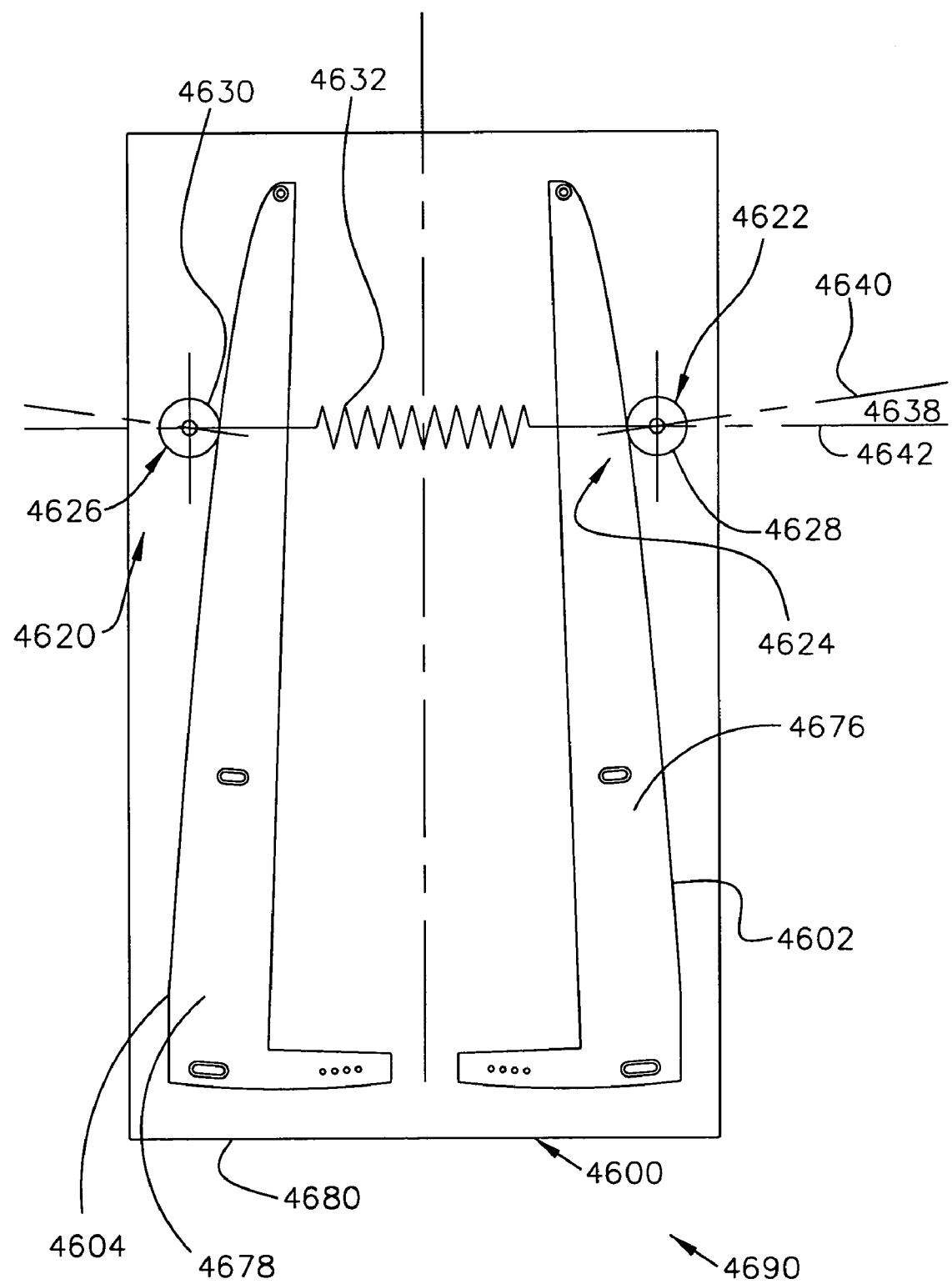
FIG. 43 is a plan view of an apparatus in accordance with an exemplary embodiment of the present invention.

FIG. 43 is a plan view of an apparatus 4690 in accordance with an exemplary embodiment of the present invention. Methods in accordance with the present invention may be used to adjust the force produced by apparatus 4690. Apparatus 4690, comprises a cam assembly 4600 and a cam following assembly 4620. Cam assembly 4600 includes a first cam member 4676 defining a first guiding surface 4602 and a second cam member 4678 defining a second guiding surface 4604. Cam following assembly 4620 includes a first roller 4622 having a first following surface 4628 engaging first guiding surface 4602 of cam assembly 4600 at least at a first contact point. In the embodiment of FIG. 43, cam following assembly 4620 includes a second roller 4626 having a second following surface 4630 engaging second guiding surface 4604 of cam assembly 4600. Also in the embodiment of FIG. 43, cam following assembly 4620 includes a spring 4632 having a first end coupled to first roller 4622 and a second end coupled to second roller 4626.

In a preferred embodiment, first cam member 4676 of cam assembly 4600 and second cam member 4678 of cam assembly 4600 are moveable relative to one another. In a particularly preferred embodiment, first cam member 4676 of cam assembly 4600 and second cam member 4678 of cam assembly 4600 are both rotatably coupled to a base member 4680 such that first cam member 4676 of cam assembly 4600 and second cam member 4678 of cam assembly 4600 are rotatable relative to one another.

As shown in FIG. 43 first roller 4622 has a contact angle 4638 defined by a first imaginary line 4640 extending through first contact point 4624 and a central axis of first roller 4622, and a imaginary reference line 4642 extending between the central axis of first roller 4622 and a central axis of second roller 4626. In a preferred embodiment, the first cam member 4676 of cam assembly 4600 and second cam member 4678 of cam assembly 4600 are rotatable relative to one another to adjust contact angle 4638.

Additional embodiments of apparatus 4690 are possible without deviating from the spirit and scope of the present invention. For example, embodiments are possible in which first cam member 4676 of cam assembly 4600 and second cam member 4678 of cam assembly 4600 are both slidingly coupled to a base member 4680 such that first cam member 4676 of cam assembly 4600 and second cam member 4678 of cam assembly 4600 are moveable along an adjustment axis relative to one another. In one method in accordance with the present invention, a force produced by apparatus 4690 may be adjusted by moving first cam member 4676 of cam assembly 4600 and second cam member 4678 of cam assembly 4600 along an adjustment axis relative to one another. In this exemplary method, first cam member 4676 of cam assembly 4600 and second cam member 4678 of cam assembly 4600 may be moveable along an adjustment axis relative to one another to adjust a bias of spring 4632. In some embodiments the adjustment axis may be disposed generally perpendicularly to a longitudinal axis 4648 of cam assembly 4600.

Figure 44:
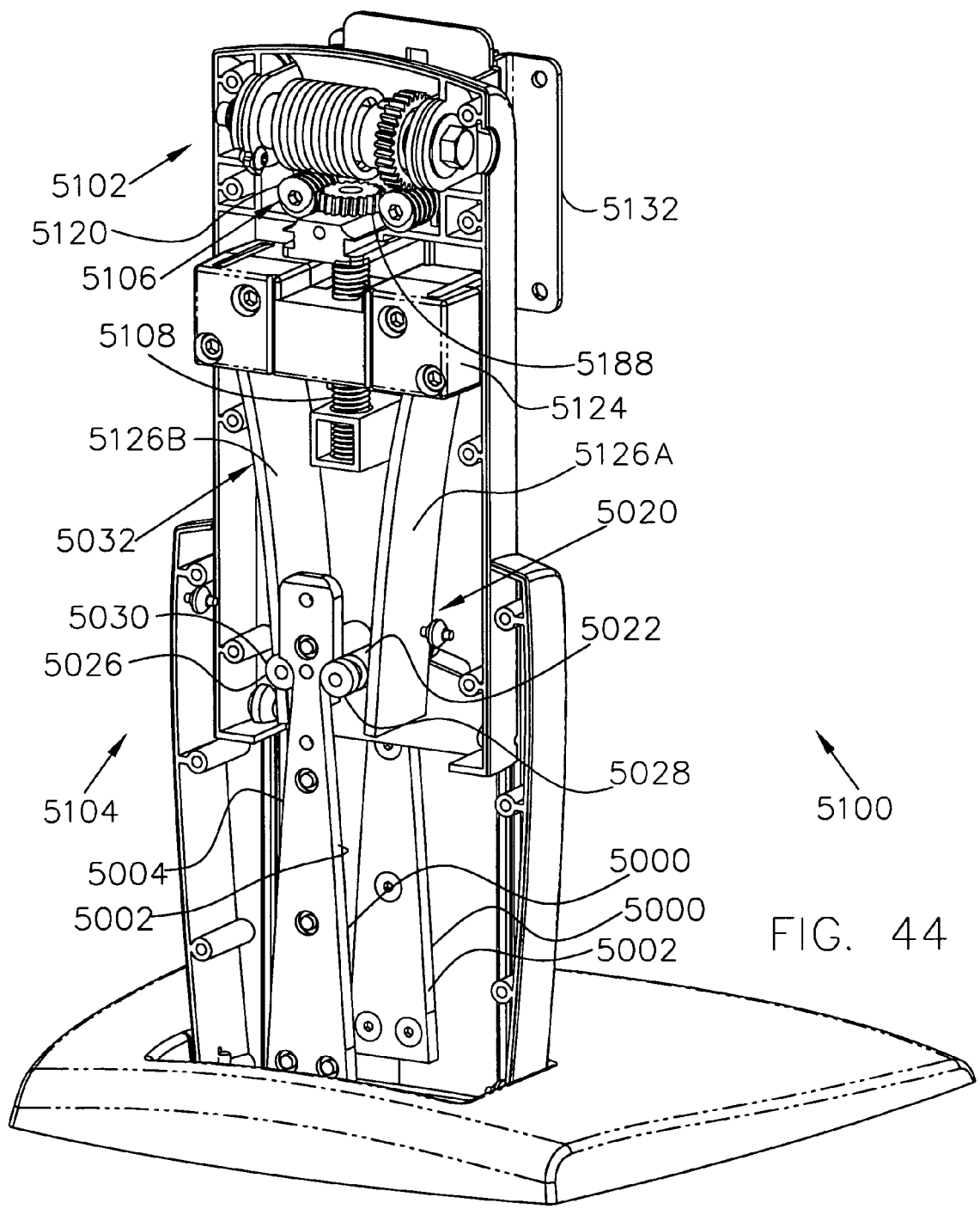
FIG. 44 is a perspective view of an apparatus in accordance with an additional exemplary embodiment of the present invention.

FIG. 44 is a perspective view of an apparatus 5100 in accordance with an additional exemplary embodiment of the present invention. Apparatus 5100 of FIG. 44 includes a force generating mechanism 5104 and a pivot mechanism 5102. In one embodiment, force generating mechanism 5104 of apparatus 5100 is configured to produce a substantially constant force over a longitudinal travel thereof. In a preferred embodiment, the magnitude of the constant force is adjustable using a force adjustment mechanism 5106.

In the embodiment of FIG. 44, force adjustment mechanism 5106 includes a threaded rod 5108, a first adjustment gear 5188, and a first worm 5120. First adjustment gear 5188 is fixed to threaded rod 5108 proximate an end thereof. As shown in FIG. 44, first worm 5120 is disposed in an intermeshed arrangement with first adjustment gear 5188. First worm 5120 has a wrench socket that is preferably adapted to receive a wrench, for example, an Allen wrench. An adjustment block 5124 is threadingly coupled to threaded rod 5108.

Force generating mechanism 5104 of apparatus 5100 includes a cam 5000 and a cam following assembly 5020. Cam 5000 has a first guiding surface 5002 and a second guiding surface 5004. Cam following assembly 5020 includes a first roller 5022 having a first following surface 5028 engaging the first guiding surface 5002 of the cam 5000 at least at a first contact point and a second roller 5026 having a second following surface 5030 engaging the second guiding surface 5004 of the cam 5000. Cam following assembly 5020 also includes a spring assembly 5032 that is arranged to bias first roller 5022 toward first guiding surface 5002 of cam 5000. Spring assembly 5032 is preferably also arranged to bias second roller 5026 toward second guiding surface 5004 of cam 5000.

Spring assembly 5032 includes a first leaf spring 5126A, a second leaf spring 5126B, and an adjustment block 5124. As shown in FIG. 44, first leaf spring 5126A and second leaf spring 5126B are both fixed to adjustment block 5124. Threaded rod 5108 of force adjustment mechanism 5106 is disposed in threading engagement with adjustment block 5124. In a preferred method in accordance with the present invention, force adjustment mechanism 5106 may be used to move adjustment block 5124 along a longitudinal axis of force generating mechanism 5104. In a preferred embodiment, movement of adjustment block 5124 along the longitudinal axis will vary the effective length of first leaf spring 5126 and second leaf spring 5128. In a particularly preferred embodiment, movement of adjustment block 5124 along the longitudinal axis will vary both the effective length and a pre-tension of first leaf spring 5126 and second leaf spring 5128.

In a preferred method in accordance with the present invention, the pre-tension of first leaf spring 5126 and second leaf spring 5128, may be varied to enable apparatus 5100 to support loads having various weights. In this preferred method, the same apparatus may be used with a variety of different devices having different weights.

Figure 45:
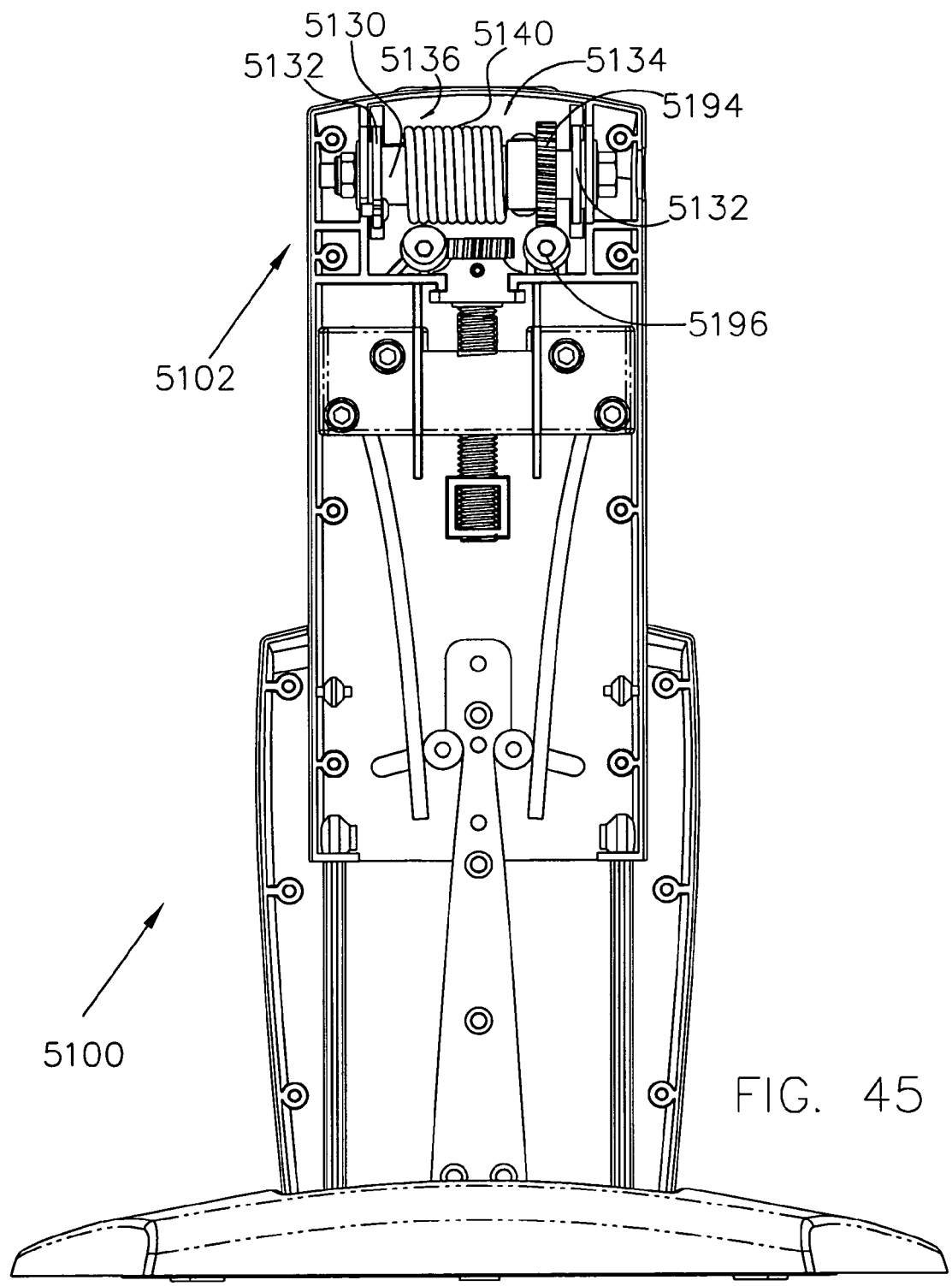
FIG. 45 is a plan view of apparatus of FIG. 44.

FIG. 45 is a plan view of apparatus 5100 of FIG. 44. In FIG. 45, it may be appreciated that pivot mechanism 5102 comprises an axle 5130 and a torsional spring 5140 disposed about axle 5130. A mounting bracket 5132 of pivoting mechanism 5192 is disposed in pivotal engagement with axle 5130. A first end 5136 of torsional spring 5140 is coupled to mounting bracket 5132. A second end 5134 of torsional spring 5140 is coupled to a second adjustment gear 5194. Second adjustment gear 5194 has a plurality of gear teeth which are intermeshed with the teeth of a second worm 5196. Second worm 5196 includes an adjustment tool interface. In the embodiment of this figure, the adjustment tool interface comprises a socket adapted to receive an Allen wrench. Rotating second worm 5196 results in rotation of one end of torsional spring 5140. In the embodiment of the present figure, rotation of one end of torsional spring 5140 relative to the other end of torsional spring 5140 may be used to pre-torque torsional spring 5140.

It is to be appreciated that various embodiments of first worm 5120 and second worm 5196 are possible without deviating from the spirit and scope of the present invention. For example, although the present exemplary embodiment includes worms having sockets adapted to receive an Allen wrench, other embodiments of a worm are possible. For example, an apparatus in accordance with the present invention may include a worm that is configured to mate with another type of tool (e.g., a TORX tool). By way of a second example, an apparatus in accordance with the present invention may include a worm coupled to a knob.

Embodiments of apparatus 5100 are possible in which force adjustment mechanism 5106 and torque adjustment mechanism 5103 are synchronized. For example, in some embodiments, the motion of first adjustment gear 5188 may be synchronized with the motion of second adjustment gear 5194. For example, first adjustment gear 5188 and second adjustment gear 5194 may both be intermeshed with a single worm.

Figure 46:
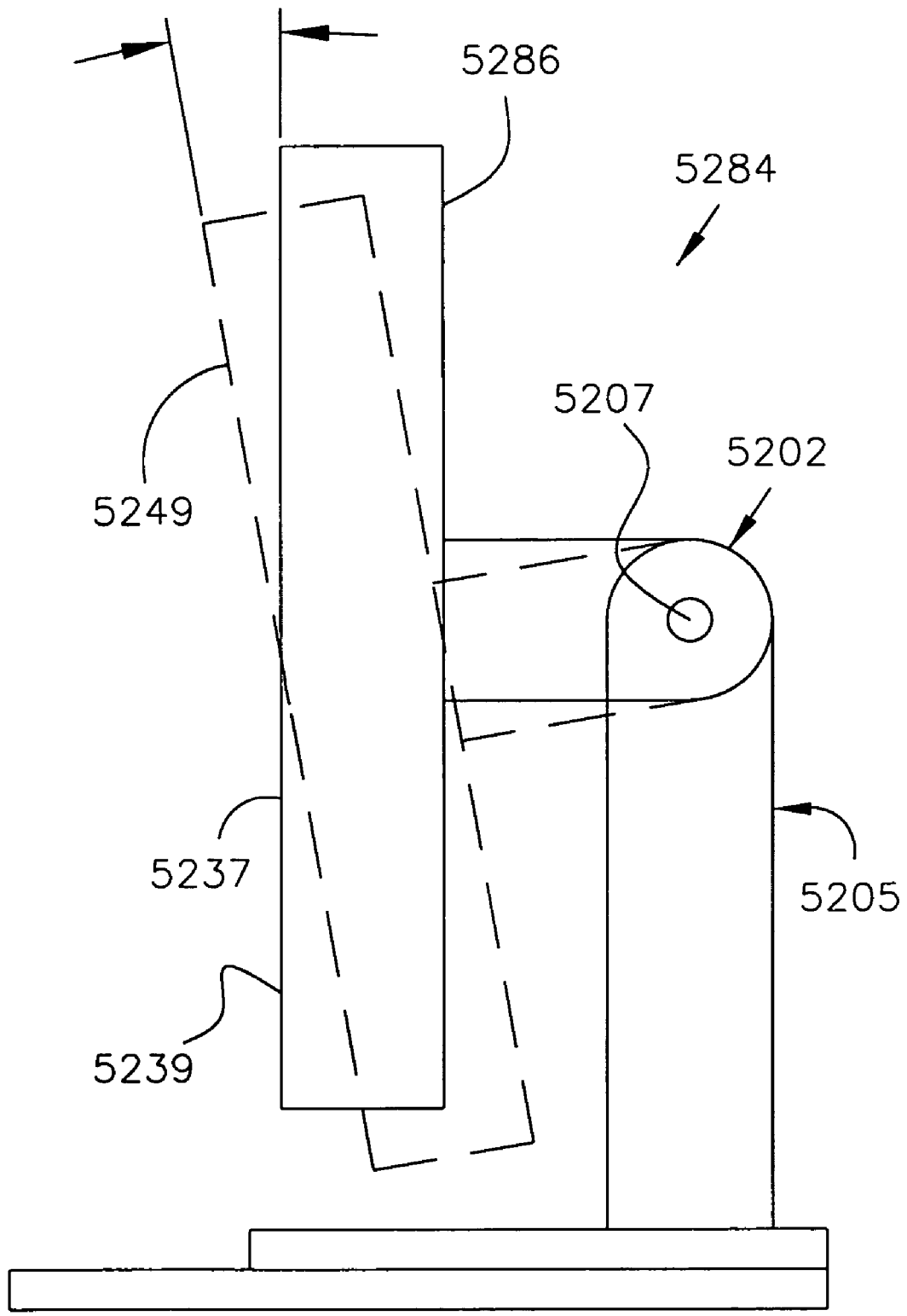
FIG. 46 is a plan view of a computer monitor assembly in accordance with the present invention.

FIG. 46 is a plan view of a computer monitor assembly 5284 in accordance with the present invention. Computer monitor assembly 5284 includes a monitor 5286 and a stand assembly 5205. Stand assembly 5205 includes a pivot mechanism 5202. In the embodiment of FIG. 46, pivot mechanism 5202 is adapted to pivot about an axis of rotation 5207. Monitor 5286 includes a display face 5237.

In the embodiment of FIG. 46, pivot mechanism 5202 is adapted to allow pivoting of monitor 5286 between various positions including a first position 5239 and a second position 5249. In FIG. 46, second position 5249 is illustrated using dashed lines. In the embodiment of FIG. 46, display face 5237 is substantially vertically oriented when monitor 5286 is in first position 5239. Also in the embodiment of FIG. 46, display face 5237 is tilted downward by an angle of about 10 degrees relative vertical when monitor 5286 is in second position 5249.

Figure 47:
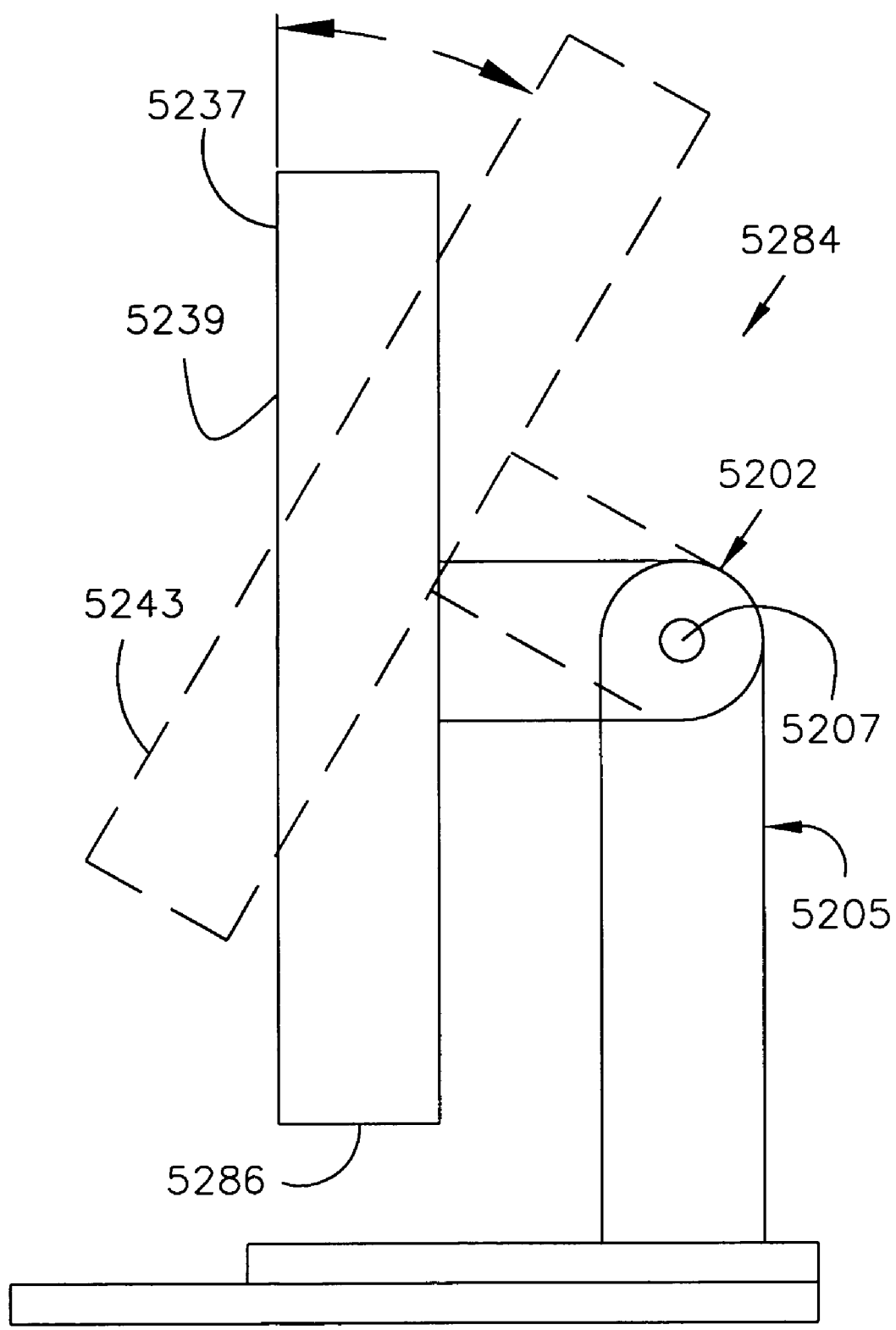
FIG. 47 is an additional plan view of computer monitor assembly of FIG. 46.

FIG. 47 is an additional plan view of computer monitor assembly 5284 of FIG. 46. In FIG. 47, it may be appreciated that monitor 5286 also has a third position 5243 which may be obtained by pivoting monitor 5286 using pivot mechanism 5202. In FIG. 47, first position 5239 is shown in solid lines and third position 5243 is shown with dashed lines. In the embodiment of FIG. 47, display face 5237 is tilted upward by an angle of about 30 degrees relative to vertical when monitor 5286 is in third position 5243.

In the embodiment of FIG. 46 and FIG. 47, the weight of monitor 5286 applies torque about axis of rotation 5207. The magnitude of this torque can be described by the relationship below:

$$T = WL \cos\theta$$

In this relationship, W is the weight of the monitor, L is the moment arm (e.g., the distance between the axis of rotation 5207 and a center of gravity 5209 of monitor 5286). θ is the tilt angle of monitor 5286 measured from a horizontal reference plane. It should be noted that the effective length (L) of the moment arm will vary as the distance between the center of gravity of the monitor 5286 and the axis of rotation 5207 varies during pivoting of monitor 5286.

In the embodiment of FIG. 46 and FIG. 47, the torque produced by the weight of monitor 5286 is preferably, substantially balanced by torque producing mechanism 5223. The torque applied by torque producing mechanism 5223 may, for example, be substantially equal and opposite to the torque applied by the weight of the monitor. In the embodiment of FIGS. 46 and 47, torque producing mechanism 5223 may produce a torque response including a torque created by torsional spring 5240, and a frictional torque. Pivot mechanism 5202 may include a friction producing mechanism 5225. The torque produced by torsional spring 5240 may be described by the mathematically relationship below:

$$T = K\alpha,$$

In this relationship, K is the spring rate of the torsional spring (e.g., in-1b per degree of turn) and α is the degree of turn. In a preferred embodiment, a spring torque in the amount needed to balance the monitor weight is created by applying an adequate amount of pre-twist to the torsional spring.

Figure 48:
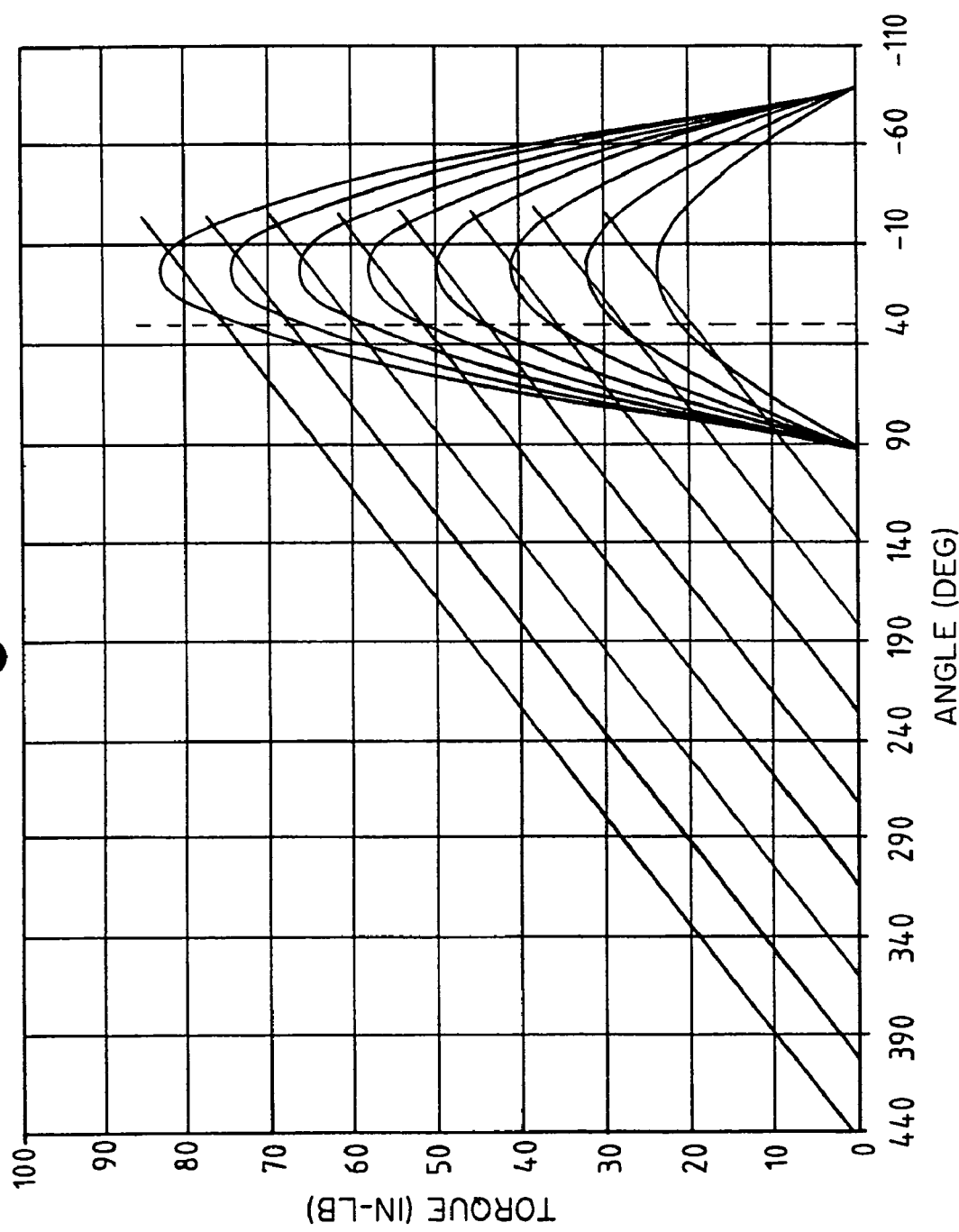
FIG. 48 is a graph showing both the force produced by torsional spring and the force produced by monitor as it is rotated.

FIG. 48 is a graph showing both the torque produced by torsional spring 5240 and the torque produced by monitor 5286 as it is rotated. FIG. 48 includes a curve representing the torque applied by monitors having eight different weights. FIG. 48 also includes eight straight lines, each representing the torque produced by a torsional spring. The torsional spring may be adjusted to balance the torque created by each of the eight monitors by varying the magnitude of the pre-twist applied to the torsion spring.

In FIG. 48 it may be appreciated that torsional spring 5240 of pivot mechanism 5202 creates a torque having a substantially linear relationship with the angular position of the monitor. Also as can be appreciated in FIG. 48, the torque applied about the pivot axis by the weight of the monitor varies in a substantially non-linear fashion. In a preferred embodiment, a relatively low level of friction is created between pivoting bracket 5227 and frame 5229. In a preferred method in accordance with the present invention, the level of friction may be selected to provide smooth operation and to compensate for the difference between the non-linear affect of the gravity induced torque on the pivot and the torque created by the torsional spring. This level of friction is described in greater detail below. In one method in accordance with the present invention, torsional spring 5240 is only try to fit a line to the non-linear torque of the monitor between the angles of 30 degrees and negative 10 degrees.

Figure 49:
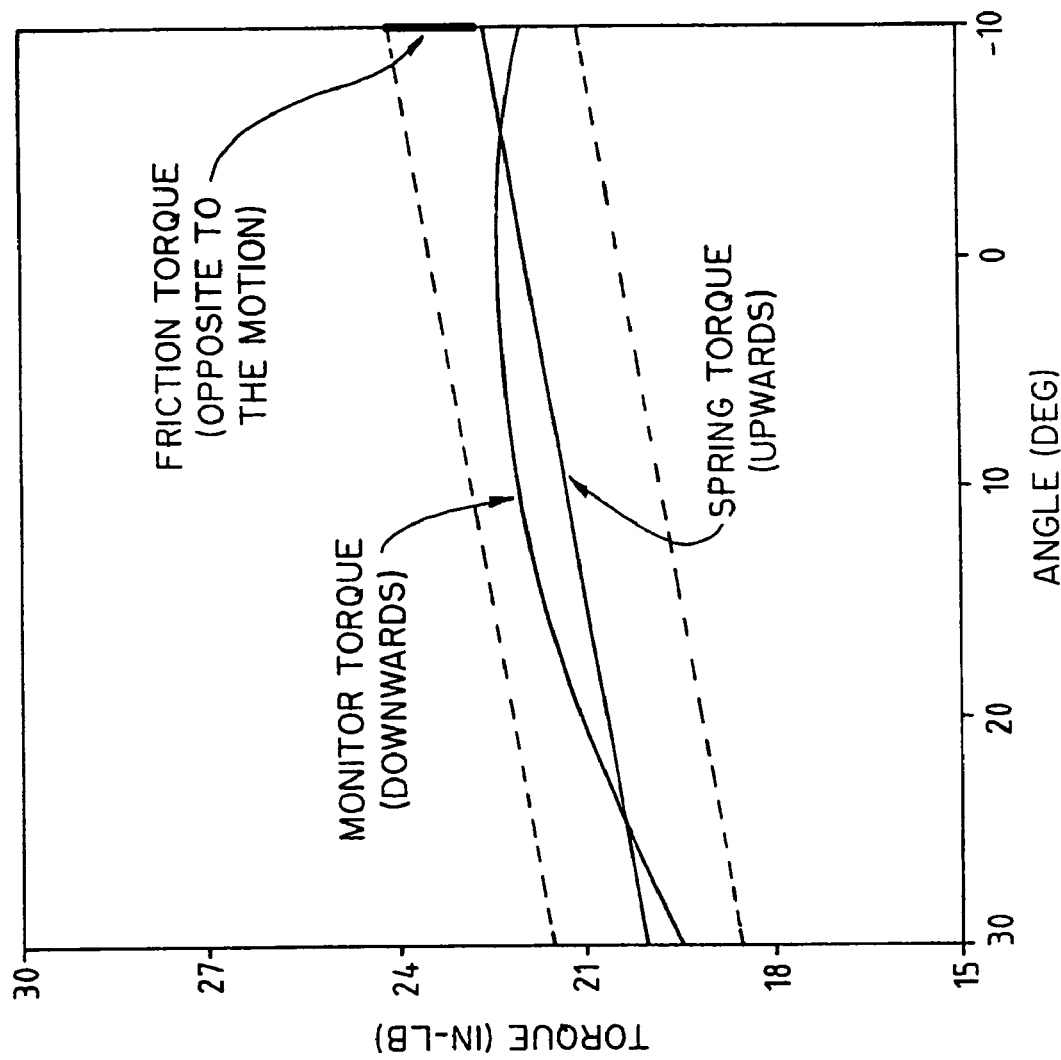
FIG. 49 is a graph showing angular position of monitor and the torque created by torsional spring.

FIG. 49 is a graph showing angular position of monitor 5286 and the torque created by torsional spring 5240. A curved line 5233 also represents the torque created by the monitor. As mentioned previously, the pivot mechanism 5202 may also include a friction producing member. The affect of the friction producing member is shown in FIG. 49. Because of variation in the effective moment arm length during rotation of the monitor, the monitor weight creates a non-linear torque variation. This non-linear variation may be counter balanced using a linearly varying spring torque. The best fit between the non-linear and linearly varying torques can be achieved by optimizing the torsional spring rate and the amount of predeflection applied to the spring. Friction may be produced by allowing contact between fixed brackets of the pivoting mechanism and rotating brackets of the pivoting mechanism. As shown in FIG. 49, the affect of friction torque is generally linear. In a preferred embodiment, the friction torque is minimized. For example, the friction toque may be kept to a level no higher than that needed to provide smooth operation. Minimizing friction torque may reduce the adjustment force required for a user to alter the adjustment of the monitor.

Figure 50A:
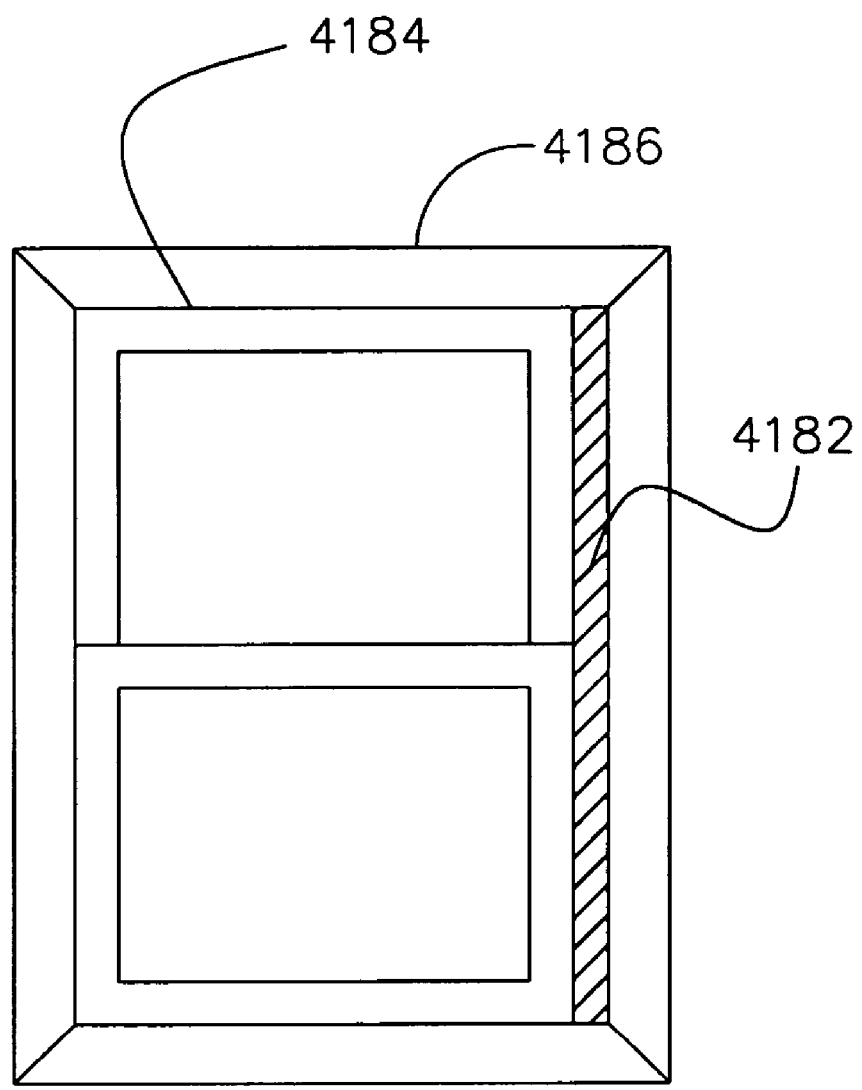
FIG. 50A is a perspective view of a window assembly, comprising a mechanism including a cam and a cam following assembly.
Figure 50B:
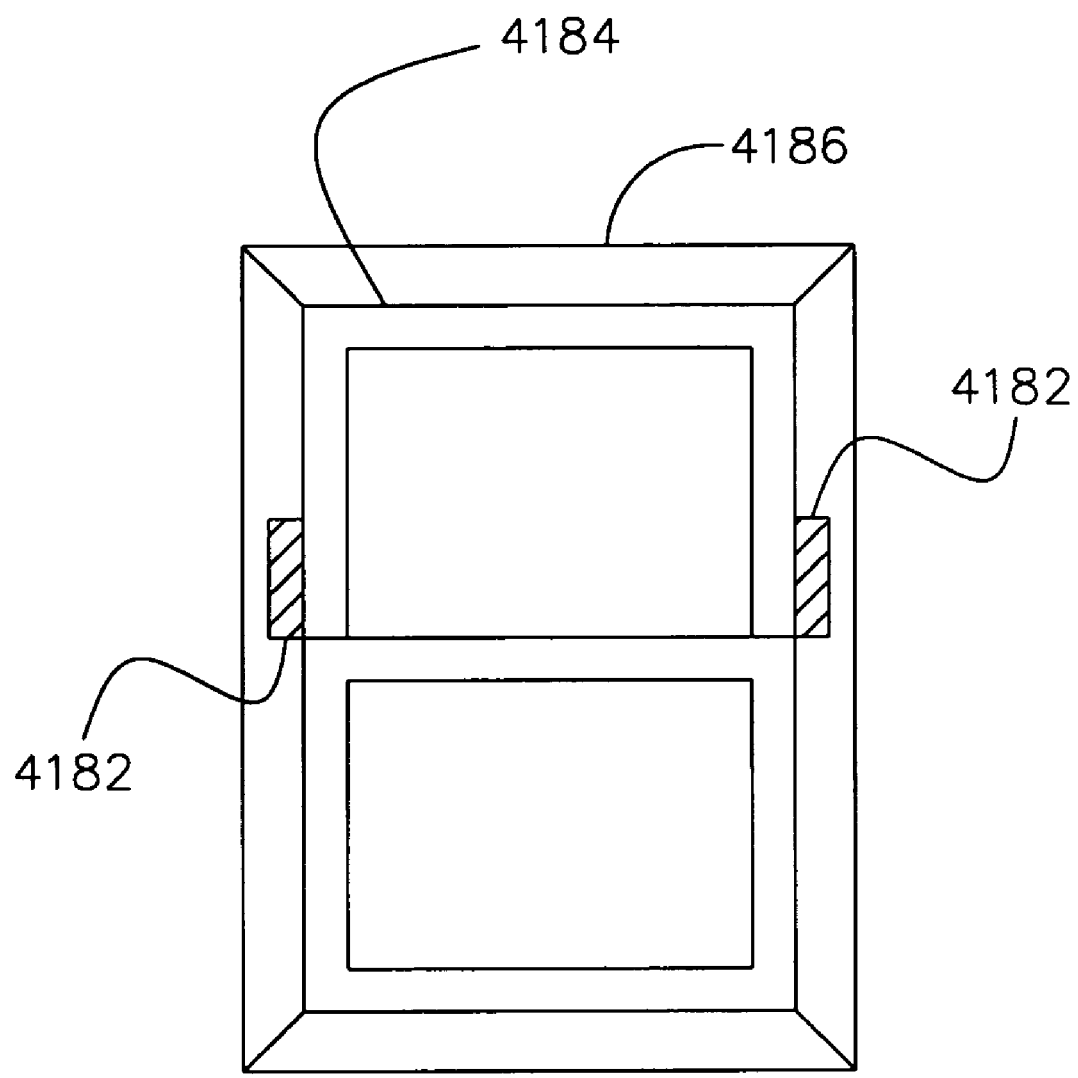
FIG. 50B is a perspective view of a window assembly, comprising a mechanism including a cam and a cam following assembly.

FIG. 50A and FIG. 50B are plan views of window assemblies, each comprising a mechanism 4182 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

Window 4184 may be fixed to one of the cam and the cam following assembly without deviating from the spirit and scope of the present invention. Likewise a window frame 4186 may be fixed to the other of the cam and the cam following assembly. In the embodiment shown, window 4184 is fixed to the cam and window frame 4186 is fixed to the cam following assembly.

Figure 51A:
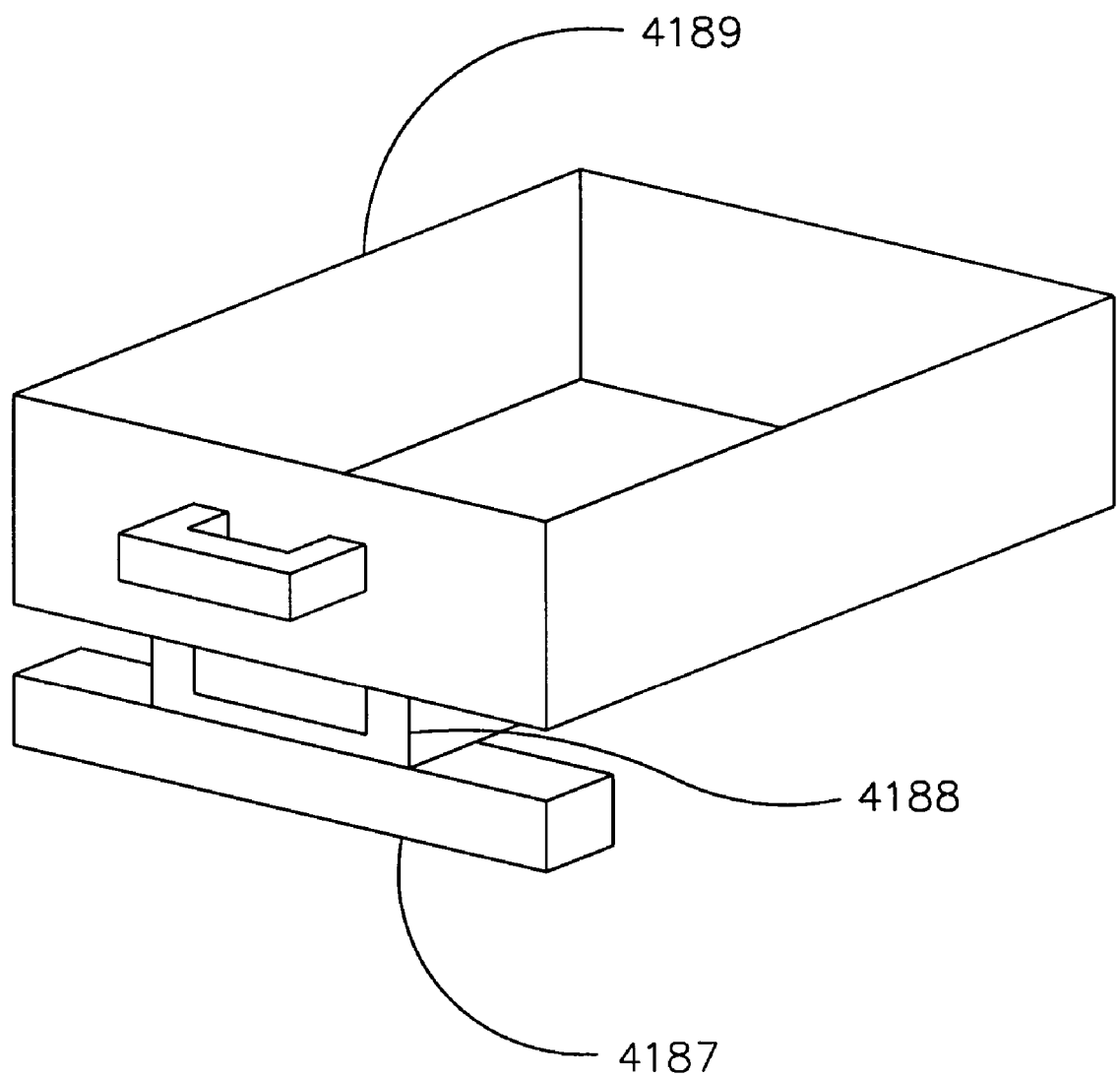
FIG. 51A is a perspective view of a piece of furniture having a drawer closing assembly including a mechanism.
Figure 51B:
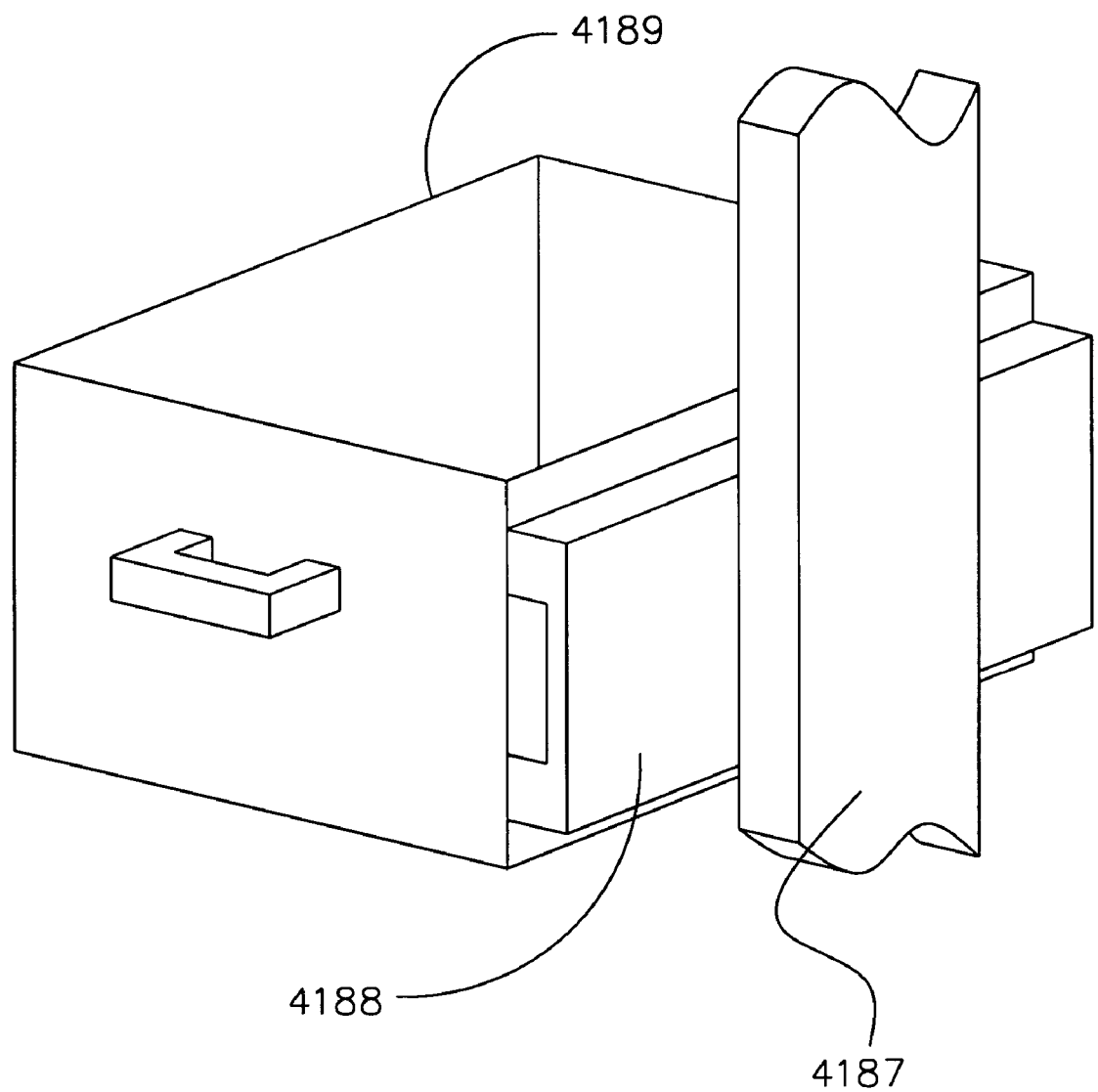
FIG. 51B is a perspective view of a piece of furniture having a drawer closing assembly including a mechanism.

FIG. 51A and FIG. 51B are perspective views of exemplary pieces of furniture each having a drawer closing assembly including a mechanism 4188 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

In the embodiment of FIG. 51A and FIG. 51B a drawer 4189 is fixed to the cam and a frame 4187 of the piece of furniture 4190 is fixed to the cam following assembly. Embodiments are also possible in which drawer 4189 is fixed to the cam following assembly, and frame 4187 is fixed to the cam.

FIG. 52A through 52D are plan views of door closing assemblies in accordance with the present invention. Each door closing assembly comprises a mechanism 4190 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

Figure 52A:
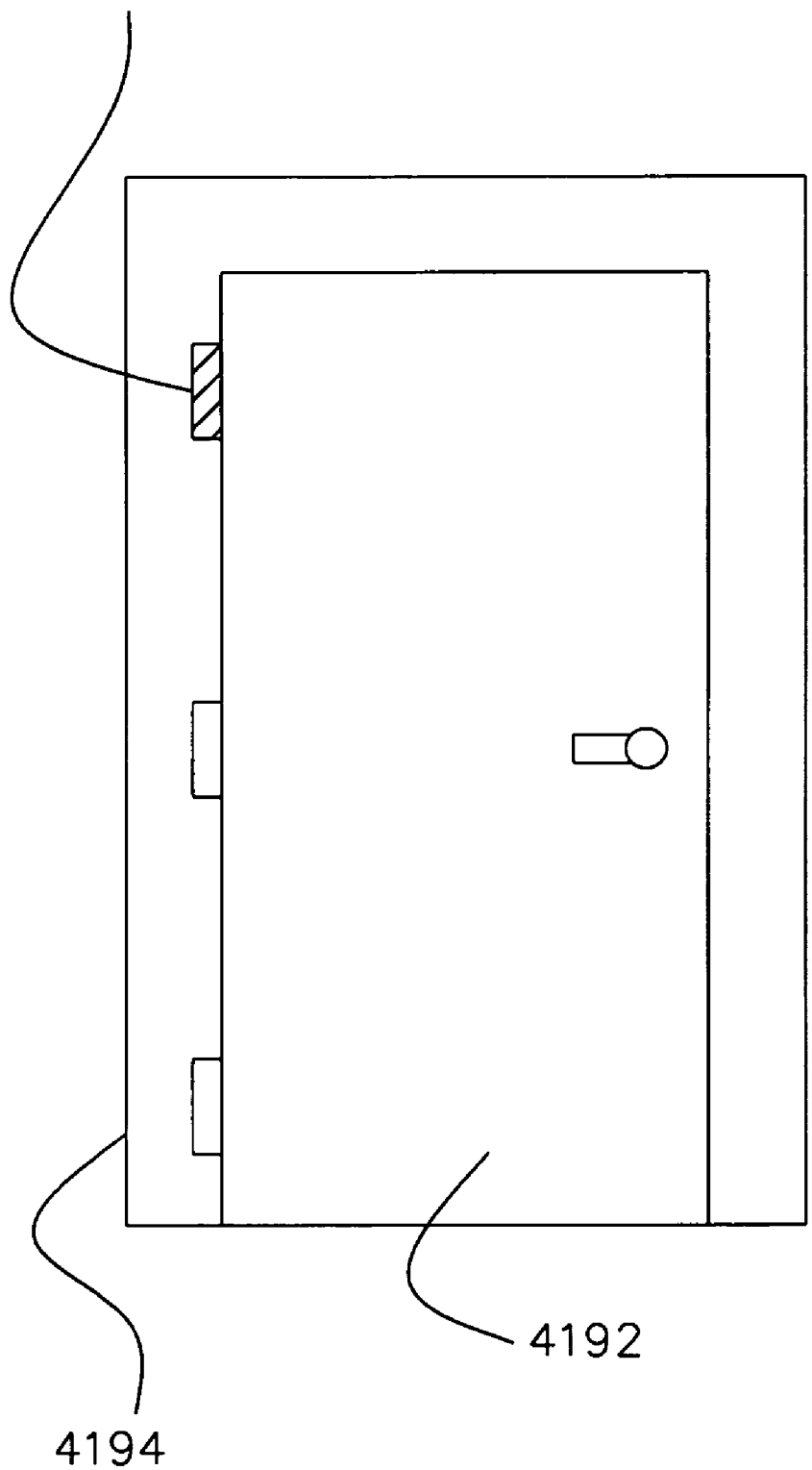
FIG. 52A is a perspective view of a door closing assembly, comprising a mechanism including a cam and a cam following assembly.
Figure 52B:
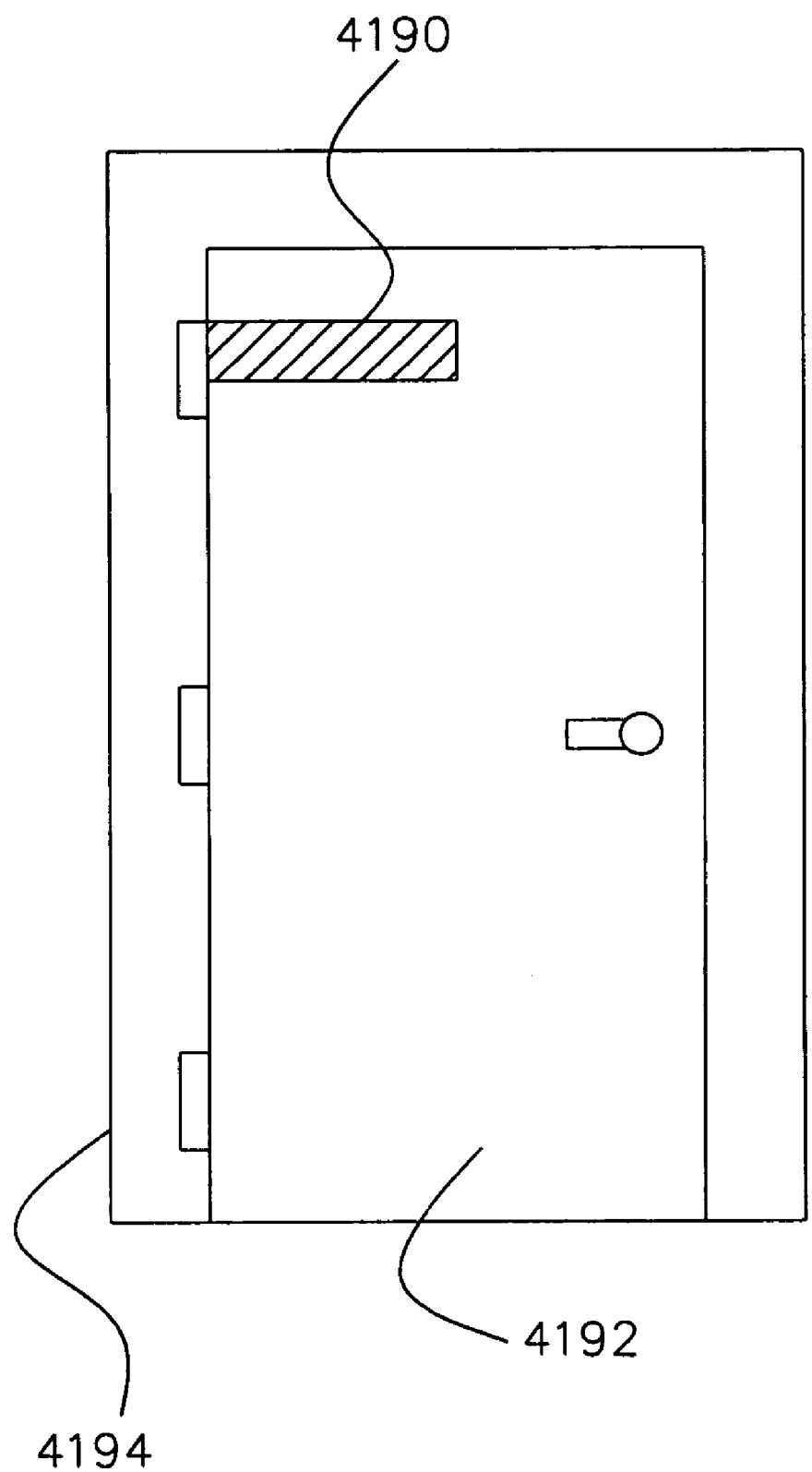
FIG. 52B is a perspective view of a door closing assembly, comprising a mechanism including a cam and a cam following assembly.
Figure 52C:
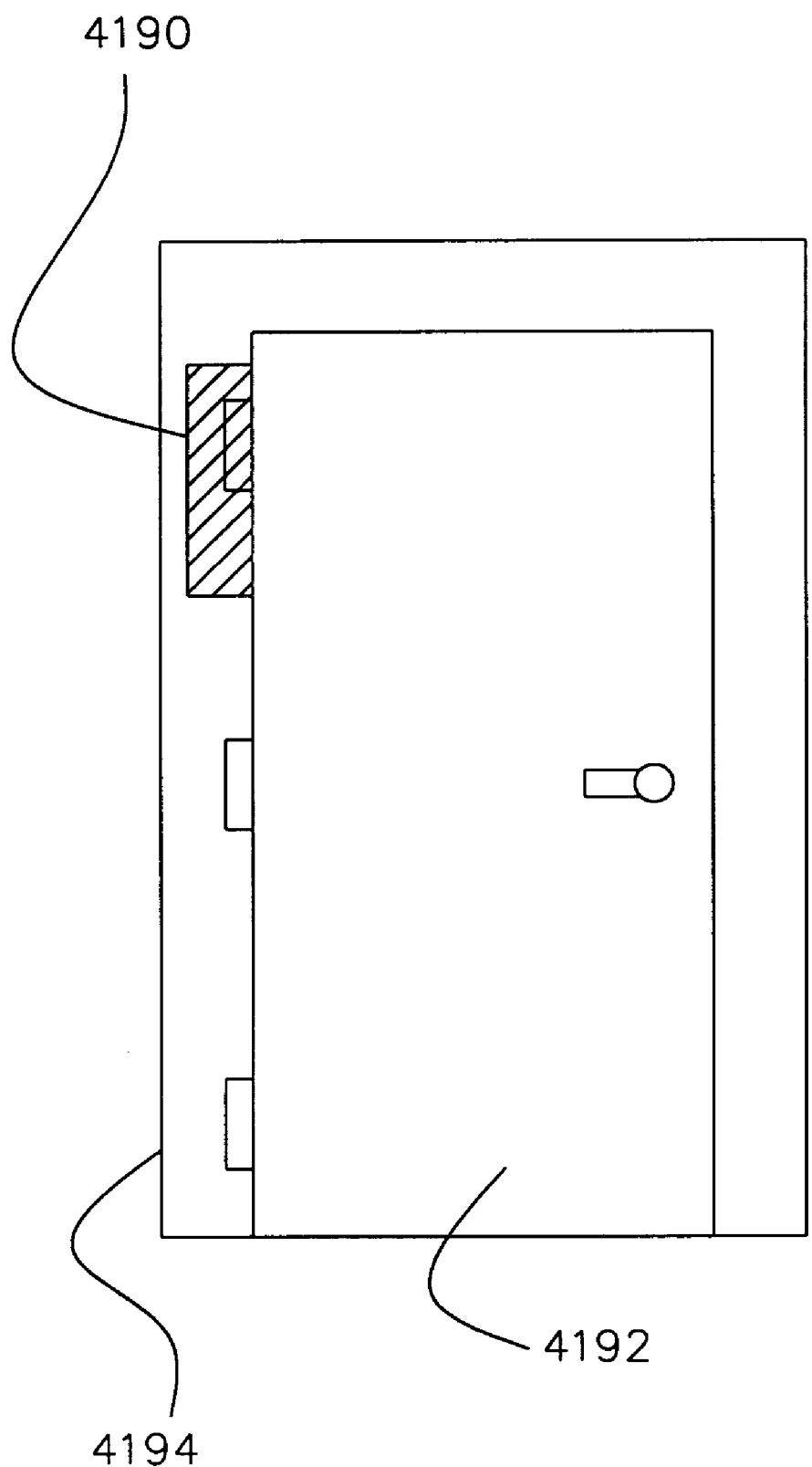
FIG. 52C is a perspective view of a door closing assembly, comprising a mechanism including a cam and a cam following assembly.
Figure 52D:
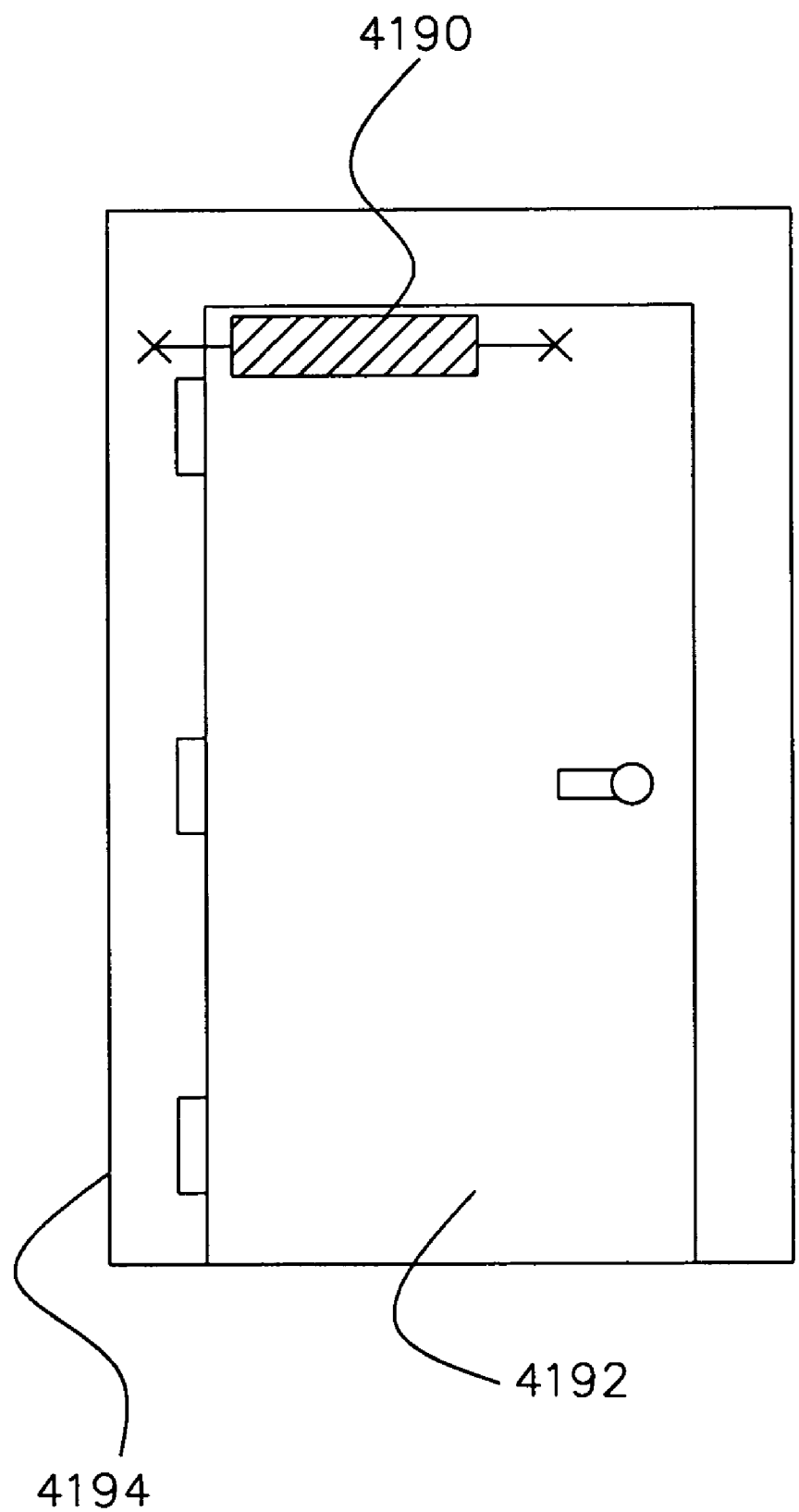
FIG. 52D is a perspective view of a door closing assembly, comprising a mechanism including a cam and a cam following assembly.

In the embodiment of FIG. 52A, mechanism 4190 is disposed within a hinge of the door closing assembly. In the embodiment of FIG. 52B, mechanism 4190 is disposed within door 4192 of the door closing assembly. In the embodiment of FIG. 52C, mechanism 4190 is disposed within a door jam of the door closing assembly. In the embodiment of FIG. 52D, mechanism 4190 extends between door 4192 and door frame 4194.

Figure 53:
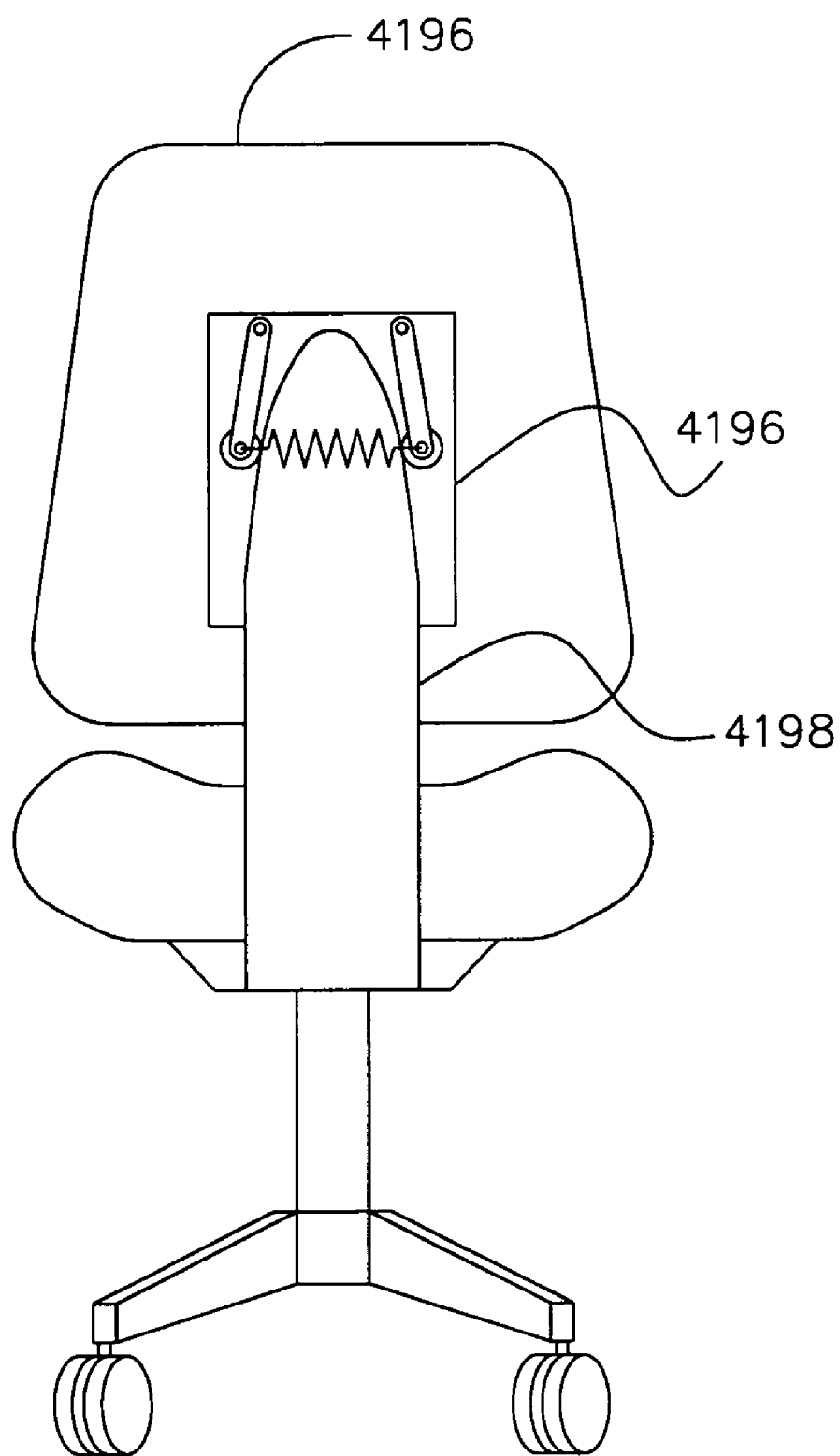
FIG. 53 is a perspective view of a chair assembly, comprising a mechanism including a cam and a cam following assembly.

FIG. 53 is a plan view of a chair assembly, comprising a mechanism 4196 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

In the embodiment shown, a chair back 4197 is coupled to the cam following assembly, and a chair frame 4198 is coupled to the cam. Embodiments are also possible in which chair back 4197 is coupled to the cam and chair frame 4198 is coupled to the cam following assembly.

Figure 54:
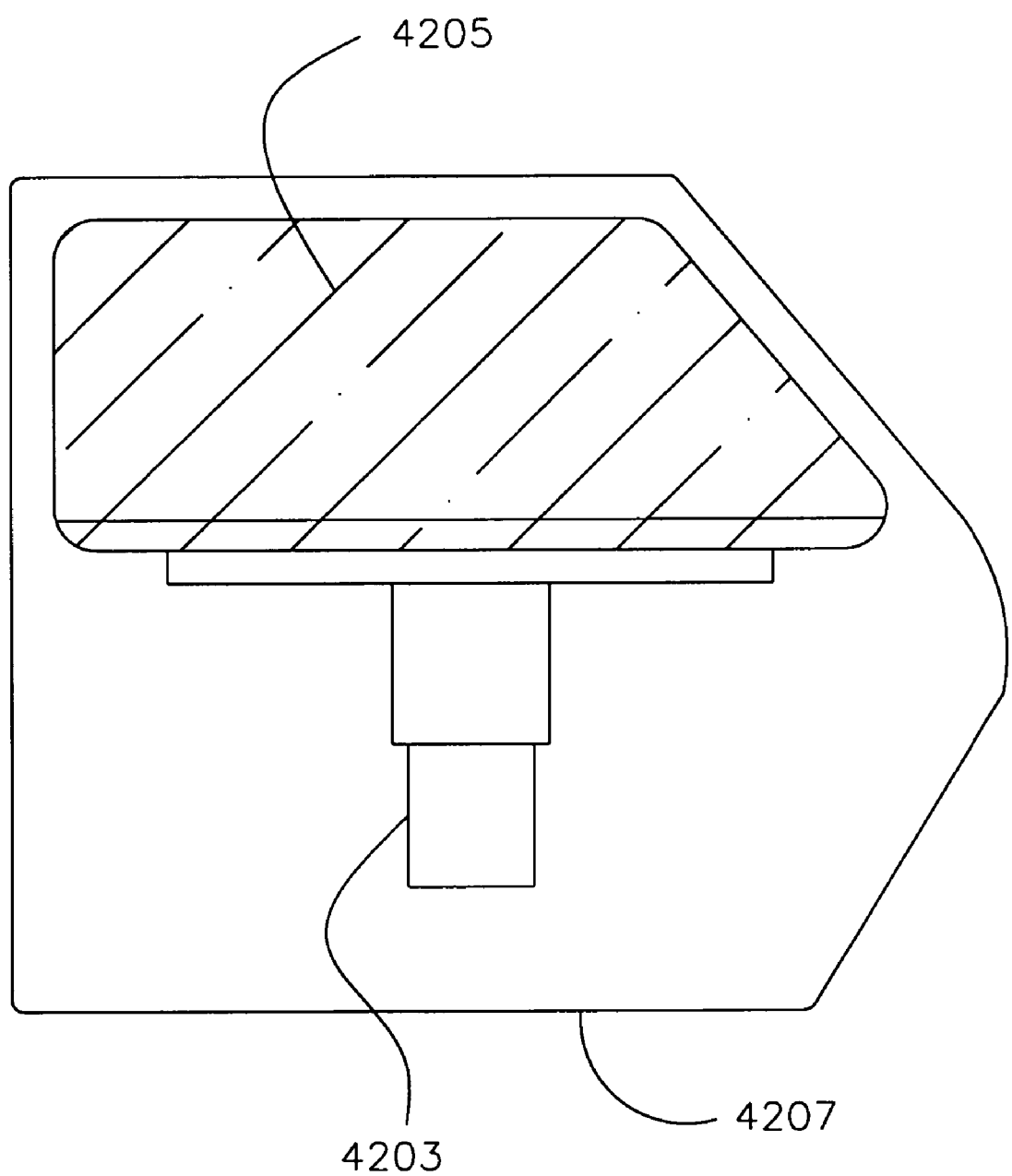
FIG. 54 is a perspective view of a car door assembly, comprising a mechanism including a cam and a cam following assembly.

FIG. 54 is a plan view of a car door assembly, comprising a mechanism 4203 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

In the embodiment shown, a window 4205 is coupled to the cam following assembly 4120 and a door frame 4207 is coupled to the cam 4100. Embodiments are also possible in which window 4205 is coupled to the cam 4100, and a door frame 4207 is coupled to the cam following assembly 4120.

Figure 55:
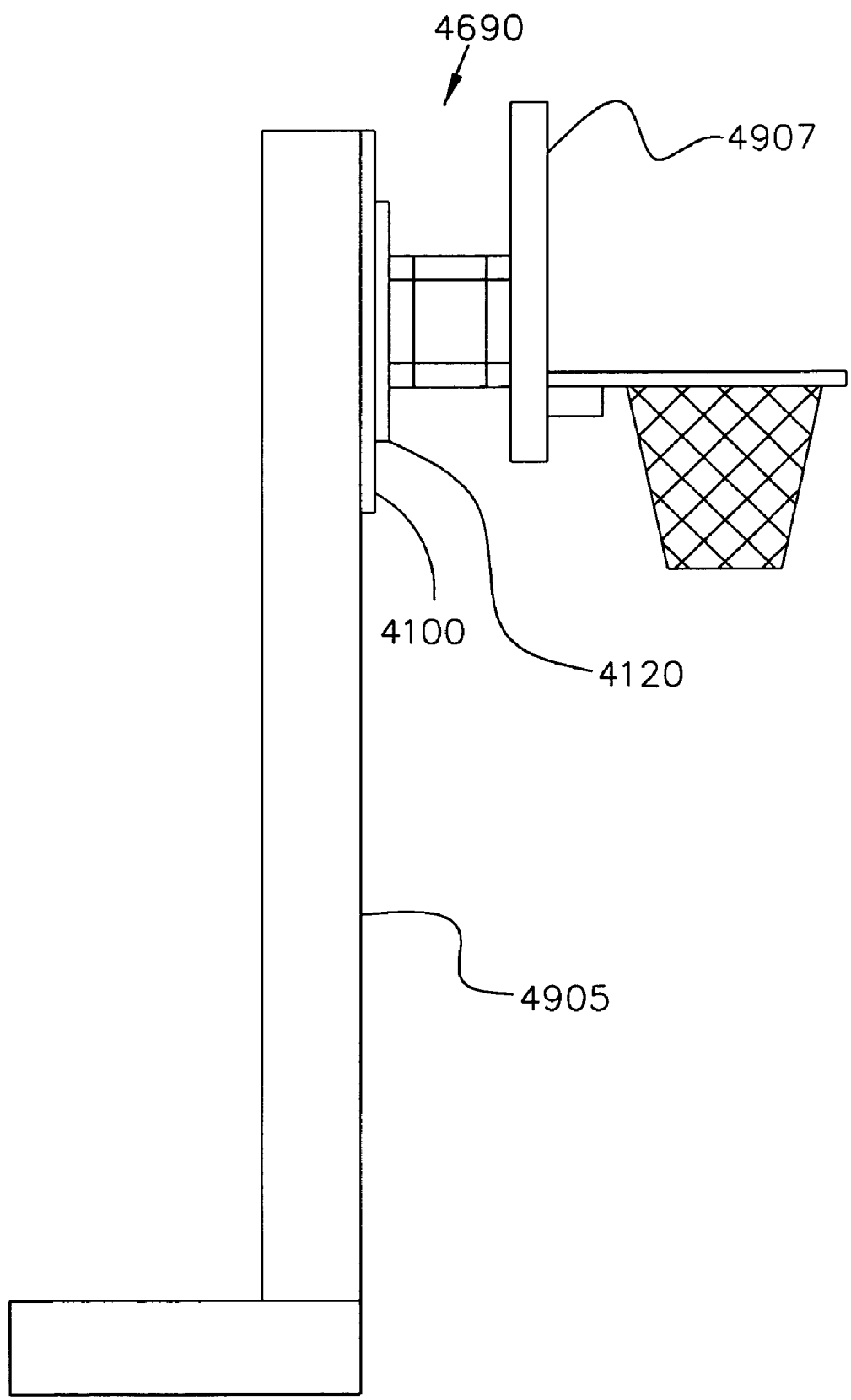
FIG. 55 is a perspective view of a basket ball goal assembly, comprising a mechanism including a cam and a cam following assembly.

FIG. 55 is a perspective view of a basket ball goal assembly, comprising a mechanism 4903 including a cam 4100 and a cam following assembly 4120. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

In the embodiment shown, a post 4905 is coupled to the cam 4100 and a backboard 4907 is coupled to the cam following assembly 4120. Embodiments are also possible in which, a post 4905 is coupled to the cam following assembly 4120, and backboard 4907 is coupled to the cam 4100.

Figure 56:
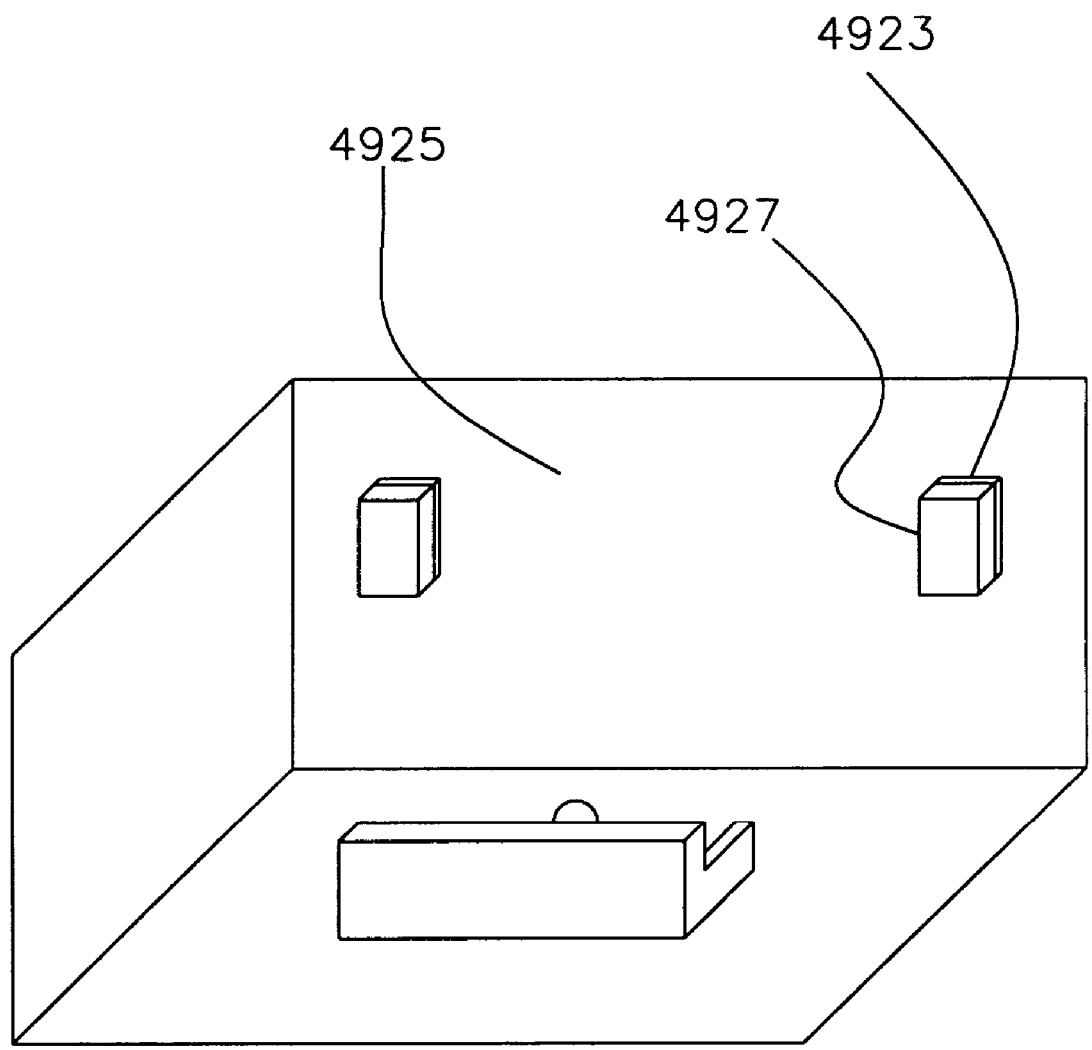
FIG. 56 is a perspective view of a home theater assembly, comprising a mechanism including a cam and a cam following assembly.

FIG. 56 is a perspective view of a home entertainment assembly, comprising a mechanism 4923 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

The home theater assembly of FIG. 56 includes a plurality of speakers 4927. Each speaker 4927 is coupled to a wall 4925 by a mechanism 4923. Each mechanism 4923 allows the associated speaker 4927 to be selectively positioned. For example, each speaker 4927 may be selectively positioned for optimal sound quality.

Figure 57:
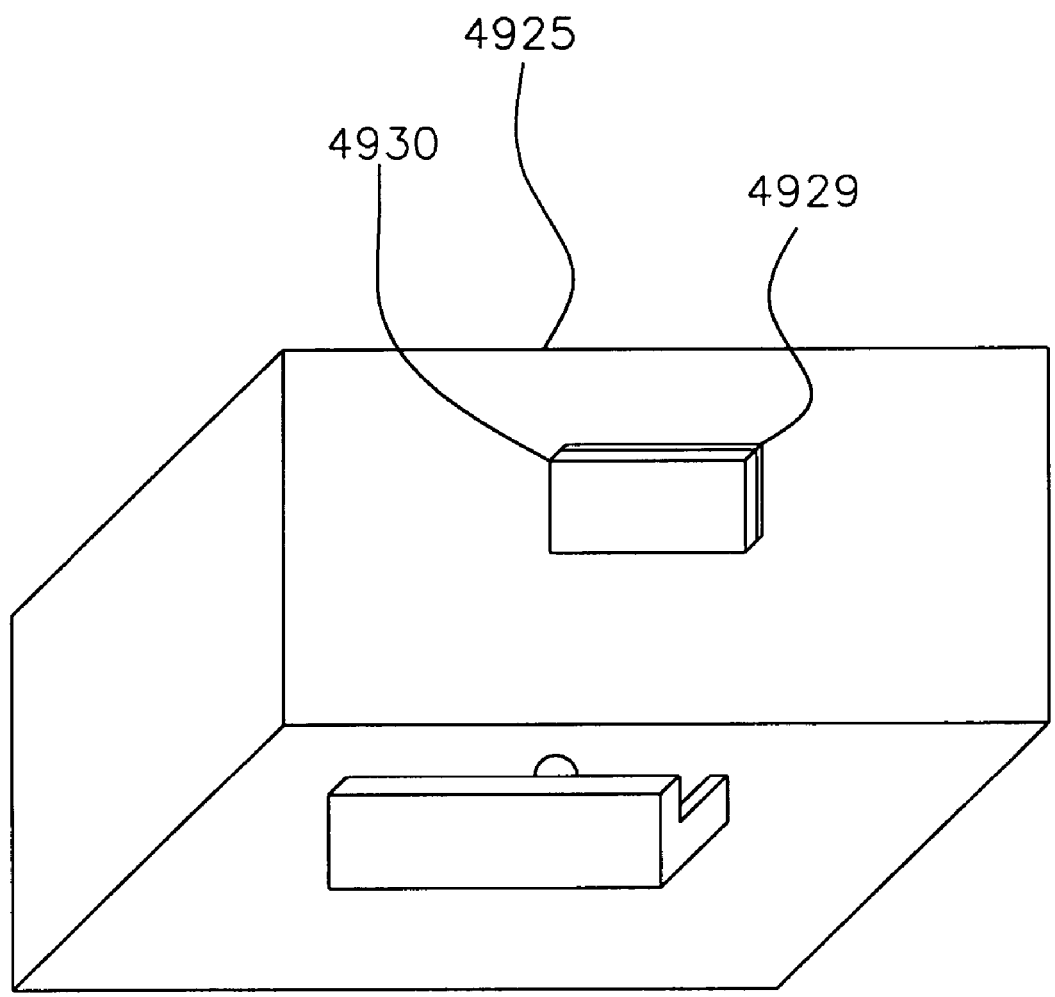
FIG. 57 is a perspective view of a home theater assembly, comprising a mechanism including a cam and a cam following assembly.

FIG. 57 is a perspective view of a home entertainment assembly, comprising a mechanism 4929 including a cam and a cam following assembly. The cam may include a first guiding surface and a second guiding surface. The cam following assembly may include a first follower having a first following surface for engaging the first guiding surface of the cam at least at a first contact point and a second follower having a second following surface for engaging the second guiding surface of the cam. The mechanism may also include a spring having a first end coupled to the first follower and a second end coupled to the second follower.

The home entertainment assembly of FIG. 57 includes a visual display 4930 that is coupled to a wall 4925 by mechanism 4929. Mechanism 4929 may be used to selectively position visual display 4930. For example, visual display 4930 may be selectively positioned for optimal viewing by a viewer.

Figure 58:
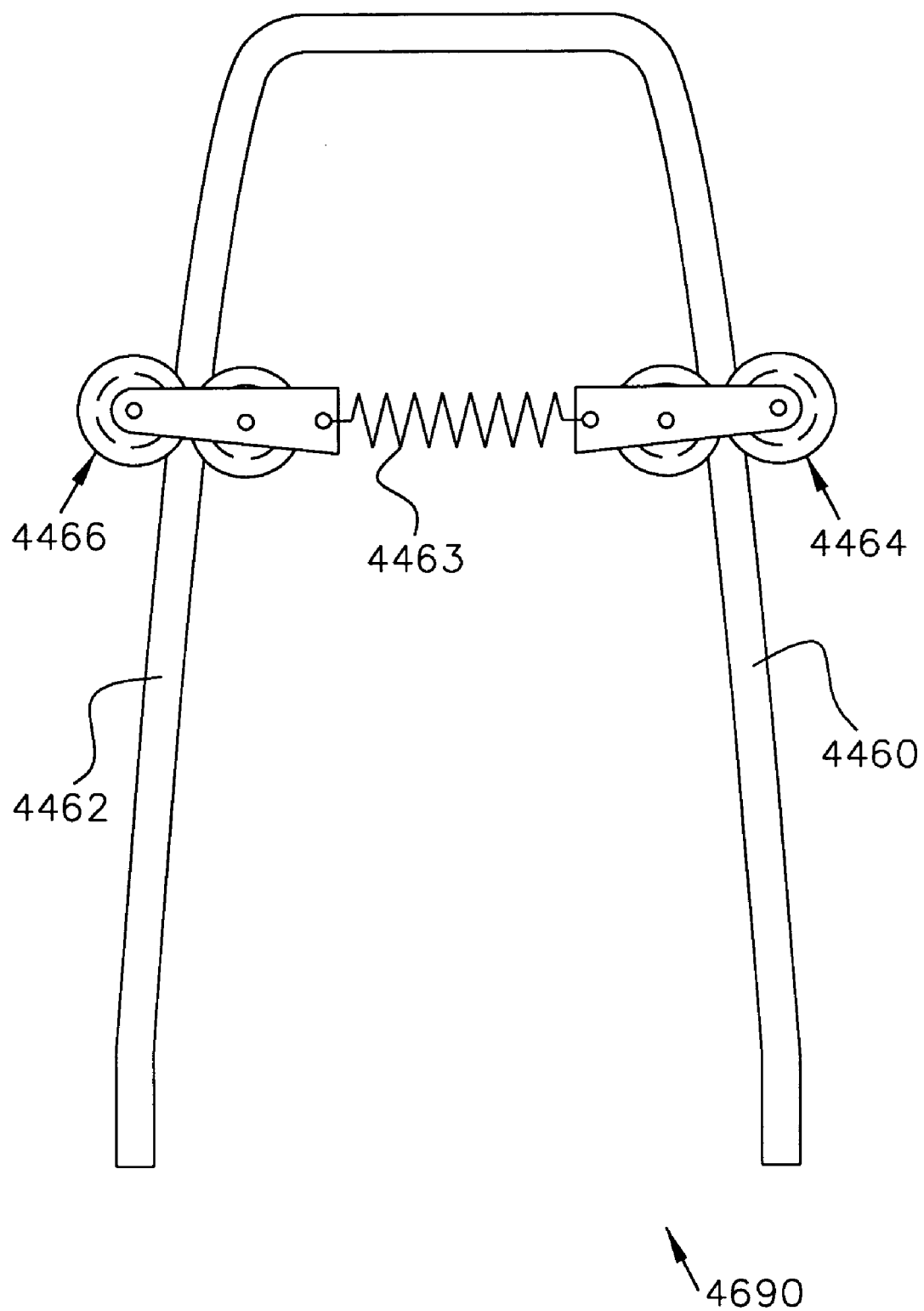
FIG. 58 is a plan view of an apparatus in accordance with an additional embodiment of the present invention.

FIG. 58 is a plan view of an apparatus 4499 in accordance with an additional embodiment of the present invention. Apparatus 4499 includes a first guideway 4460 and a first follower 4464 arranged to run along first guideway 4460. A second follower 4466 of apparatus 4499 is arranged to run along second guideway 4462 of apparatus 4499. In a preferred embodiment, apparatus 4499 includes a mechanism for urging first follower 4464 and second follower 4466 towards one another. In the embodiment of FIG. 58, a spring 4463 extends between first follower 4464 and second follower 4466.

The first guideway 4460 defines a first arcuate path and the second guideway 4462 defines a second arcuate path. In a preferred embodiment, first arcuate path has a continually changing slope and/or a continually changing radius of curvature. In a particularly preferred embodiment, the radius of the second arcuate path is substantially a mirror image of the first arcuate path.

Figure 59:
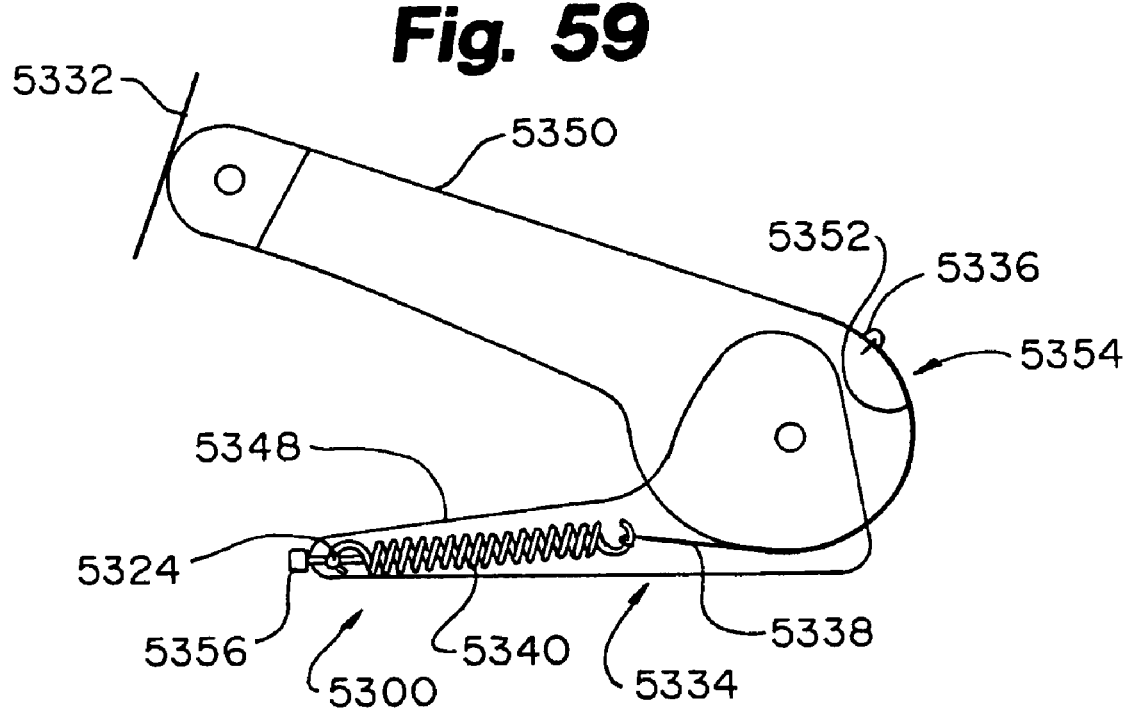
FIG. 59 is a plan view of an apparatus in accordance with an additional exemplary embodiment of the present invention.

FIG. 59 is a plan view of an apparatus 5300 in accordance with an additional exemplary embodiment of the present invention. Apparatus 5300 includes a mounting bracket 5332 which is pivotally coupled to an arm 5350. Arm 5350 is pivotally coupled to a base 5348. Arm 5350 includes a cam surface 5352. Apparatus 5300 also includes a cable 5338 having a first end 5336 and a second end 5334. First end 5336 is fixed to arm 5350 at a first location 5354. Second end 5334 of cable 5338 is coupled to one end of a spring 5340. Another end of spring 5340 is coupled to an adjustment screw 5356. In the embodiment of FIG. 59, adjustment screw 5356 is coupled to spring 5340 by an adjustment block 5324. In this embodiment, adjustment screw 5356 threadingly engages adjustment block 5324.

Figure 60:
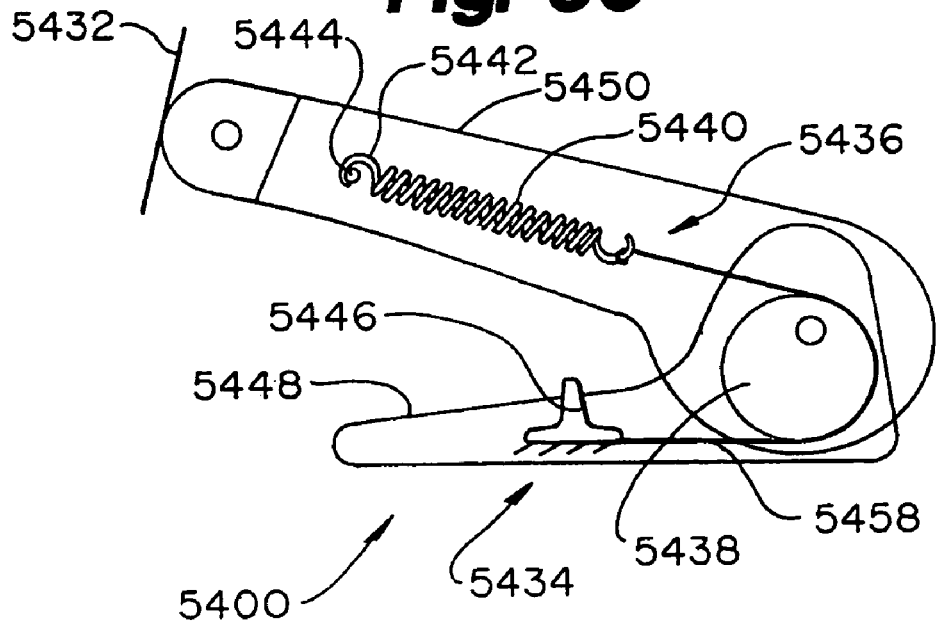
FIG. 60 is plan view of an apparatus in accordance with an additional exemplary embodiment of the present invention.

FIG. 60 is plan view of an apparatus 5400 in accordance with an additional exemplary embodiment of the present invention. Apparatus 5400 comprises an arm 5450 that is pivotally mounted to a base 5448. A cam member 5458 is fixed to arm 5450. Apparatus 5400 also includes a cable 5438 having a first end 5436 and a second end 5434. Second end 5434 of cable 5438 is coupled to an anchor member 5446. First end 5436 of cable 5438 is coupled to one end of a spring 5440. Another end of spring 5440 is coupled to arm 5450. In the embodiment of FIG. 60, arm 5450 includes a pin 5444 and spring 5440 includes a hook 5442 partially disposed around pin 5444. In the embodiment of FIG. 60, anchor member 5446 is adapted to selectively engage and disengage base 5448. For example, anchor member 5446 may be selectively unlocked from base 5448, then moved to vary the pretension in spring 5440, and finally selectively locked to base 5448. Apparatus 5400 of FIG. 60 also includes a mounting bracket 5432 that is pivotally coupled to one end of arm 5450.

Figure 61:
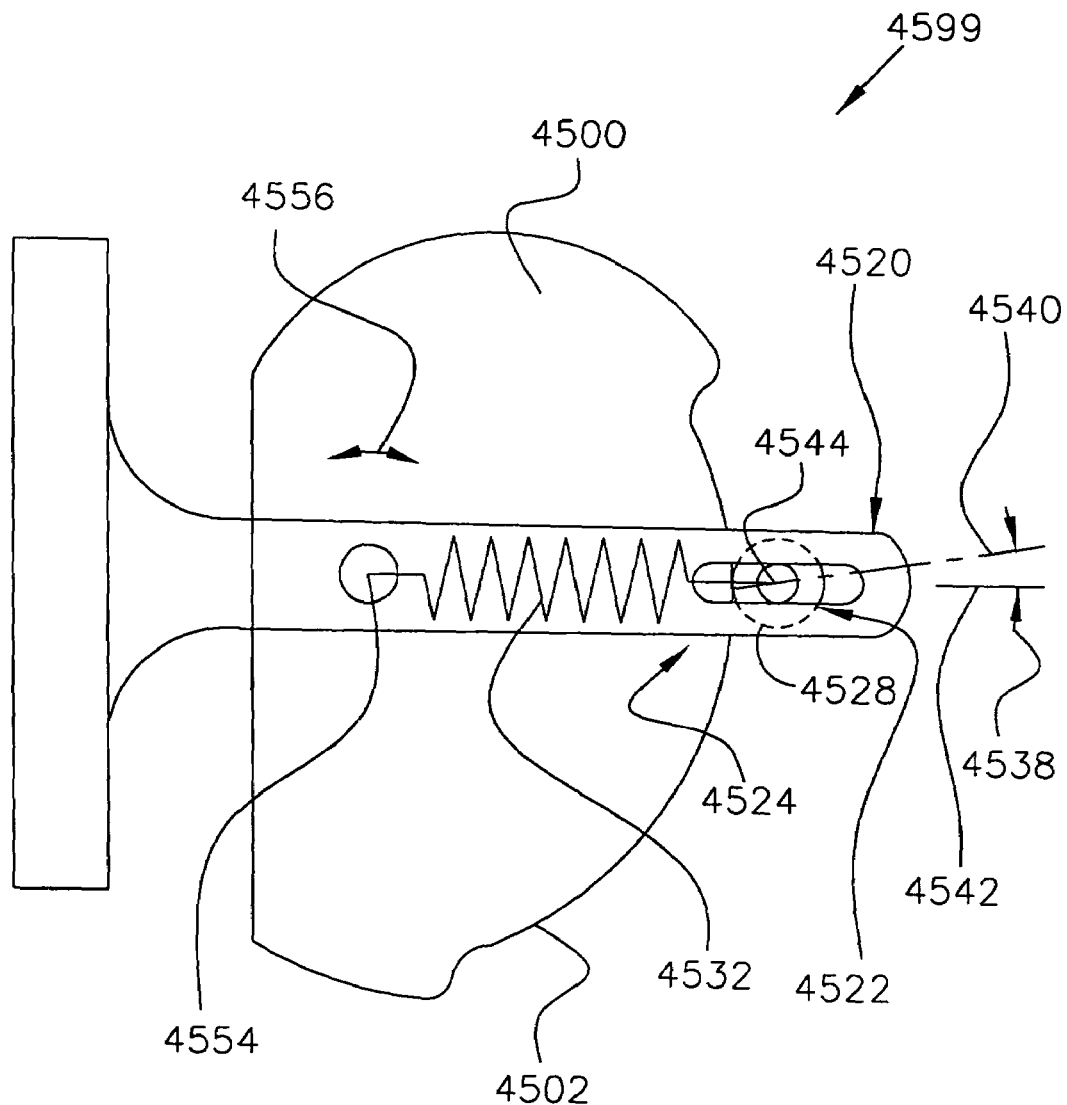
FIG. 61 is a plan view of a pivot mechanism in accordance with an additional embodiment of the present invention.

FIG. 61 is a plan view of a pivot mechanism in accordance with an additional embodiment of the present invention. Pivot mechanism 4599 includes a cam 4500 and a cam following assembly 4520. Cam 4500 has a first guiding surface 4502. Cam following assembly 4520 includes a first roller 4522 having a first following surface 4528 for engaging the first guiding surface 4502 of the cam 4500 at least at a first contact point 4524. In the embodiment of FIG. 61, cam following assembly 4520 also includes a biasing mechanism for urging first roller 4522 against first guiding surface 4502 of cam 4500. In the embodiment of FIG. 61, the biasing mechanism includes a spring 4532.

First roller 4522 has a contact angle 4538 defined by a first imaginary line 4540 extending through first contact point 4524 and a central axis 4544 of first roller 4522, and a substantially horizontal imaginary reference line 4542. In a preferred embodiment, first guiding surface 4502 of cam 4500 has a continually changing slope and/or a continually changing radius of curvature so that contact angle 4538 of first roller 4522 changes as cam 4500 rotates about an axis of rotation 4554 thereof. In a particularly preferred embodiment, cam 4500 is shaped such that rotation of cam 4500 about axis of rotation 4554 causes a deflection of spring 4532 and a change in contact angle 4538 of first roller 4522 such that the magnitude of a torque 4556 acting on cam 4500 is substantially constant throughout a rotary travel of cam 4500. In an advantageous embodiment, the deflection of spring 4532 varies in a manner substantially, inversely proportional to an associated variation in the trigonometric TAN function of the contact angle 4538 throughout the travel of the cam following assembly 4520.

Figure 62:
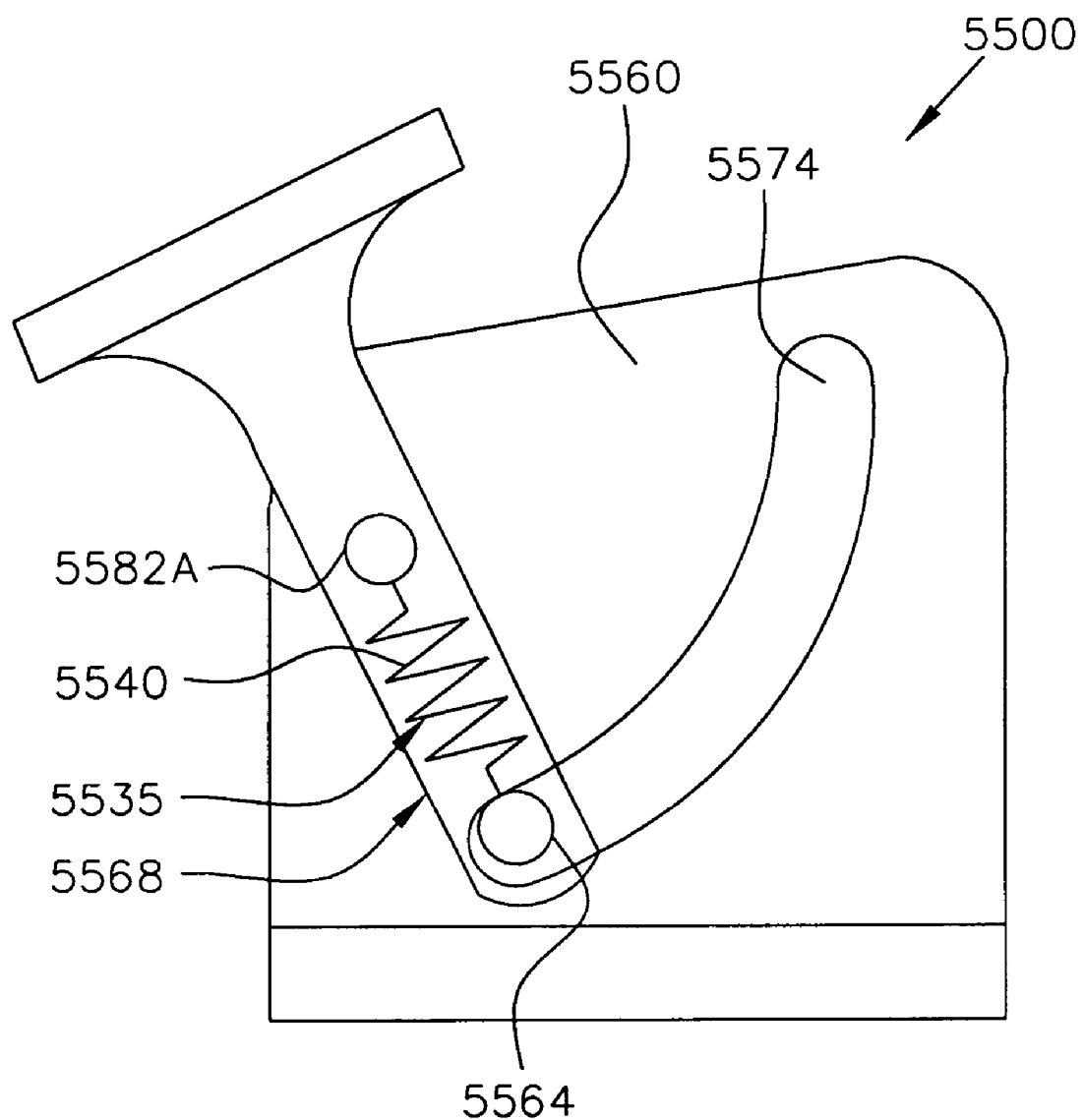
FIG. 62 is a plan view of a pivot mechanism apparatus in accordance with an additional exemplary embodiment of the present invention.

FIG. 62 is a plan view of a pivot mechanism 5500 in accordance with an additional exemplary embodiment of the present invention. Pivot mechanism 5500 includes a guide member 5560 defining a guideway 5574, and a follower 5568 including a roller 5564. Follower 5568 also includes a biasing mechanism 5535 which is arranged to bias roller 5564 against one edge of guideway 5574. In the embodiment of FIG. 62 biasing mechanism 5535 comprises a first spring 5540. As shown in FIG. 62, follower 5568 is pivotally coupled to guide member 5560 at a first shaft 5582A.

As shown in FIG. 62, guideway 5574 of guide member 5560 defines a generally arcuate path. Roller 5564 is preferably arranged to follow this arcuate path. Roller 5564 forms a contact angle with guide member 5560. In a preferred embodiment, the arcuate path defined by guideway 5574 of guide member 5574 has a continually changing slope and/or a continually changing radius of curvature so that the contact angle of first roller 5564 changes as follower 5568 rotates about first shaft 5582A relative to guide member 5574. In a particularly preferred embodiment, guideway 5574 is shaped such that rotation of follower 5568 about first shaft 5582A causes a deflection of spring 5540 and a change in the contact angle of roller 5564 such that the magnitude of a torque acting between guide member 5574 and follower 5568 is substantially constant throughout a rotary travel thereof. In an advantageous embodiment, the deflection of spring 5540 varies in a manner substantially, inversely proportional to an associated variation in the trigonometric TAN function of the contact angle throughout the travel of the roller 5564 within guideway 5574.

Figure 63:
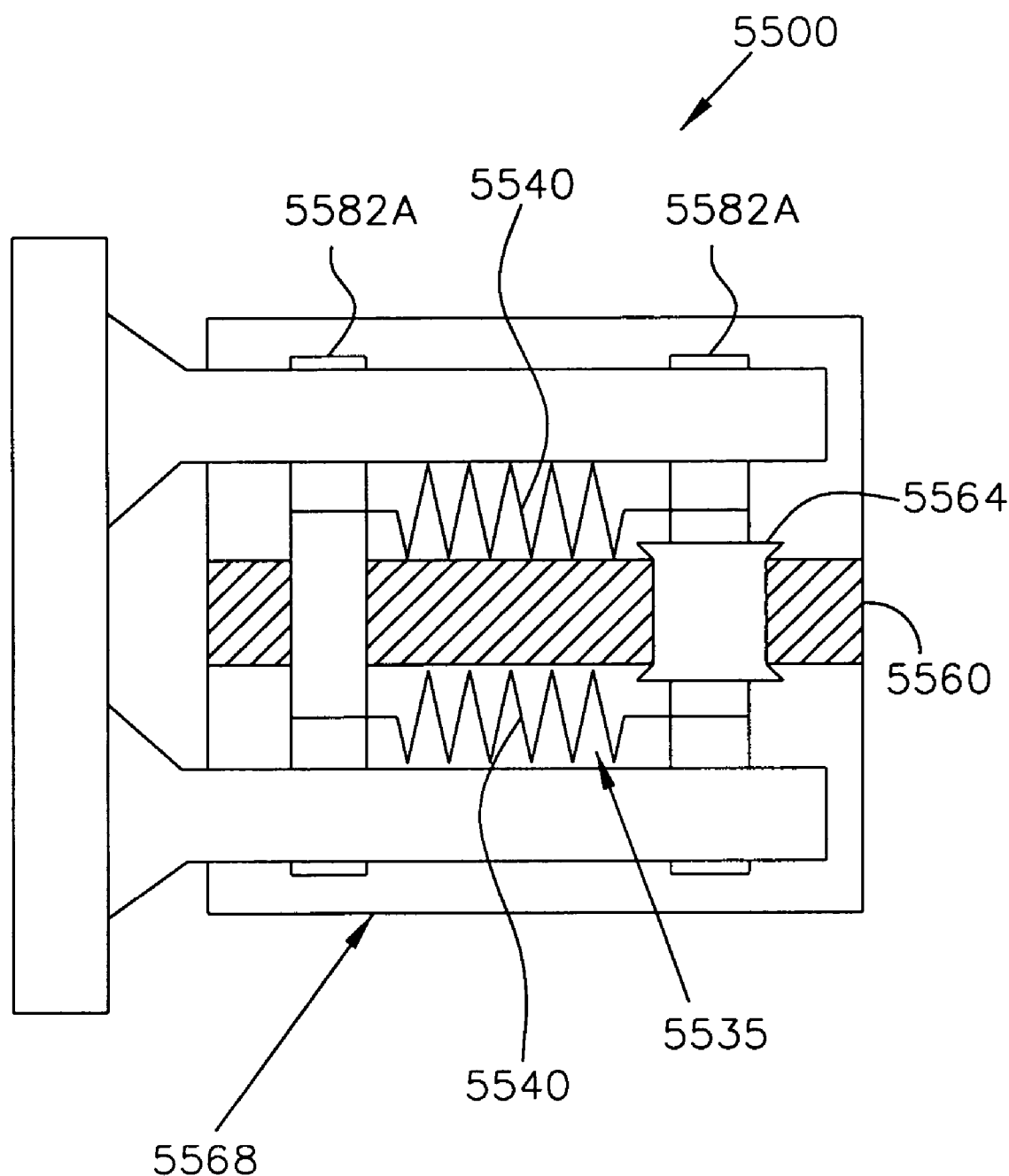
FIG. 63 is an additional plan view of pivot mechanism of FIG. 62.

FIG. 63 is an additional plan view of pivot mechanism 5500 of FIG. 62. In FIG. 63, it may be appreciated that pivot mechanism 5500 includes a first shaft 5582A and a second shaft 5582B. In FIG. 63, it may be appreciated that first spring 5540 of biasing mechanism 5535 extends between first shaft 5582A and second shaft 5582B. As shown in FIG. 63, biasing mechanism 5535 also includes a second spring 5540 extending between first shaft 5582A and second shaft 5582B. In the embodiment of FIG. 63, follower 5568 and guide member 5560 pivot about first shaft 5582A relative to one another. Also in the embodiment of FIG. 63, roller 5564 pivots about second shaft 5582B.

Figure 64:
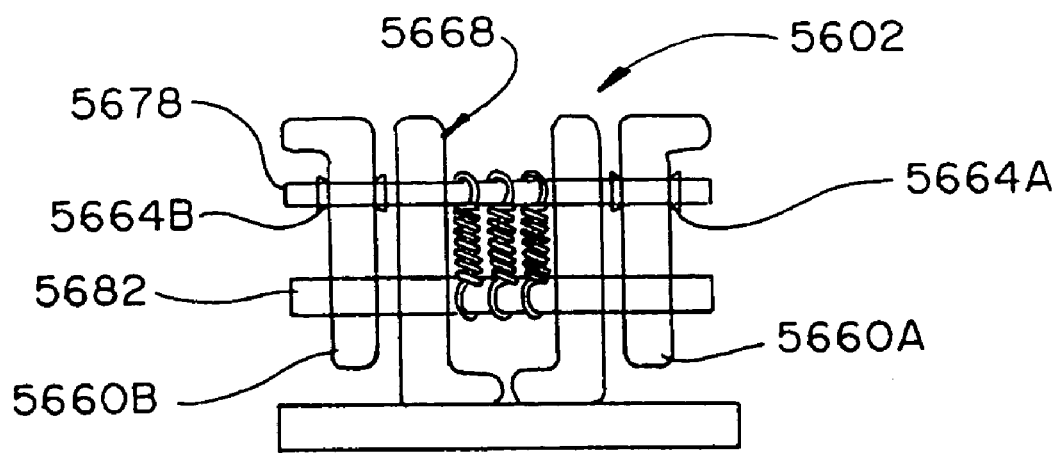
FIG. 64 is a plan view of a pivot mechanism in accordance with an additional exemplary embodiment of the present invention.

FIG. 64 is a plan view of a pivot mechanism 5602 in accordance with an additional exemplary embodiment of the present invention. Pivot mechanism 5602 includes a first guide member 5660A defining a first guideway and a second guide member 5660B defining a second guideway. In the embodiment of FIG. 64, pivot mechanism 5602 includes a follower 5668 having a first roller 5664A and a second roller 5664B. As shown in FIG. 64, first roller 5664A is disposed within the guideway defined by first guide member 566A. Also as shown in FIG. 64, second roller 5664B is disposed within the guideway defined by second guide member 5660B.

Follower 5668 includes a second shaft 5678 extending through first roller 5664A and second roller 5664B. In FIG. 64, it may be appreciated that pivot mechanism 5602 includes a first shaft 5682. In the embodiment of FIG. 64, first guide member 5660A and second guide member 5660B are arranged to pivot about first shaft 5682.

Figure 65:
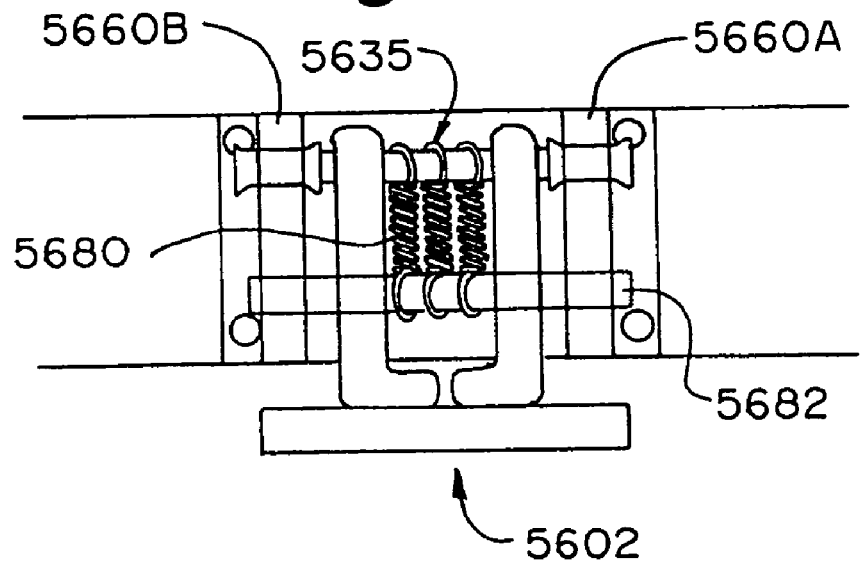
FIG. 65 is an additional plan view of the pivot mechanism of FIG. 64.

FIG. 65 is an additional plan view of the pivot mechanism 5602 of FIG. 64. In the embodiment of FIG. 65, first guide member 5660A and second guide member 5660B have been rotated about first shaft 5682A. In FIG. 65 it may be appreciated that pivot mechanism 5602 includes a biasing mechanism 5635. In the embodiment shown, biasing mechanism includes a plurality of springs 5680. In a preferred embodiment, first guide member 5660A and second guide member 5660B each define an arcuate path. Also in this preferred embodiment, first roller 5664A, second roller 5664B, and second shaft 5678 are arranged to follow the arcuate path defined by first guide member 5660A and second guide member 5660B. In a particularly preferred embodiment, the deflection of springs 5680 varies as first guide member 5660A and second guide member 5660B are rotated about first shaft 5682A causing first roller 5664A, second roller 5664B, and first shaft 5682A to follow the arcuate path defined by first guide member 5660A and second guide member 5660B.

The disclosures herein contemplate and enable an apparatus in accordance with the present invention to be useful as an assist mechanism for the operation of devices by people having reduced physical capabilities. For example, such an assist device using an apparatus disclosed herein may enable senior citizens having reduced strength in their hands, or other individuals having reduced dexterity in their hands to more easily operate window, doors, cupboards, and other equipment or apparatus. Several forms of invention have been shown and described, and other forms will now be apparent to those skilled in art. It will be understood that embodiments shown in drawings and described above are merely for illustrative purposes, and are not intended to limit the scope of invention defined claims which follow.

CONCLUSION

There is a need for a monitor support mechanism which is compact, less costly to manufacture and maintain, has increased reliability, allows easy adjustability, is scalable to many different sized monitors, is adaptable to provide a long range of travel, and is adaptable to provide constant support force as the monitor is being positioned.

Accordingly, the present inventors devised methods, systems, and mechanisms for providing force and position control on a monitor. In one embodiment, a method of supporting a monitor includes converting an ascending energy storage member force curve into a substantially constant supporting force against the monitor.

In one aspect, a method of supporting a monitor includes providing an energy storage member and a cam which are cooperatively positioned so as to move relative to each other along the path of motion. As the energy storage member moves along the path relative to the cam, the cam displaces the energy storage member and thereby changes a force applied by the energy storage member on the cam, and wherein the cam converts the force applied by the energy storage member into a supporting force on the monitor.

One aspect provides a monitor support mechanism. In one embodiment, a monitor support mechanism includes an energy storage member and a cam. The energy storage member and the cam are cooperatively positioned so that, as the energy storage member moves along a path relative to the cam, the cam displaces the energy storage member and thereby changes a force of the energy storage member, and wherein the cam converts the force of the energy storage member into a substantially constant supporting force on the monitor.

During one example use of the mechanism, the height, location, and/or horizontal position of a component mounted on the mechanism can be adjusted. For example, to move the monitor, a portion of the truck or the monitor is grasped, and force is applied to overcome the frictional restraint of the components, which can be as little as 1 or 2 pounds, by way of example. When the moving force is removed, the component remains supported in its new position. Thus, even very large loads can be safely and easily adjusted with a minimum of effort.

Moreover, in one or more embodiments, a constant level of energy is stored (or expended) by the energy storage member per unit of movement along the path. This provides ease of adjustment all along the path.

Among other advantages, the present monitor support system provides mechanisms which can be compact, scalable, have a long range of travel, and have a slim profile. In addition, the monitor support mechanisms are low cost and light weight. A further benefit is when multiple components are simultaneously secured with the same mechanism to achieve an efficient use of space and provide common movement of the components. In one embodiment, a single mechanism can be changed or adjusted to allow various weight components to be counterbalanced by the same mechanism. Moreover, the present invention is not limited by the relative size of the mechanisms. The principle behind the present embodiments is applicable to smaller and larger mechanism than those depicted as examples. Moreover, one or more features described above may be combined or substituted in other embodiments.

Other variations of materials include, for example, thermoformed plastic. This provides a low cost mass-producible item.

Moreover, one or more embodiments of the mechanism described above can be used for many different applications. For example, computer monitors, keyboards, furniture, or exercise equipment.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present invention. The scope of the invention should, therefore, be determined with reference to the appended claims, along with the full scope of equivalents to which such claims are entitled.

What is claimed is:

1. An apparatus, comprising:
a cam having at least a first guiding surface;
a cam following assembly including a first following surface for engaging the first guiding surface of the cam at least at a first contact point, and a means for urging the first following surface against the first guiding surface of the cam;
the first following surface defining a contact angle with the first guiding surface of the cam; and
the first guiding surface of the cam being shaped such that the contact angle of the first follower changes substantially continually as the cam following assembly moves along the cam;
wherein the means for urging the first following surface against the first guiding surface of the cam comprises a torsion member and the cam is shaped such that movement of the cam following assembly along the longitudinal axis of the cam causes a torsional movement of the torsion member and a change in the contact angle of the first following surface such that a magnitude of an axial force component of a reactionary force acting on the first following surface is substantially constant throughout a travel of the cam following assembly.

2. The apparatus of claim 1, wherein the torsion member includes a torsion spring.

3. The apparatus of claim 1, wherein the torsion member includes a torsion bar spring.

4. The apparatus of claim 1, wherein the first following surface comprises a wheel.

5. The apparatus of claim 1, wherein the cam following assembly includes a truck that is slidably coupled to the cam.

6. The apparatus of claim 1, wherein the cam following assembly moves along a first axis.

7. The apparatus of claim 6, wherein the cam following assembly is rotatable around a second axis.

8. The apparatus of claim 7, wherein the first axis and the second axis are parallel.

9. The apparatus of claim 7, wherein the torsion member forces the first following surface to rotate around the second axis when the cam following assembly moves along the first axis.

10. The apparatus of claim 7, wherein the first guiding surface of the cam lies in a generally circular or curved position around the second axis.

11. The apparatus of claim 1, wherein the cam further includes a second guiding surface and the cam following assembly includes a second following surface for engaging the second guiding surface of the cam at least at a second contact point.

12. The apparatus of claim 1, wherein the first guiding surface of the cam has a substantially continually changing slope.

13. The apparatus of claim 1, wherein the first guiding surface of the cam has a substantially continually changing radius of curvature.

14. The apparatus of claim 1, wherein the contact angle is defined by a first imaginary line extending through the first contact point and a central axis of the first following surface, and an imaginary reference line.

15. The apparatus of claim 1, wherein the cam is substantially symmetrical about the longitudinal axis thereof.

16. An apparatus, comprising:
a cam having at least a first guiding surface;
a cam following assembly having a truck that is slidably coupled to the cam, the cam following assembly including a first following surface for engaging the first guiding surface of the cam at least at a first contact point, and a means for urging the first following surface against the first guiding surface of the cam, wherein the cam following assembly moves along a first axis and is rotatable around a second axis;
the first following surface defining a contact angle with the first guiding surface of the cam; and
the first guiding surface of the cam being shaped such that the contact angle of the first follower changes substantially continually as the cam following assembly moves along the cam;
wherein the means for urging the first following surface against the first guiding surface of the cam comprises a torsion member and the torsion member forces the first following surface to rotate around the second axis when the cam following assembly moves along the first axis.

17. An apparatus, comprising:
a cam having at least a first guiding surface;
a cam following assembly having a truck that is slidably coupled to the cam, the cam following assembly including a first following surface for engaging the first guiding surface of the cam at least at a first contact point, and a means for urging the first following surface against the first guiding surface of the cam, wherein the cam following assembly moves along a first axis and is rotatable around a second axis;
the first following surface defining a contact angle with the first guiding surface of the cam; and
the first guiding surface of the cam being shaped such that the contact angle of the first follower changes substantially continually as the cam following assembly moves along the cam;
wherein the means for urging the first following surface against the first guiding surface of the cam comprises a torsion member and the first guiding surface of the cam lies in a generally circular or curved position around the second axis.

* * * * *